Dec. 18, 1945.     E. G. KLINGBERG ET AL     2,391,021
APPARATUS FOR PHOTOGRAPHIC COMPOSITION
Filed July 24, 1942    15 Sheets-Sheet 1
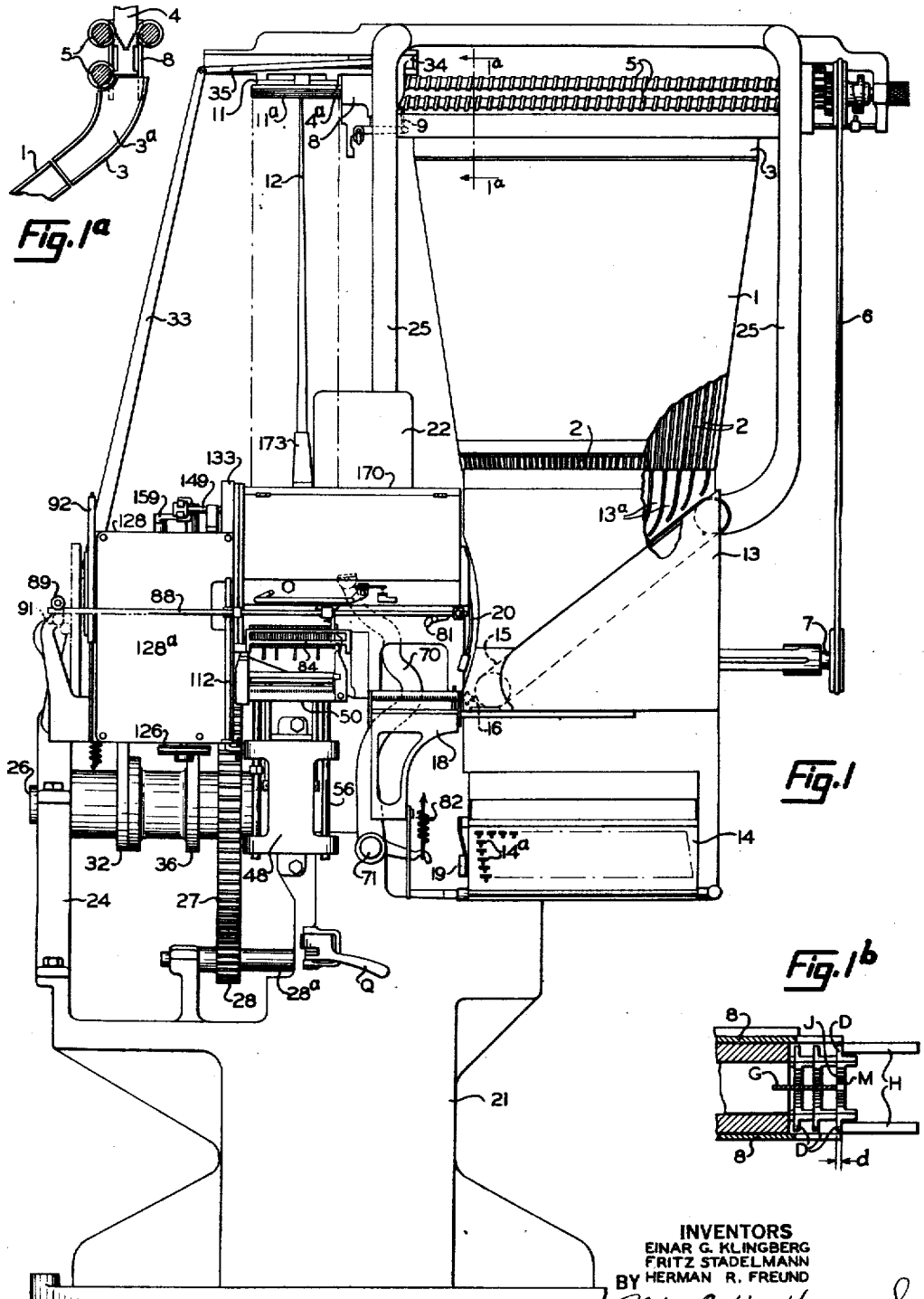
INVENTORS
EINAR G. KLINGBERG
FRITZ STADELMANN
BY HERMAN R. FREUND
Blair, Curtis & Hayward
ATTORNEYS

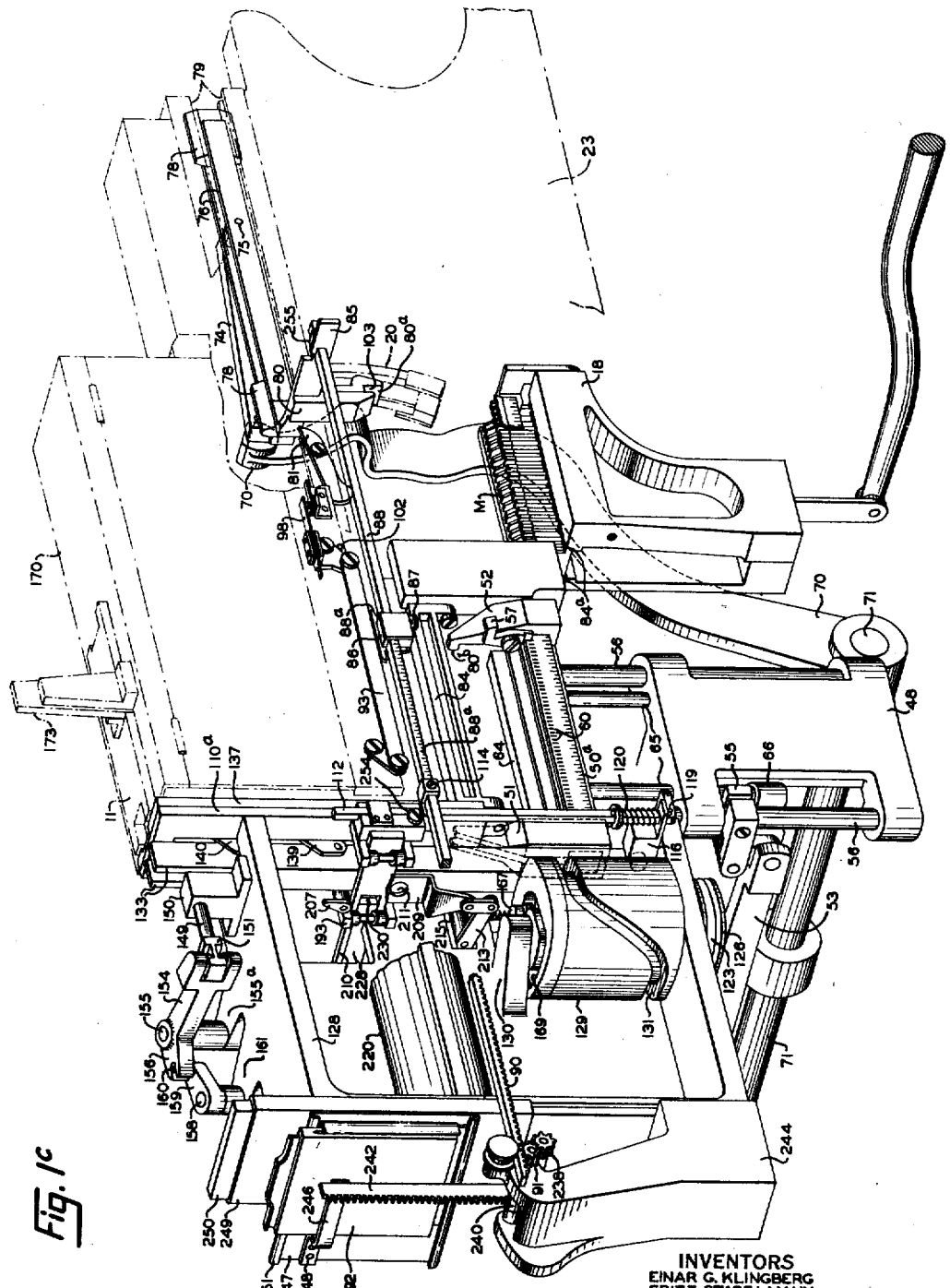

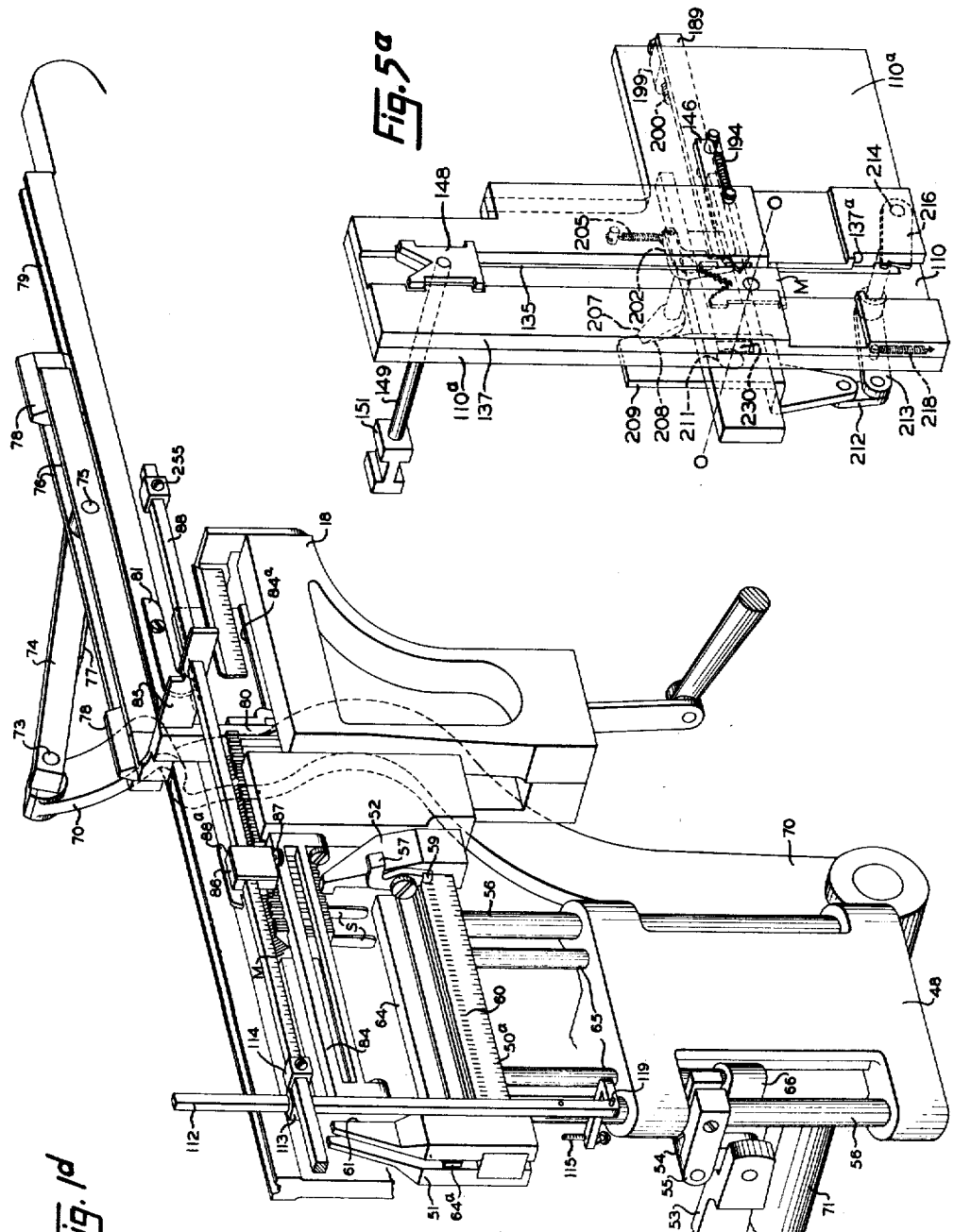

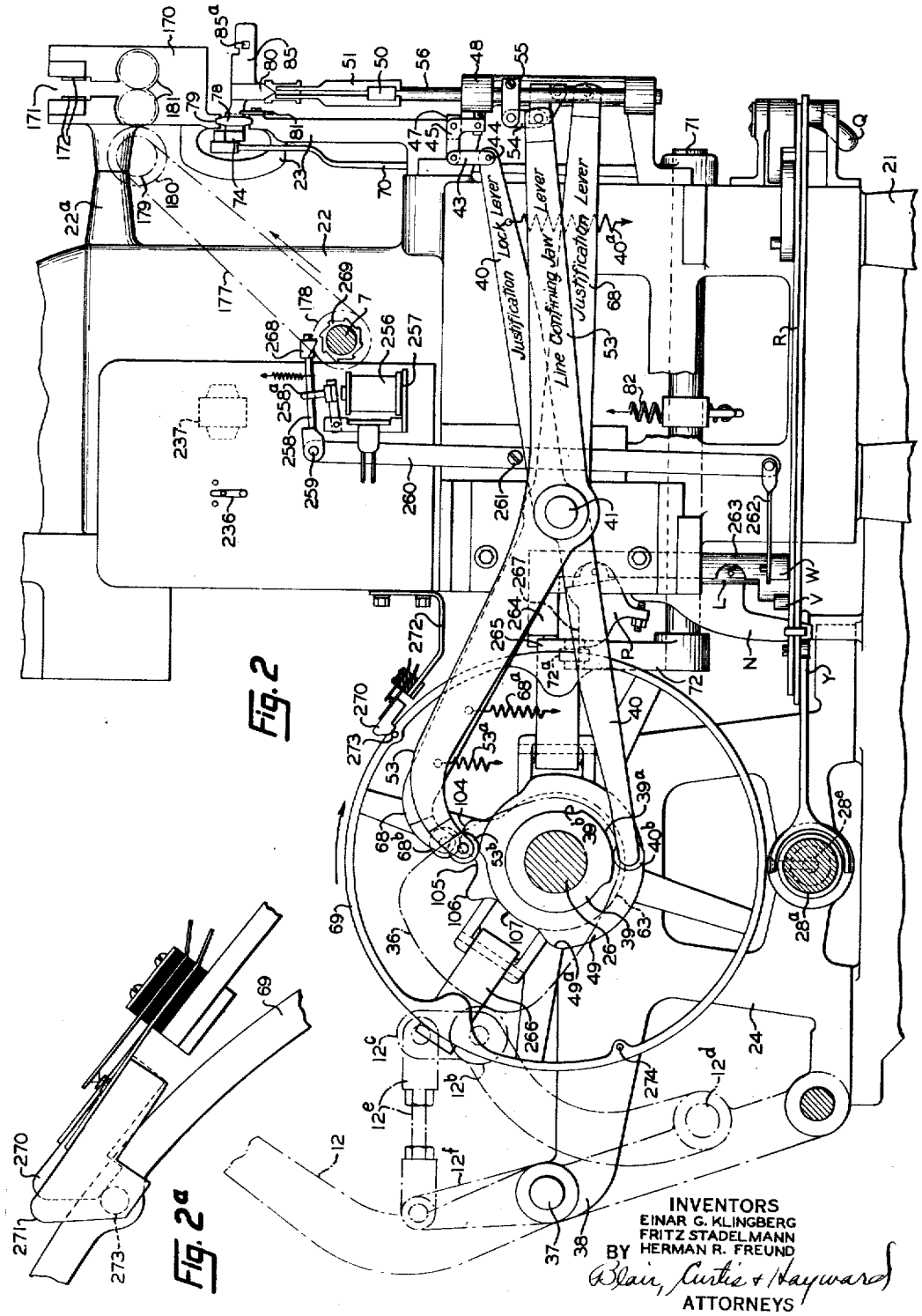

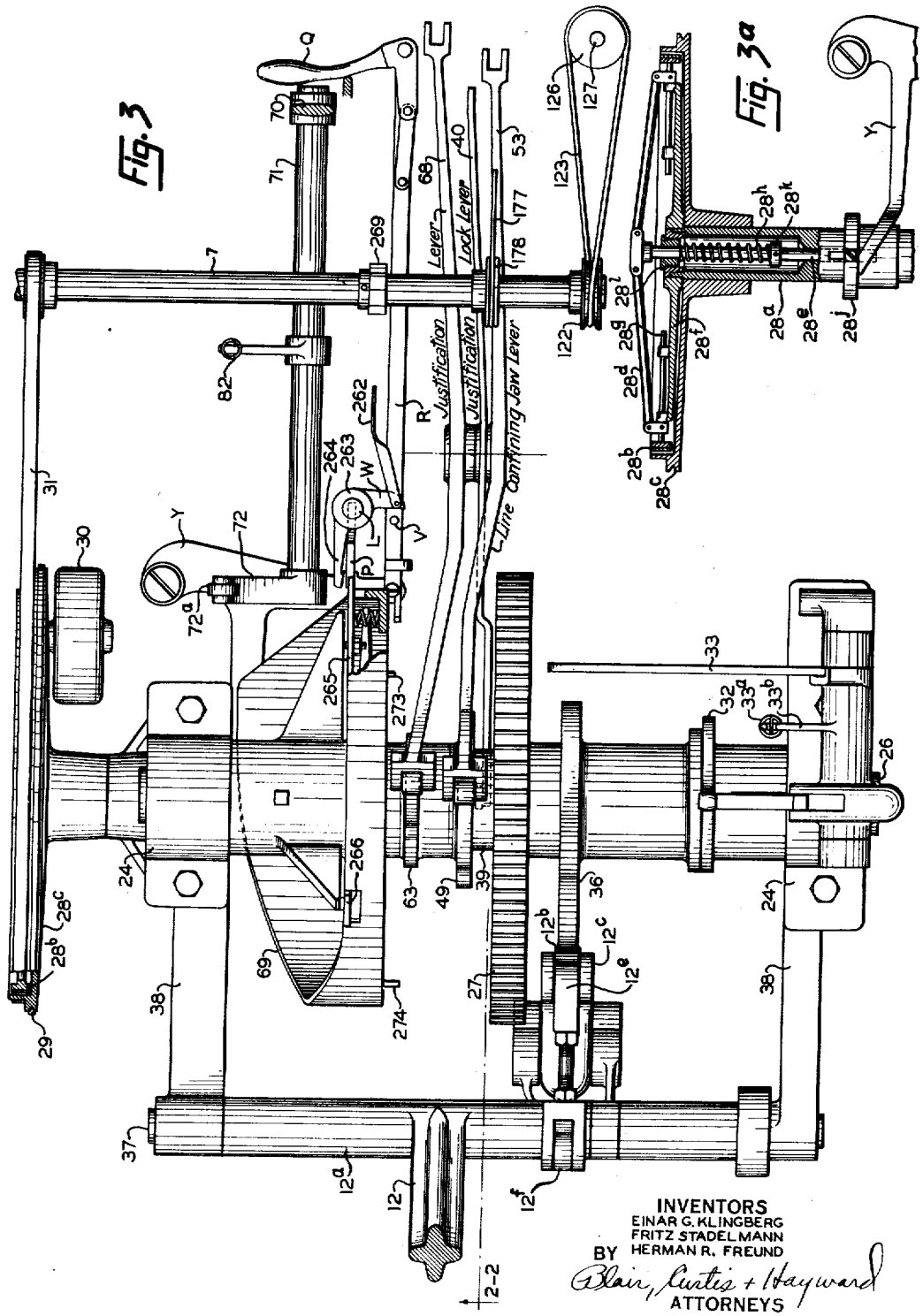

Dec. 18, 1945. E. G. KLINGBERG ET AL 2,391,021
APPARATUS FOR PHOTOGRAPHIC COMPOSITION
Filed July 24, 1942 15 Sheets-Sheet 6
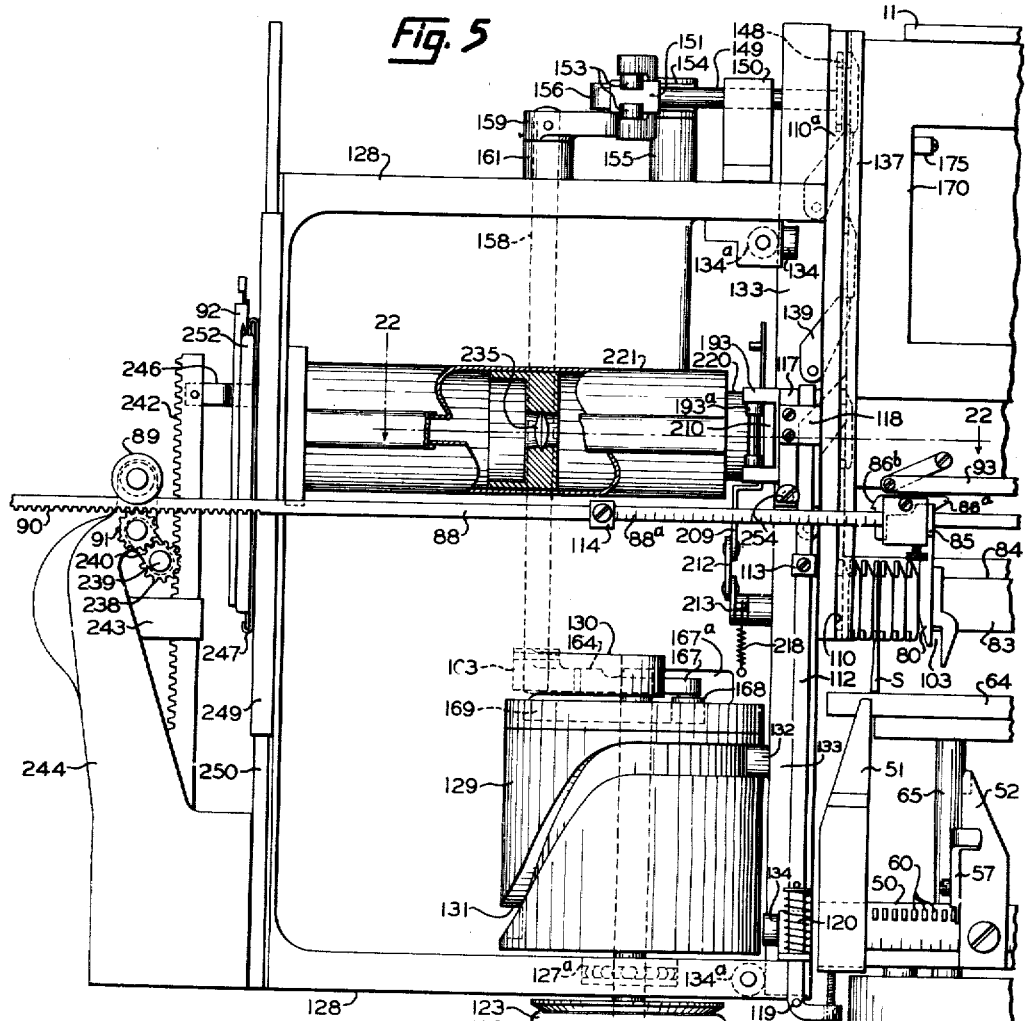
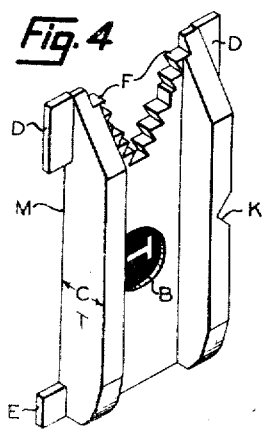
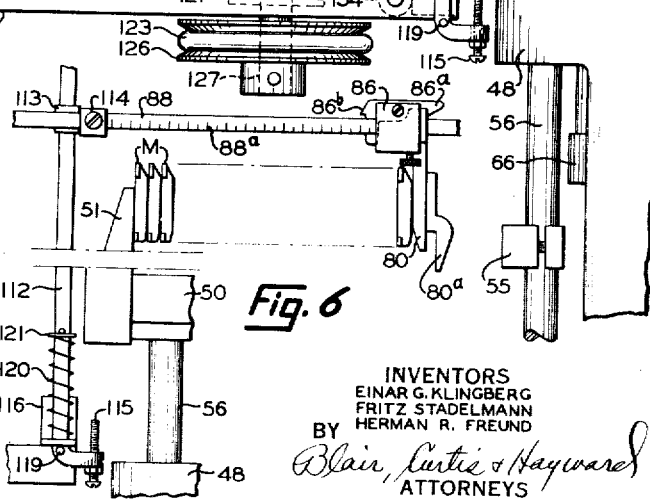
INVENTORS
EINAR G. KLINGBERG
FRITZ STADELMANN
HERMAN R. FREUND
BY Blair, Curtis & Hayward
ATTORNEYS

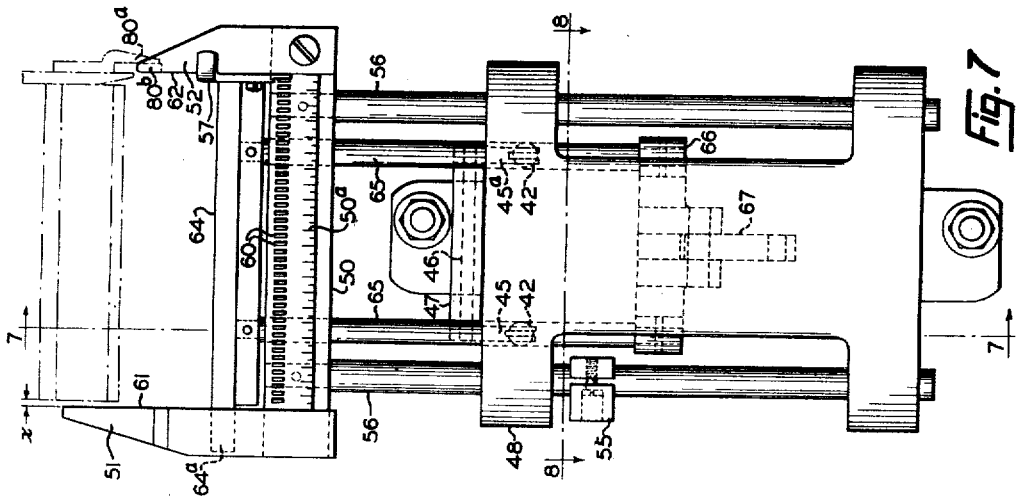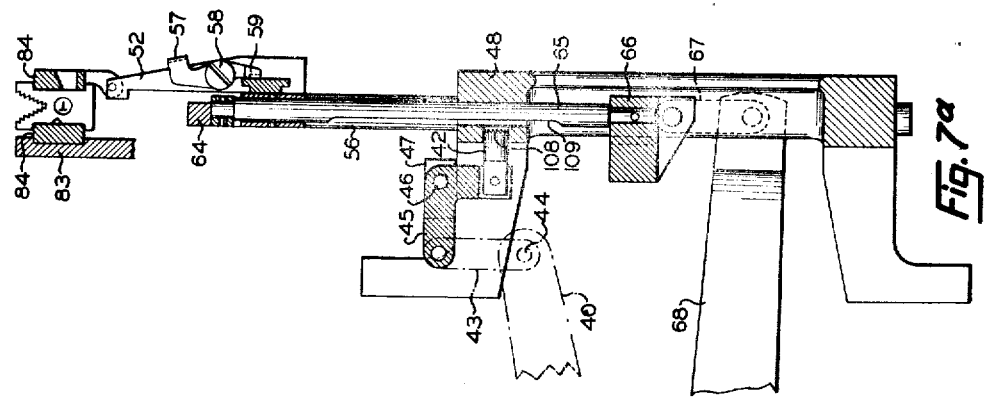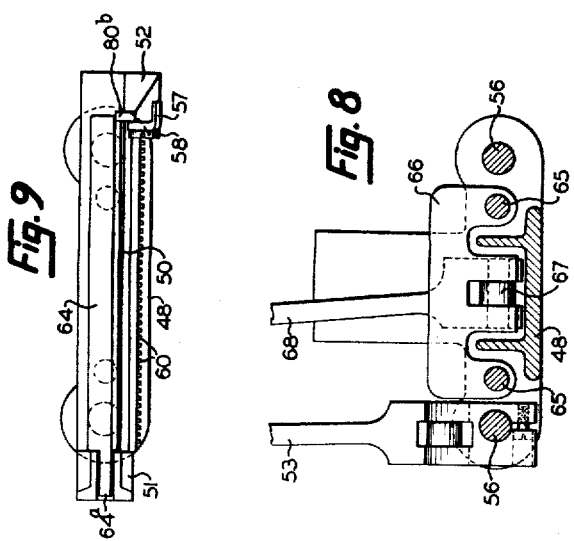

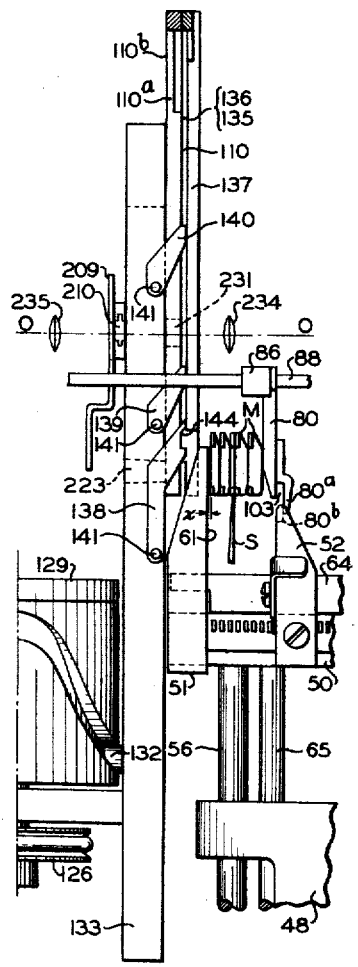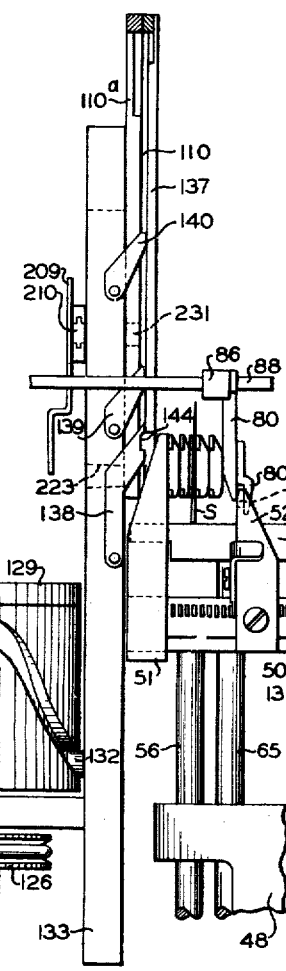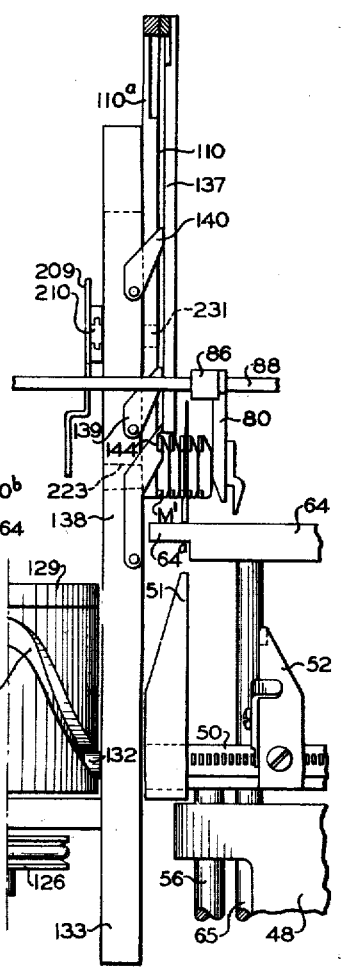

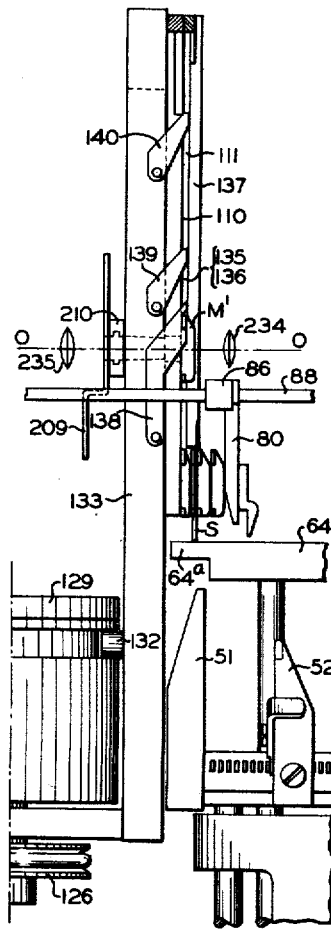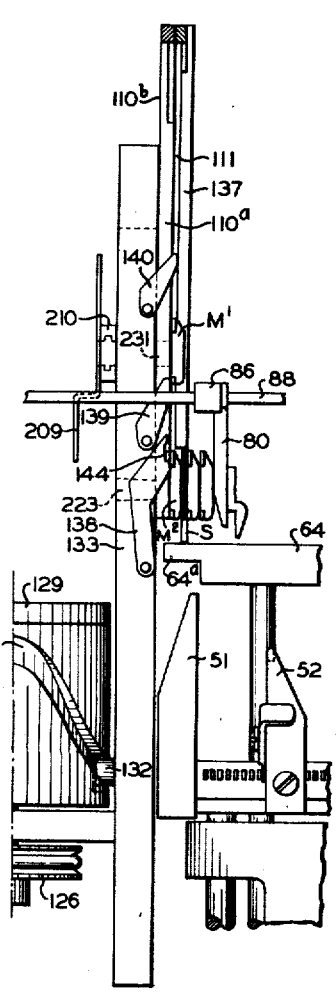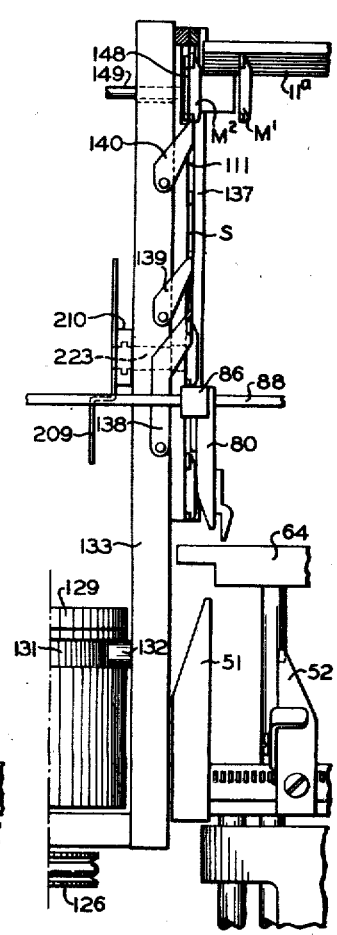

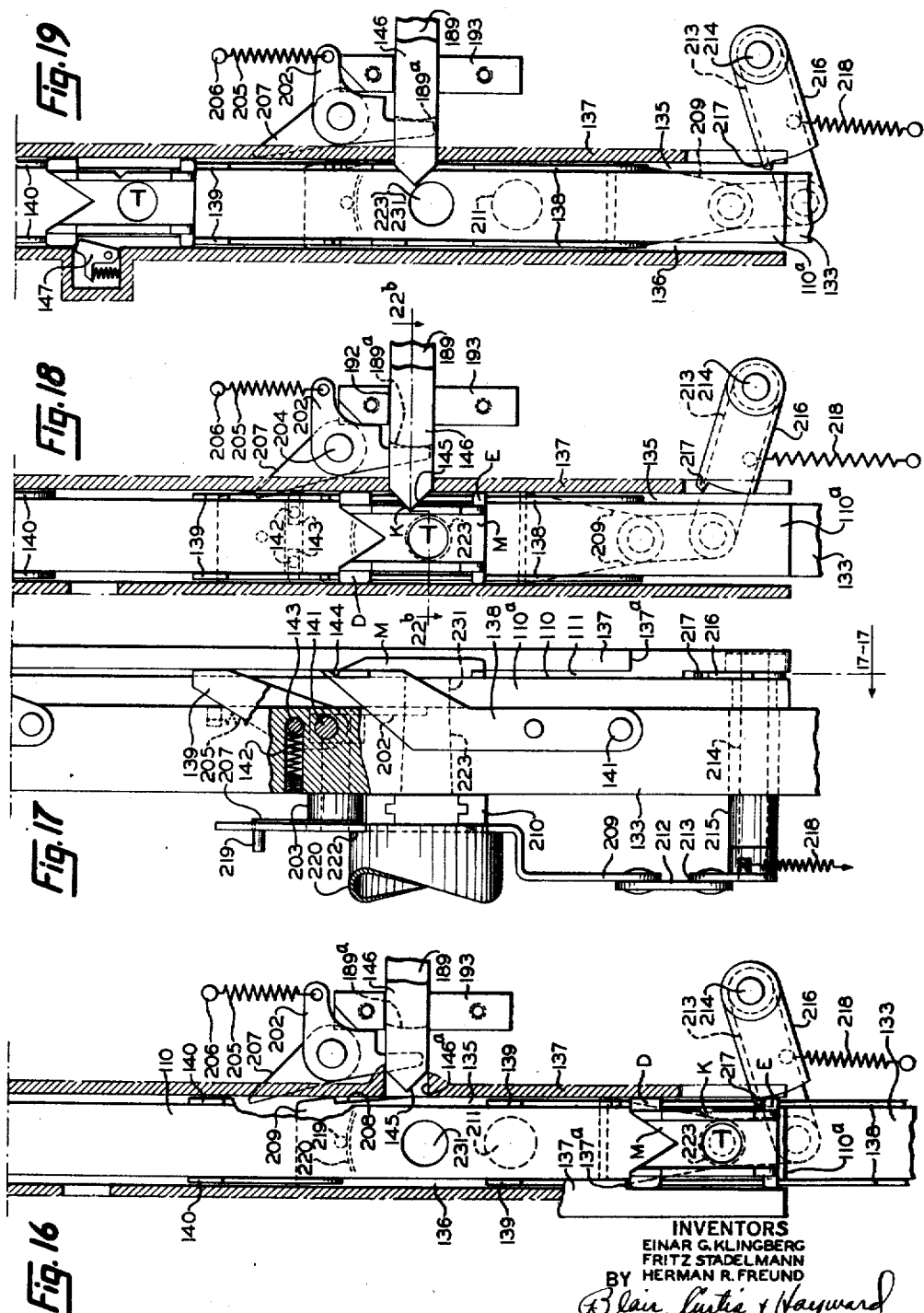

Dec. 18, 1945. E. G. KLINGBERG ET AL 2,391,021
APPARATUS FOR PHOTOGRAPHIC COMPOSITION
Filed July 24, 1942 15 Sheets-Sheet 11

INVENTORS
EINAR G. KLINGBERG
FRITZ STADELMANN
BY HERMAN R. FREUND
Blair, Curtis & Hayward
ATTORNEYS Dec. 18, 1945.  E. G. KLINGBERG ET AL  2,391,021
APPARATUS FOR PHOTOGRAPHIC COMPOSITION
Filed July 24, 1942  15 Sheets-Sheet 12

INVENTORS
EINAR G. KLINGBERG
FRITZ STADELMANN
BY HERMAN R. FREUND
ATTORNEYS

Dec. 18, 1945. E. G. KLINGBERG ET AL 2,391,021
APPARATUS FOR PHOTOGRAPHIC COMPOSITION
Filed July 24, 1942 15 Sheets-Sheet 13
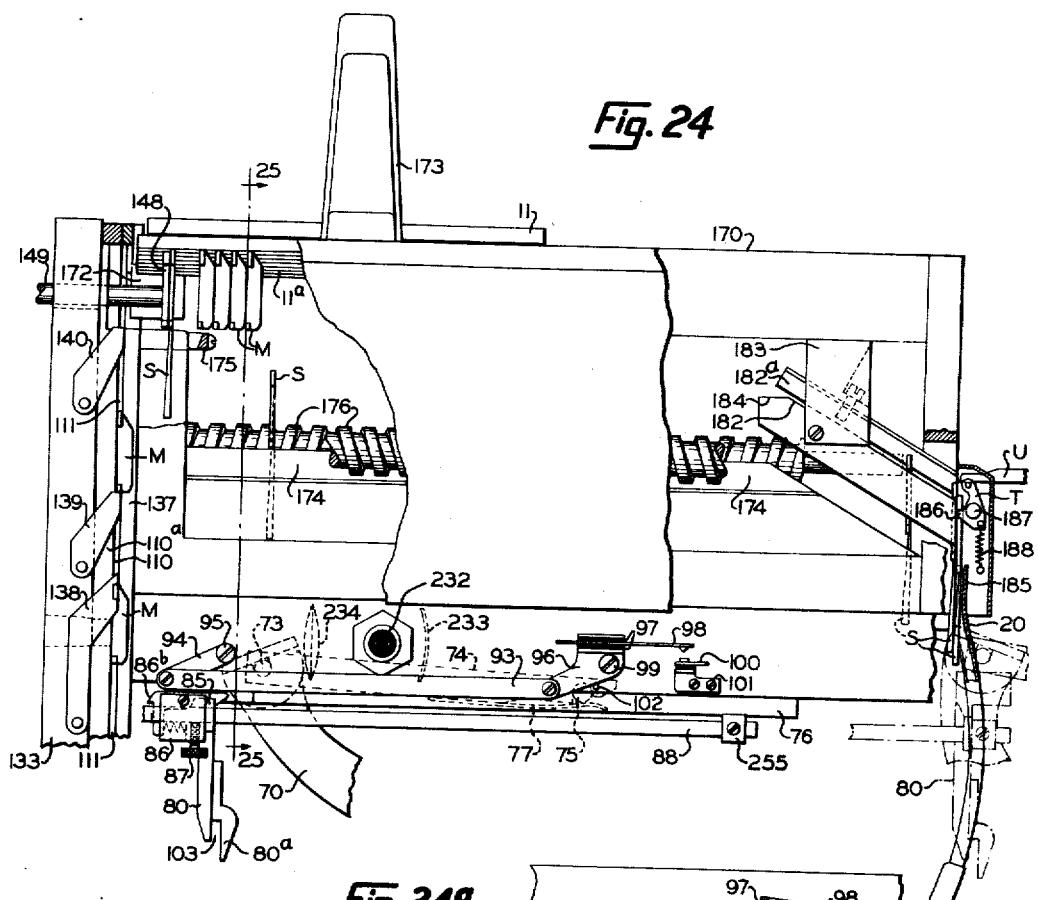
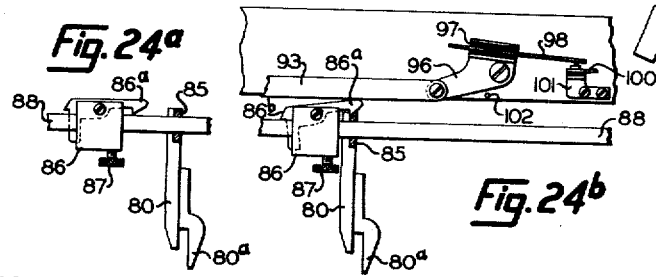
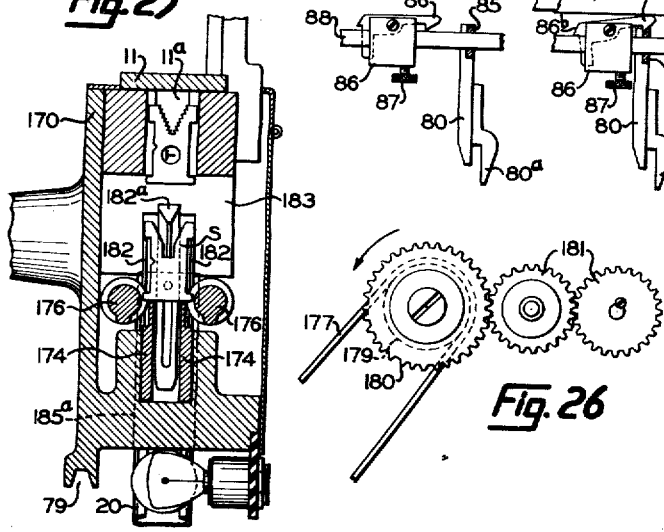
INVENTORS
EINAR G. KLINGBERG
FRITZ STADELMANN
BY HERMAN R. FREUND
ATTORNEYS

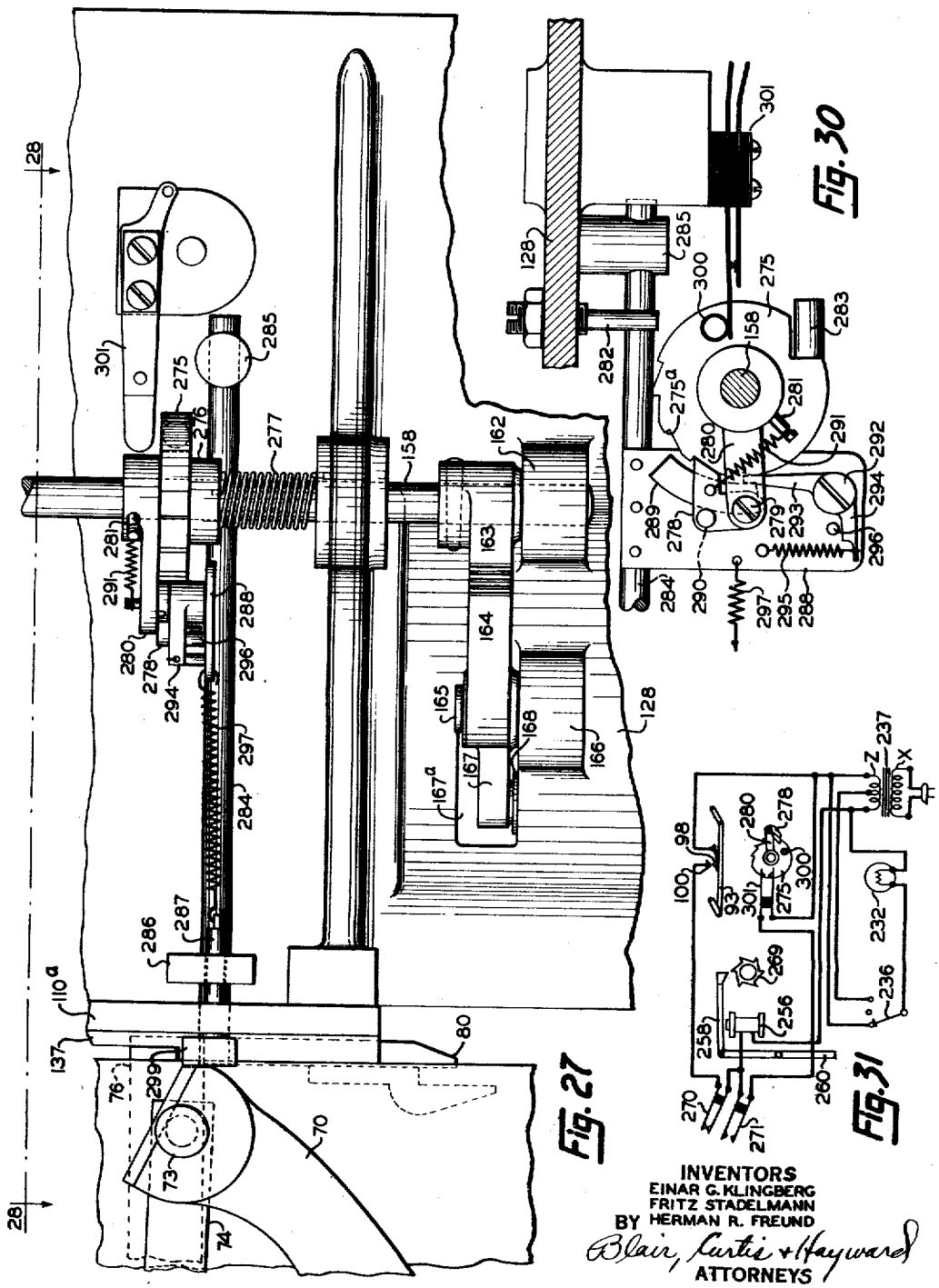

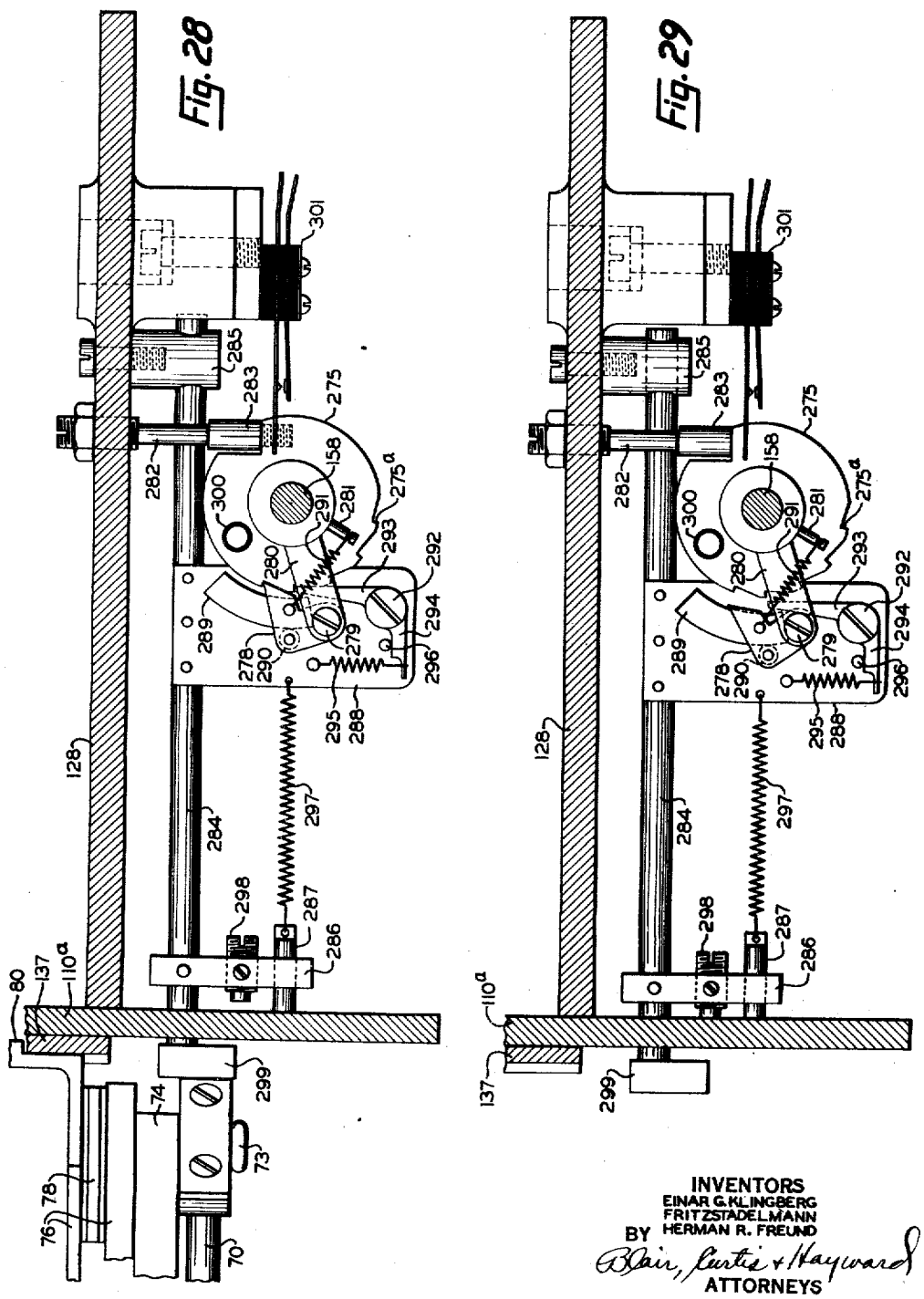

Patented Dec. 18, 1945

2,391,021

UNITED STATES PATENT OFFICE

2,391,021

APPARATUS FOR PHOTOGRAPHIC COMPOSITION

Einar G. Klingberg, Long Island City, Fritz Stadelmann, Valley Stream, and Herman R. Freund, Brooklyn, N. Y., assignors to Intertype Corporation, Brooklyn, N. Y., a corporation of New York Application July 24, 1942, Serial No. 452,248

73 Claims. (Cl. 95—4.5)

This invention relates to an apparatus for photographically producing type matter for printing processes for offset intaglio and gravure printing, and more particularly to an improved apparatus for producing lines of type matter photographically by reproducing the characters borne by suitable individual character-bearing elements composed into a line.

Among the many objects of the invention are the following: to provide a photo-composing machine embodying improved method and apparatus for producing justified lines of type matter; to provide improved means for automatically manipulating a composed line of individual character-bearing elements to effect line justification; to provide improved means for subsequently presenting the characters of the respective elements for photographic exposure; to provide improved means for automatically controlling the sensitized surface to obtain the photographic impressions of the characters in a justified relation corresponding to their spaced relation as brought about by justification of the composed line of elements before photographic reproduction; to provide improved means for automatically controlling light shutters and timing devices in connection with the photographing operation; and to provide improved means for automatically discharging the elements after photographing.

Other objects will be in part obvious and in part pointed out hereinafter.

In the present embodiment, elements or matrices are used carrying a photographable character disposed in a plane parallel to a flat or broad side of the matrix body, and the thickness of the matrix body is made equal to or proportional to the setwise width of the character borne by the matrix body. The matrices disclosed are similar in outline to the matrices used in commercial line casting machines and the magazine for storing fonts of the matrices, the devices for releasing the matrices from the magazine and for composing them into lines, and the devices for directing them back into the magazine are much the same as those used in typographical line casting machines of the general class shown and described in United States Patent No. 436,532, dated September 16, 1890.

Also, in the present embodiment, after the line is composed, it is transferred to justifying mechanism which operates to expand spacebands of well known form inserted between the words in the line to cause the composed line to expand to a predetermined length. Thereafter the elements of the justified line are moved one after the other into a photographing position where the character of each is photographed as the elements are successively presented at the photographing position.

After the elements of the composed line are photographed they are automatically discharged from the photographing mechanism and distributed to the magazine from which they were taken, and after completion of the photographing operation the parts of the mechanism comprising the justifying means, the means for moving the composed line of elements, and the photographing means are all returned to a starting position.

The foregoing and other objects will be described hereinafter in detail in connection with the accompanying drawings which illustrate one embodiment of the invention. Obviously the form and arrangement of parts and their mode of operation, and the type and arrangement of the machine which embodies the invention may be varied in many ways without departure from the spirit of the invention. It is therefore to be understood that the invention is limited only in so far as expressed in the claims.

In the drawings:

Figure 1 is a front elevation of a machine embodying the invention for photographically producing matter for printing purposes.

Figure 1a is an enlarged fragmentary section on the line 1—1 in Figure 1.

Figure 1b is a plan view in section showing the relation of the matrix of the invention to the separating blade in the usual distributor box.

Figure 1c is a front perspective view of the machine of Figure 1.

Figure 1d is a detail perspective drawing similar to that of Figure 1c but showing the composed line of elements in the process of being transferred from the composing mechanism to the mechanism which automatically justifies the composed line and thereafter photographs each element.

Figure 2 is a partial side elevation taken on line 2—2 of Figure 3 of the machine shown in Figure 1 illustrating the principal driving cams and levers and associated elements including the clutch tripping relay.

Figure 2a is a fragmentary view on an enlarged scale of switches for causing intermittent operation of the main drive.

Figure 3 is a top plan view looking down on the machine from the left end in Figure 1 and showing the arrangement of the main cams and levers relative to the main cam shaft, and showing the connections for driving the machine.

Figure 3a is a detail showing of clutch mechanism shown in Figure 3.

Figure 4 shows a matrix such as may be employed.

Figure 5 is a front elevation on an enlarged scale of a portion at the left of the machine in Figure 1, the cover plate over such portion being removed to expose the parts within.

Figure 5a is a perspective right end elevation on a reduced scale of certain element feeding and photographing mechanism.

Figure 6 is a detail view showing a stop cooperative with the line delivery finger and operative after justification to release the finger for advancing the line to the matrix displacement position.

Figure 7 is a front elevation of the justification member and line confining blocks and the supporting bracket therefor.

Figure 7a is a section on the line 7—7 in Figure 7 and shows in detail the locks for the justification bar.

Figure 8 is a section on the line 8—8 in Figure 7.

Figure 9 is a top plan view of the parts shown in Figure 7.

Figures 10 to 15 inclusive are front elevations showing different stages in the operation of the reciprocating matrix and spacer feed bar.

Figures 16 to 19 inclusive are fragmentary elevations showing different stages in the operation of certain shutters and illustrating also the devices for sustaining and locating matrices and spacers as they are fed upwardly through the guide channel, Figures 16, 18, and 19 being sections on line 17—17 of Figure 17. Note that the section lines of Figures 16, 18, and 19 are broken as indicated by dot-dash lines.

Figure 20:
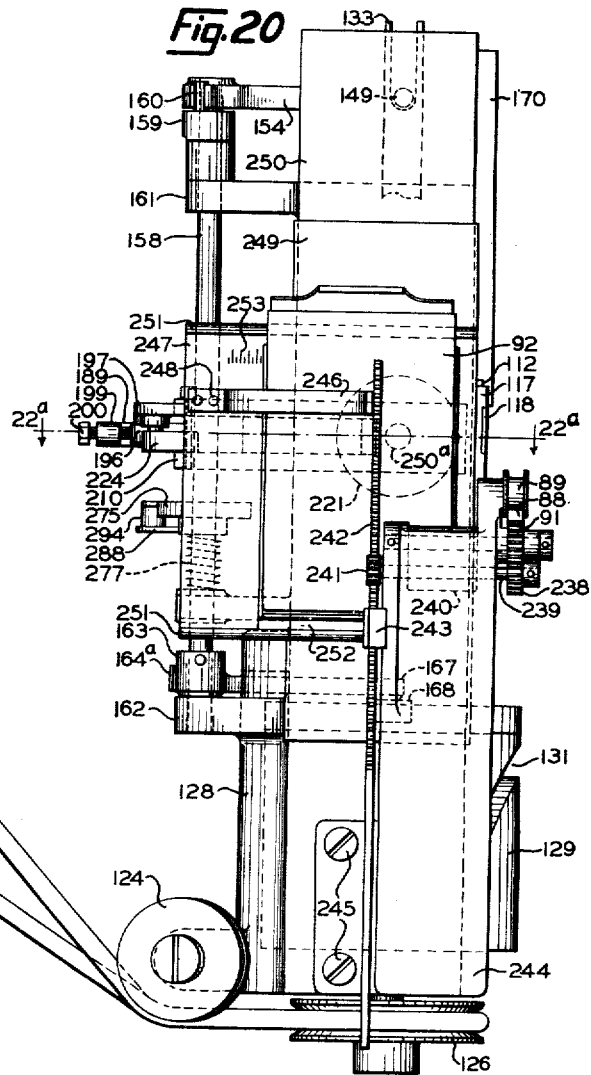

Figure 20 is a left-end elevation of the portion of the machine shown in Figure 5.

Figure 21:
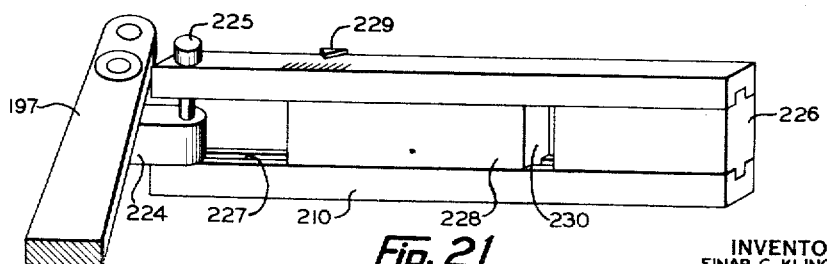

Figure 21 is a detail view of the exposure shutter.

Figure 22:
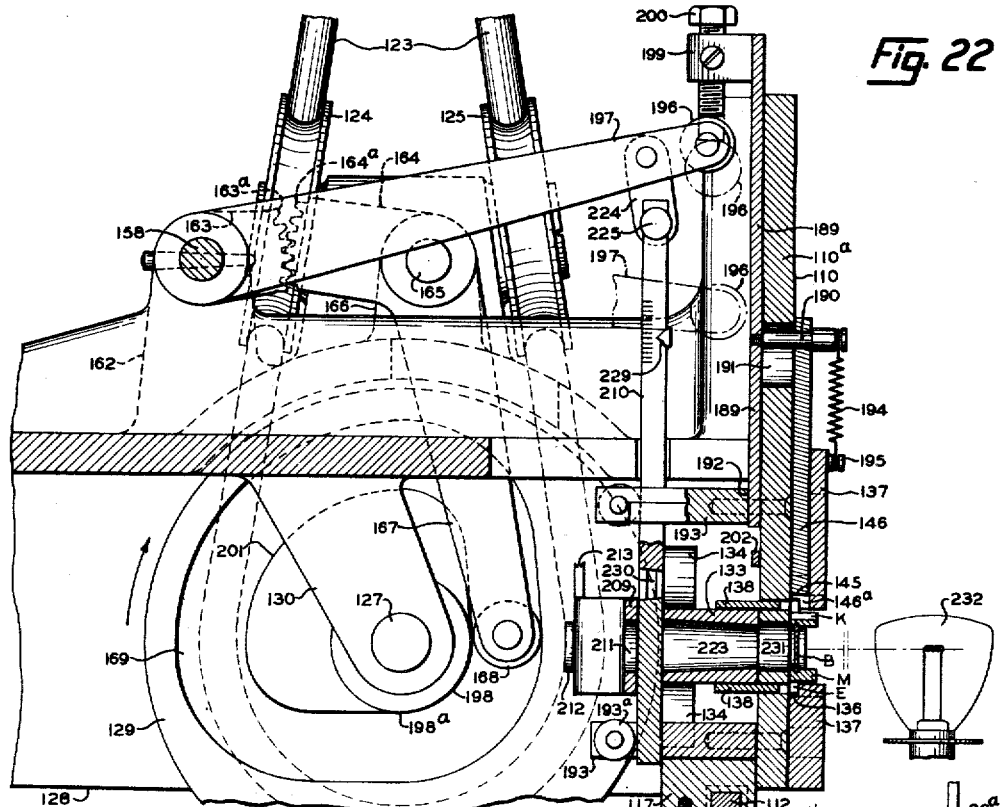

Figure 22 is a fragmentary plan view in section on the line 22—22 in Figure 5 or the line 22a—22a in Figure 20, or the line 22b—22b in Figure 18, but with the slide 146 retracted instead of extended as in Figure 18.

Figure 23:
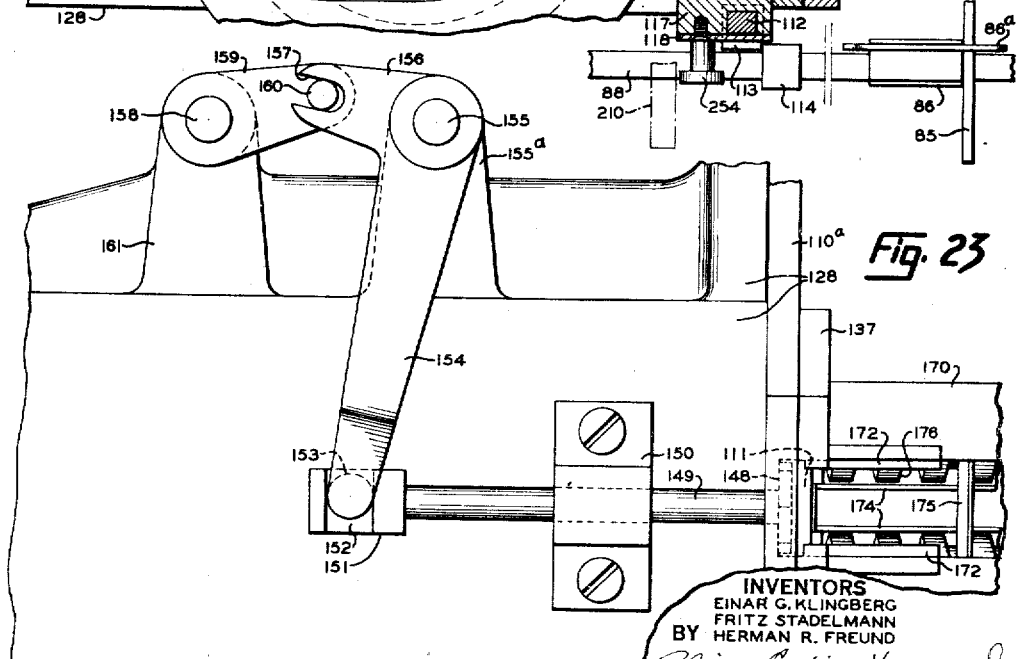

Figure 23 is a fragmentary plan view of parts at the top of the portion of the machine shown in Figure 5.

Figure 24 is a front elevation on an enlarged scale of a portion of the machine in Figure 1, the cover plate being broken away to show the spaceband distributing and storage mechanism and the second elevator in position for receiving matrices; also an auxiliary switch device serving to control the drive of the machine is shown.

Figure 24a is a detail view showing the line delivery finger partly advanced and prior to operating the switch device shown in Figure 24.

Figure 24b is a detail view showing the line delivery finger in position for operating the switch device shown in Figure 24.

Figure 25 is a sectional view taken on the line 25—25 in Figure 24.

Figure 26 is a detail view of the gears which drive the spaceband distributing screws.

Figure 27 is a fragmentary elevation from the rear of the portion of the machine shown in Figures 5 and 24 and shows the timing mechanism operated by the line delivery lever and controlling starting of the machine drive.

Figure 28 is a plan view in section taken on the line 28—28 in Figure 27 and shows in detail the timing mechanism shifted by the line delivery lever as in Figure 28 to the starting position in its operation after discharge of the last matrix in a line.

Figure 29 is similar to Figure 28 but shows the timing mechanism in normal or inactive position.

Figure 30 is a detail view showing the timing mechanism in Figures 28 and 29 at the completion of its operation wherein it closes a switch for starting the main drive of the machine.

Figure 31 is a circuit diagram.

Figure 32:
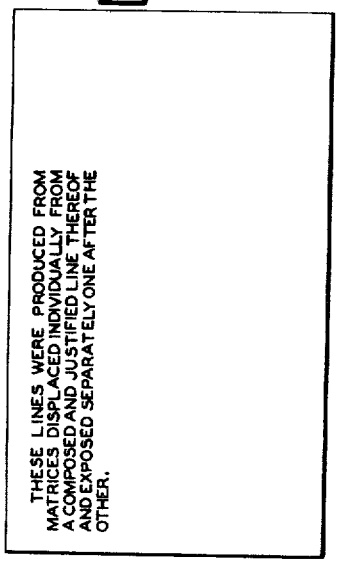

Figure 32 shows lines as produced in the machine of the invention on a piece of film.

General organization—Matrix storage, assembling, and distributing devices

As already pointed out, the invention is herein disclosed by way of example as applied to a machine equipped with the well known matrix storage, distributing, and assembling mechanisms such as employed in typographical composing and slug casting machines of the general class set forth in Letters Patent No. 436,532.

Thus, in Figure 1, the numeral 1 designates a magazine of the usual trapezoidal shape supported in a forwardly inclined position, as customary in machines of this class, and having shallow channels or grooves 2, shown in the broken away section, in the opposed inner faces of its parallel upper and lower plates for supporting edgewise between the plates columns of matrices. Each column is long enough to hold a supply of matrices of a given character and there are sufficient columns (usually ninety) to carry in the magazine a complete font of matrices which comprises such supply of each lower case and capital letter of the alphabet, the numerals, and the ordinary punctuation marks as to enable successive words and lines to be composed without waiting for redistribution back to the magazine of matrices used in making up preceding composed lines thereof.

Cooperating with the upper end of the magazine is a so-called channel entrance 3 provided internally with a series of vertically disposed partition plates 3a (Figure 1a) forming therebetween ninety passages leading to the respective channels 2 of the magazine. By suitable distributing and selecting mechanism the matrices are delivered to their respective channel entrances. This is accomplished in the usual manner by a key system. In this system a ribbed distributor bar 4 extends along the top of the channel entrance. The different ribs of the distributor bar 4 stop opposite the various channel entrances. The matrices hanging by their combination teeth from the distributor bar 4 (Figure 1a) are propelled along the distributor bar by means of rotating screws 5 between the threads of which the lugs on the matrices engage, and each matrix moves along until its key combination is reached, at which point it drops off from the distributor bar into its proper channel entrance. The means by which the matrices are delivered to this distributing mechanism will be described in a later part of this specification.

Matrices are drawn from the lower ends of the channels 2 at the lower end of the magazine. This is accomplished as follows: Finger keys 14a of a keyboard 14 (one key for each of the ninety channels) are adapted to release, when pressed, one matrix, which matrix falls by gravity through channels 13a in a so-called assembler front 13 to a downwardly inclined constantly running flat belt 15. The belt delivers each of the matrices to a common point for assembling in front of a rotating star wheel 16 which acts to flip the matrices to an upright posture and to push them sidewise leftward on to horizontal supporting rails 84a (Figure 1d) of a so-called assembling elevator 18 wherein they accumulate edgewise in line formation in the order of their release to form a composed line of elements.

During the composition of a line, spacers or expansible wedge spacebands S stored on suitable inclined rails, see Figures 24 and 25, may be released when needed (for example, as between words) by operating the spaceband key 19 at the left of the keyboard (a key connected to an escapement pawl at the lower end of a pair of storage rails as hereinafter described), the released spacers descending by gravity through a chute 20 whereby they are directed vertically in front of the rotating star wheel 16 which pushes them sidewise into the line of matrices being assembled on the rails 84a of the assembling elevator 18.

The matrices and spacebands

Referring to Figure 4, the matrix M is similar to that disclosed in the United States patent to Freund, No. 2,231,899, and will be seen to bear a general resemblance to the well known matrices employed in typographical machines of the class above mentioned for casting type bars or slugs. For present purposes, however, the matrices are provided with a photographable character such as the capital letter "T" on the matrix in Figure 4, such character being reproduced from an original drawing as a negative on a plaque such as a piece of film B. This plaque is secured in a suitable opening or recess in the matrix body within which it is retained in a suitable manner in a plane parallel to and between the flat or broad side faces of the matrix body and disposed at a given distance from one of such flat or broad faces of the matrix (the far face in Figure 4).

Such characters are placed recumbent relative to the height of the matrices rather than upright. As will appear in detail later, this construction of the matrices provides certain advantages. Thus, for example, since the matrices are successively removed from a composed line of elements and are each presented to a single photographing position for reproduction of the characters thereof on a film, it is possible to move the film downwardly in steps, while maintained in a vertical plane, to effect the photographic exposures of the successive elements in line on the film. The film may be mounted in a holder which itself is arranged to move in a vertical plane and drop in steps by gravity to effect the successive exposures in line formation.

The edgewise thickness of the matrix body (the dimension C in Figure 4) is equal or proportional to the setwise width of the particular letter or character on the film B, such thickness dimension of the matrix being used to determine the actual amount of movement of the film, or of the holder for it, after each individual exposure of a character. The manner of transmitting such movement to the film will also be fully explained later on in this specification.

As best seen in Figure 4, the matrices are provided with the usual upper and lower sets of lugs D and E, respectively, and with opposed combination distributing teeth F. It may be stated here that the lugs D and E on all the matrices in a font are alike in thickness (rather than variant as customary for typographical machines), the purpose being to enable using these lugs for guiding the matrices of all thicknesses upwardly through a vertical guide channel of the feeding and photographing mechanism as hereinafter explained. Also, the uniform thickness of the lugs D and E enables all of the grooves 2 in the magazine plates to have the same rather than varying widths.

The upper lugs D also perform the usual functions of assisting in the distributing of the matrices to the storage magazine as is usual in typographical machines.

It may be pointed out at this time that the lugs D and E, all being of the same thickness on the matrices, serve an additional cooperating function during the transfer of the matrices from a line distributing elevator 11, 11a, 12 which carries the matrices collected thereon from a given line upwardly from the photographing mechanism to the distributing mechanism. Thus, the aforesaid elevator carries the line of used matrices up to the usual so-called distributor box 8 located at the top of the machine (Figures 1 and 1a) where the matrices are fed individually from the far end of the box 8 (right-hand end as viewed in Figure 1) into the threads of the screws 5 which convey the matrices along the ribbed bar 4. Such feeding of the matrices out of the right end of box 8 is accomplished by means of a vertically reciprocating matrix lifter finger (shown in the upper left corner of Figure 1 in dotted lines at 9), which lifter pushes upwardly on the bottom of the leading matrix in the distributor box 8 and forces such matrix upwardly into the opening end of the threads on the rotating screws 5, the screws turning in proper timed relation to admit the matrix into the threads and a pusher 33, 34, 35 pushing on the other end (left end) of the line of matrices on the elevator bar 11, 11a, serving to advance the matrices to the lifter 9 until all of them are fed into the screws.

To prevent more than one matrix at a time being raised by the lifter 9, a separating blade G is provided (Figure 1b) to overlie the matrix to the left of the leading matrix in the box 8 but not to overlie the leading matrix. Thus, as the leading matrix is pushed upwardly, the following matrix is held back by the separating blade G. By making the lugs D all of a given thickness it will be seen that the left-hand flat face J of each leading matrix will just pass the right-hand end of the separating blade G as such leading matrix is lifted.

The notch K in the rear vertical edge of the matrix has the purpose of momentarily retaining and accurately locating the matrix in photographing position (with the character on the optical axis) in the vertical guide channel of the feeding and photographing mechanism. The location of this notch in the matrix body bears a definite relation to the point of intersection of convenient and arbitrarily chosen horizontal and vertical base or foundation lines relative to which all characters are commonly located on the plaque B. In other words, such lines constitute the basis of the system employed in establishing the location of characters.

The spacebands S as herein employed, Figures 24 and 25, are of the well known expansible or two-part sliding wedge construction, the upper or so-called "sleeve" member, however, differing from the ordinary spaceband in that it has the same configuration as a matrix, that is, upper and lower lugs and also has the aforementioned notch K, but it is devoid as usual of the combination distributing teeth such as provided on matrices. The spacebands are stored as in the usual typographical line casting machines and are also released in well known manner for line composition. As is well known, the spacebands are inserted between words as required and when expanded by an upward stroke of the justification bar of the machine they serve to spread or justify the matrix lines (by expanding the spaces between the words) to a desired or predetermined length, the depending wedge member being driven upwardly until the line is made tight between suitable end clamps or jaws.

Machine framework and drive

Referring to Figures 1 and 2, the machine is supported on a pedestal or base 21 upon which is erected the principal rigid framework members such as the vertical column 22, a face plate 23, cam shaft supporting brackets 24, and distributor and magazine supporting brackets 25. The main cam shaft 26 is horizontal and is carried by suitable bearings in the supporting brackets 24. The main cam shaft 26 is driven by a gear wheel 27 secured thereto and constantly coupled with a pinion gear 28 (Figure 1) secured to a hollow shaft 28a. Referring to Figures 3 and 3a, the pinion 28 (not here indicated but located vertically below the axis of gear wheel 27) and so the shaft 26 is driven (started and stopped) by means of a suitable clutch mechanism such as is generally provided on typographical machines. This clutch mechanism includes a constantly driven pulley 28c freely mounted on the hollow shaft 28a. Also mounted on the shaft 28a but rigidly secured thereto is a support 28f carrying slide rods 28g on the outer ends of which are mounted friction blocks or clutch shoes 28b. The slide rods are caused to move out against an inner friction surface of the pulley 28c to positively engage the pulley 28c, thereby to transmit rotation to the shaft 28a, the rods and their brake shoes being operated by toggle mechanism 28d connected to an axially slidable rod 28e within the hollow shaft 28a. The rod 28e is urged inwardly by a spring 28h to hold the clutch shoes in driving position, spring 28h being located between a collar 28k on the slidable rod 28e and a stationary but adjustable clutch tensioning plug or nut 28l threaded in the end of hollow shaft 28a. The clutch is released by means of a clutch operating arm Y pushing on a collar 28j freely slidable on the shaft 28a and connected as by a pin to the inner slidable rod 28e. Thus, when the clutch operating arm Y is moved clockwise, as shown in Figure 3, the clutch is held released against the tension of spring 28h.

The pulley 28c is constantly driven by means of a V-belt 29 and a motor 30. The pulley 28c has a flange formed on the outer side thereof and through a belt 31 drives an intermediate shaft 7 which, being constantly driven, keeps the main distributor, the keyboard 14, the assembly belt 15, and star wheel 16 in operation, except, of course, when the driving motor 30 is shut off or an auxiliary clutch for the assembling parts is thrown out.

Also as will later be seen, the drive for certain parts concerned with the matrix displacement, feeding, and photographing devices, and with the distribution of spacebands, is taken from the intermediate shaft 7. However, except for these latter devices driven from the intermediate shaft, the general arrangement of the driving mechanism and the main clutch for connecting and disconnecting the driving motor relative to the main cam shaft is similar to that long in use for typographical machines of the class hereinabove referred to.

Main cams and their functions

Referring to Figures 2 and 3, the main cam shaft carries a number of cams for operating different parts of the machine. Thus the usual distributor shifter cam 32 is provided, such as is usual in typographical machines, to oscillate a distributor shifter lever 33 and through a link 35 to reciprocate the shifter slide 34, see Figure 1, to the right and left as required, thereby to shift a line of used matrices off the elevator 11 onto the distributor box 8 of the usual distributing mechanism. Also there is provided an elevator cam 36 which raises and lowers the outer end of the lever 12 carrying the elevator 11 to raise the elevator with its matrices to be redistributed and to lower the elevator to receive matrices as they are discharged from the matrix feeding and photographing mechanism as will be described.

There are also provided a number of other cams. Thus, referring to Figures 2 and 3, a so-called delivery cam 69 is provided which operates a line delivery lever 70 (see also Figures 1c and 1d) which serves to move the composed line of elements from the assembling elevator 18 to justifying position and thence to the matrix removing and photographing mechanism. A line confining cam 49 is provided which operates a cross-bar 50 carrying vertically movable blocks or jaws between which blocks the line of composed elements, transferred from the assembling elevator 18, is expanded to justify the line. There is also provided a justification cam 63 which operates a justification lever 68 to raise a justification table or spaceband driver bar 64 which pushes upwardly on the depending wedges of the spacebands of a composed line thereby to expand the line to its full length between the raised blocks. Then there is also provided a justification locking cam 39 which operates a lever 40 to hold the justification table in its raised position and thus maintain the elements of the composed line in justified relation during the feeding of the elements to the element removing means under the influence of the line delivery lever 70. As will be pointed out, the operation of the line delivery lever 70 also carries out certain cyclic functions such as starting certain of the cam mechanisms into action at different parts of a cycle of operation of the machine.

Outline of various stages of operation

Referring to Figures 1, 1c, and 1d, the cams just identified and other switch mechanisms operate automatically to take a composed line of elements from the assembling elevator 18 of the usual line composing machine to a justifying position where the line is automatically justified by expanding it to a predetermined length by means of the spacebands. After justification, the line of elements is automatically advanced to a position where element removing mechanism removes elements one by one from the leading end of the line and transfers them individually to a photographing position where their characters are photographed and thence moves each photographed element to a discharge position where it is discharged on to the lowered distributing elevator 11. Between the successive photographing operations the film on which the photographic reproductions are made is advanced in steps amounts proportioned to the thickness of the element next to be photographed. After thus receiving the photographic impressions of all of the characters in a line, the film is automatically returned to the left marginal starting position, and may then be advanced to expose a fresh area for the following line, so that each composed line of elements in passing through the machine results in the production of a line of type matter with successive lines in column formation.

A cycle of operation of the machine is completed for each composed line of elements and the steps of the cycle are carried out as follows:

1. Referring to Figures 1c and 1d, the cycle is started by manually raising the assembling elevator 18, with its composed line of elements, from its normal line assembling position in Figure 1c to the raised line delivery position in Figure 1d. The raising of the elevator rocks a pivoted latch 81 holding the line delivery lever 70 in starting position where it has been placed by means of cam 69 at the end of the last preceding cycle, and releases the line delivery lever.

2. Referring to Figures 1 and 1d, the line delivery lever 70, when released from the latch 81, operates under the influence of a spring to move the composed line of elements endwise from the assembling elevator 18 leftward into the justifying position. During such movement of lever 70 a forwardly extending arm 85 positively connected with the lever 70 engages and locks with a block 86 previously set at a definite line measure position along a rack 88 which is connected by positive rack and gear connections with the film supporting and moving means. Figure 1c shows the assembling elevator 18 with a composed line in it and ready to be raised, and Figure 1d shows the elevator 18 fully raised with the lever 70 unlatched and in the process of moving the composed line of elements leftward to the justifying position.

3. Simultaneously with the arm 85 on lever 70 engaging the block 86 of the film moving rack 88, the transfer of the composed line of elements to the justifying position is completed and the arm 85 operates a switch which acts to cause the main driving clutch to connect with the main cam shaft, and to cause release of the main cam shaft to permit it to be rotated through approximately 150° of rotation.

4. This 150° of rotation accomplishes the following operations:

(a) The line confining cam 49 raises the crossbar and so-called line confining blocks thereon into position for embracing the opposite ends of the transferred line of elements during justification.

(b) The justifying cam 63 raises the justification table 64 to carry out the line expanding or justifying action by pushing upwardly on the depending wedges of the spacebands.

(c) The justification locking cam 39 operates to lock the justification table in its elevated position, thereby to maintain the expanded condition of the spacebands until in a subsequent operation all of the matrices in a given line have been delivered to the photographing mechanism.

(d) The line confining cam 49 operates to lower the confining blocks out of the path of the composed justified line of elements and simultaneously releases a stop to free the film moving rack and line delivery lever to permit advance of the elements of the line forwardly to a feed channel under the pushing influence of the line delivery lever.

(e) Simultaneously with the actions just stated, a latch is actuated which acts to throw out the main clutch and thus disengage the main drive shaft from the cam shaft, and a stop then automatically intervenes to stop the rotation of the cam shaft after the 150° of rotation.

5. Reciprocating mechanism steps the successive leading elements of the line, now being urged forwardly by the line delivery lever 70 along the feed channel, to photographing position where they are successively photographed and thence moves them along the feed channel to a discharging position where they are automatically discharged onto the elevator 11. During this time the forward urge of the line delivery lever 70 against the line keeps the remaining elements in compacted condition after each displacement of a leading element, and as the elements are successively removed the line delivery lever 70 advances and the film moving rack 88 advances with it amounts proportioned to the thicknesses of the successively removed elements.

6. Shutter mechanism is automatically operated at the start of the element removing operation to condition the photographing mechanism for photographing.

7. Removal of the last matrix from the line sets in motion a delayed action switch which, after the last matrix is cleared from the feed channel, operates to cause the main clutch to connect the main cam shaft and the drive shaft and to release a stop to permit the main cam shaft to operate through approximately 210° of rotation, which rotation accomplishes the following:

(a) The distributing elevator 11 (Figure 1) is raised from its lowered position for receiving the elements discharged from the feed channel to its elevated position adjacent the distributor box 8, and the line shifting lever 33 operates to push the matrices endwise to the right from the elevator 11 into the box 8.

(b) Cam 39 releases the justifying table which drops to its lowermost position.

(c) Cam 49 raises the line confining jaws or blocks to starting position where one of the blocks stands in the path of delivery to justifying position of the next succeeding line of composed elements.

(d) The cam 69 moves the line delivery lever 70 back to its starting position and this lever, during such movement, simultaneously brings about movement of the film moving rack 88 back to its starting position where both are locked.

(e) At the end of 210° of rotation, a stop operates automatically to release the main clutch to disengage the drive shaft from the cam shaft, and to stop the cam shaft so that all of the parts at the end of the cycle are stopped and retained at these positions for the next succeeding cycle.

*Line delivery*

The description immediately following is directed to the line delivery mechanism for delivering the composed line of matrices from the assembling elevator 18 to the justifying position, and subsequently, after justification, to the matrix removing and photographing mechanism. The line delivery lever 70, Figures 1, 1c, 1d, 2, and 3, is mounted on the forward end of a shaft 71 and extends upwardly therefrom, as best shown in Figure 3. The rearward end of the shaft 71 carries a short arm 72 carrying at its free end a roller 72a adapted to ride on the operating side face of the line delivery cam 69. A spring 82 serves to urge the shaft 71 and the lever 70 always in a counterclockwise direction, as viewed in Figure 1c, and so serves always to urge the roller 72a toward the operating surface of the cam 69. The cam in rotating clockwise, as indicated in Figure 2, serves to rock the shaft 71 and the lever 70 to starting position which is at the right, as shown by dot-dash lines in Figure 24 and in full lines in Figure 1c.

When the lever 70 is thus moved clockwise to its starting position by the cam 69, the latch 81 (Figures 1 and 1c), which is of the usual construction used in typographical machines of the line casting type, normally locks the line delivery lever 70 in its starting position (the position shown in Figure 1c) against the action of the spring 82. In Figure 3, the lever 70 is shown in its locked position, to which position it has been moved by the high part of cam 69. But also as shown in Figure 3 the cam 69, after thus positioning lever 70, has rotated to and been stopped at a position in which its valley section is opposite roller 72a, so as to permit the lever 70 to move counterclockwise upon release of the latch 81. This is the normal position of the parts at the commencement of a cycle.

The upper end of the lever 70 (Figure 1d) is recessed to receive a pin 73 fixed in the left end of the delivery lever link 74 which at its other end (Figure 24) is formed with an open notch so as to releasably receive a pin 75 fixed in the horizontally disposed line delivery slide bars 76. A flat spring 77 allows said pin to free or release itself from connection with the link 74 in the event that the leftward or line delivery movement of the slide by lever 70 is obstructed. As shown in Figure 1c, there are two slide bars 76 secured together in parallel relation as usual at suitable points, and fixed to sliding supporting blocks 78 (see Figure 1d) which slidably guide the bars in suitable upper and lower tracks 79 (Figure 2) supported by the rigid face plate 23 of the machine framework. Secured to and extending downwardly from the left supporting block 78 is a line delivery finger 80 which, as will be described, is adapted to push against the rearmost matrix of a composed line of matrices to deliver the matrices from the assembling elevator to the justifying position and thence to the matrix or element removing mechanism.

The latch 81, which engages one of the delivery slide bars 76 to latch the lever 70 in its starting position, is automatically moved to unlatching position by the rising of the assembling elevator when the latter is manually raised after the line of elements is composed (Figure 1d).

Referring to Figure 1d, the matrices comprising the composed line stand upright in the assembling elevator 18 with their lower lugs resting on suitable horizontal front and back rails 84a along the inner opposed walls of the elevator 18. When the elevator is raised to its upper or line delivery position, the matrices pass from the rails 84a onto similar horizontal front and back rails 84 in the justification channel 83 (see Figure 7a), the matrices hanging by their upper ears on the rails 84 and the rail 84 on the back wall of this channel being just wide enough vertically to fill in the space between the upper and lower ears on the rear edge of the matrices, thus to hold the latter firmly against upward movement during the justifying operations. In other words, when the assembling elevator 18 is raised, the matrices may be pushed to the left and their lugs ride from the assembling elevator rails 84a onto the justification channel rails 84. As above pointed out, simultaneously with the raising of the assembling elevator 18 to its uppermost position, the latch 81 is tripped and as a result, the line delivery lever 70 under the influence of its charged spring 82 pulls the link 74, the slide bars 76, and the supporting blocks 78 to the left, thereby causing the line delivery finger 80 to move the matrices and spacebands to the left along the rails as just described.

Finger 80 has depending therefrom a lug 80a (Figures 1c and 7). As the finger 80 under the influence of lever 70 moves the line of elements to the left, the depending lug 80a finally engages and is stopped by a projection 80b (Figure 1c) extending rearward from the upper end of the line confining block or jaw 52. This jaw or block 52 has previously, and at the end of the last preceding cycle, been elevated to a normal or starting position in order to engage the lug 80a as it moves to the left. The position of the line of elements at the moment of this engagement is shown in dotted lines in Figure 7, which shows a line of elements in outline and the lug 80a and finger 80 stopped by the lug 80b on jaw 52.

It will be noted in Figure 7, and also in Figure 10, that the left or leading end of the line stands somewhat clear of the inner vertical face 61 of the opposed line confining jaw 51, this space $x$ as indicated in Figure 7 being the result of composing the line, as usual, a little shorter than the actual line measure desired, it being well understood that in so doing the expansion of the spacebands will, of course, absorb this space by spreading the composed line endwise until the elements are tight between the opposed jaws 51 and 52, or more accurately, between the inner face 61 of jaw 51 and the inner face of finger 80 which latter is backed up firmly by engagement of lug 80b in a notch or recess 103 in the lower end of finger 80.

As pointed out above, the line delivery finger 80 has extending forwardly therefrom an arm 85. This arm 85 is adapted automatically to lock with a block or rider 86 carried by a movable film moving rack 88. The latching is accomplished by means of a latch 86a pivoted on the rider and spring-pressed in a clockwise direction as shown in Figure 24. As the arm 85 approaches the rider 86, it lifts up the latch 86a, that is, it tilts it, and the latch rides over the arm 85 and locks with it. The normal, tilted, and locked positions, respectively, of latch 86a relative to the arm 85 are clearly shown in Figures 24a, 24b, and 24.

The rack 88 on which the rider 86 is mounted passes freely through a square hole or aperture 85a in the arm 85 and is also guided by flanges of a small wheel 89 which serves to retain teeth 90 on the underside of rack 88 in engagement with a gear 91 (Figures 1c and 20). The rack 88 and gear 91, as will later be seen, serve to move the film holder 92 in a step-by-step motion as matrices are removed from the line.

Thus simultaneously with the finger 80 becoming fixed relative to the jaw 52, it becomes fixed with respect to the rider 86, the rack 88, and the film holder 92.

It will be apparent that alignment must exist between the rider 86 and the right-hand confining jaw 52 in order that the lug 80a engage the projection 80b at the same instant and at the same relative position that the arm 85 engages the rider 86. The right-hand position of the jaw 52 is adjustable with respect to the jaw 51 and this adjustment determines the length of the justified line. Likewise, the position of the rider 86 along the rack 88 must coincide with or complement the position of the right-hand jaw 52.

But as shown in the drawings, provision is made for the right-hand jaw 52 to be adjusted relative to the line confining jaw 51 and for the rider 86 to be adjusted along the rack 88. These adjustments will be described in detail later.

*Starting of first part of cam shaft cycle*

As latch 86a is tilted, see Figure 24b, it raises an overlying switch operating bar 93 which is loosely attached at one end to a pendant 94 (Figure 1c) pivoted at 95 on a rigid part of the machine and loosely attached at the other end to a bracket 96 on which is mounted between insulators 97 a switch finger 98. Since bracket 96 is also pivoted as at 99 to a rigid part of the machine it will be seen that raising of bar 93 by latch 86a results in tilting the bracket 96 and thus swinging the switch finger 98 clockwise into contact with the companion switch member 100 which is mounted upon and insulated from a fixed bracket 101. A pin 102 serves as a stop for retaining the bar 93 normally at a horizontal level just clear of the latch 86a when not tilted. The purpose of the switch 98, 100 is to close an electric circuit through a mechanical relay which operates to release the cam shaft 26 by releasing the usual machine stopping pawl 265 (described later on) and to connect the main drive to the cam shaft 26, all simultaneously with the line delivery stroke of lever 70 which is stopped by the jaw 52. As above pointed out, the cam shaft 26 now turns through 150° after which it is automatically stopped by the intervention of another stopping pawl 266.

Referring to Figures 2 and 3, starting of the main cam shaft automatically is effected by a clutch operating relay, generally designated by the numeral 256, which is mounted on a suitable bracket 257 secured to a part of the machine frame. The armature arm of the relay is connected as by a finger 258a to an arm 258 loosely pivoted at 259 to the upper arm of a vertical lever 260 pivoted on a stud 261 in the machine frame, the lower arm of lever 260 being loosely connected by a link 262 to the usual so-called vertical starting lever, designated 263, which is commonly applied to commercial typographical machines. Lever 263 is tube-like in form and arranged to rotate through a small arc about a shaft L within it and on which is pivoted in a vertical plane the usual upper and lower pawls P and N which cooperate to throw the clutch shoes 28b into and out of action.

The lever 263 is normally oscillated by the action of the relay 256 just described, but under unusual conditions a control handle Q (Figure 1) in front of the machine may be operated to oscillate the lever 263 and start the cycle.

Referring to Figures 1, 2, and 31, and to the relay 256, the vertical lever 263 is automatically operated in the following manner: The closing of the switch 98, 100, by the arm 85 latching with the rider 86, energizes the coil of the relay 256 through a circuit which includes a transformer 237, the switch 98, 100, a switch 270, and the relay 256. Referring to Figure 2, the switch 270 is being held closed at this time by a pin 273 mounted on the cam 69, which is now at rest, and which pin automatically closed the switch 270 at the end of the last preceding cycle. Energizing of the relay results in pulling down the relay arm 258 against the tension of a suitable spring, as indicated, whereby a dog 268 on the outer end of arm 258 is thrown into the path of rotation of a toothed wheel 269 fixed on the constantly turning intermediate shaft 7. The vertical lever 260 is, of course, immediately rocked counterclockwise on its pivot 261 due to dog 268 being struck by a tooth on wheel 269 and the starting lever 263 is immediately turned by reason of its connection by link 262 to the lower arm of lever 260.

The lever 263 may be manually operated by the control handle Q (Figures 1 and 3) in the following manner: The control handle Q is connected to a horizontal slide bar R carrying a pin V which, when the bar is pulled forward, contacts an arm W of the lever 263 to turn the lever in the same direction to start the machine in which the action of the relay turns the lever 263.

The upper end of lever 263 has an arm 264 which, when the lever is turned by operating handle Q—manually or by the lever 260 through operation of the relay 256, swings counterclockwise into contact with the side face of the automatic stopping pawl 265 which is pivotally supported on a short shaft in usual yoke-like bearing arms formed in the web of the delivery cam 69, as clearly shown in Figures 2 and 3. The action of pawls 265 and 266 is well known in respect to typographical machines, said pawls projecting edgewise beyond the periphery of cam 69 and being spring-pressed (inwardly, as viewed in Figure 2) so that their projection normally aligns with the flat ledge 267 on the pawl P. The stopping pawl 265 in edgewise contact with the flat ledge 267 of pawl P, holds the pawl P in its most counterclockwise position and the pawl N in its corresponding position, in which latter position the pawl N acts on the forked clutch releasing lever Y to hold the clutch shoes 28b disengaged against the tension of spring 28h.

Now, when the lever 263 is oscillated, the arm 264 thereof immediately strikes against the side of pawl 265 and dislodges it from the ledge 267, thereby allowing the pawl N to pivot and release the forked clutch lever Y (spring 28h being the source of power) and to cause the clutch shoes 28b to engage and start rotation of the cam shaft 26.

It will be understood that relay 256 is energized only while switch 98, 100 remains closed and that this is only for the very brief interval that latch 86a is fully tilted as the arm 85 rides under it during the approach toward rider 86 of the delivery finger 80. Thus, no sooner does the cam shaft 26 start turning than relay 256 is deenergized, the armature arm being instantly pulled up by the spring acting on arm 258 without, however, moving or otherwise affecting lever 260. Deenergizing of the relay is not only the result of the opening of switch 98, 100 following its momentary closing by latch 86a, but also of the opening of the auxiliary switch 270 (see Figures 2 and 31) mounted on a bracket 272. Switch 270 is so disposed as to be held closed when in contact with a pin 273 in the side of cam 69 when the latter stands in normal or idle position as already pointed out in Figure 2. In this condition, and referring to Figure 3, the pawl 265 is in contact with and pushing down on the pawl P. Obviously, as soon as the cam shaft 26 starts to turn, the contacts of switch 270 open due to the turning of pin 273 from beneath the arm of the switch, thus breaking the electrical circuit to the relay 256.

The cam shaft, however, continues to turn until a pawl 266, like pawl 265, engages ledge 267 (about 150° of revolution) and rocks pawls P and N in a direction for disengaging clutch shoes 28b, thus simultaneously releasing the clutch and positively stopping the cam shaft at a position where a longer pin 274, located slightly closer to the center of the cam shaft 26, holds the contacts of a switch 271 closed (switch 270, of course, remaining open).

Operation of the cam shaft during the 150° first, raises the line confining blocks; second, raises the justifying table; third, locks the justifying table in position; and fourth, lowers the confining blocks 51 and 52. Also, the receding contour of cam 36 lowers the distributing elevator 11.

Line confining action

During the turning of the cam shaft 26 through these 150° of rotation (the direction is indicated by the arrow in Figure 2), the line confining cam 49 acts to raise the cross-bar 50 supporting left and right-hand line confining blocks 51 and 52. The cross-bar 50 itself is mounted on a pair of vertical rods 56 slidably guided in upper and lower bearings in a bracket 48 (Figures 7 and 8). It is to be noted, as previously described, the right-hand jaw 52 is made sufficiently shorter than the left-hand jaw 51 so that as the elements are transferred from the assembling elevator 18 to the justifying channel, the depending wedges of the spacebands clear the shorter jaw 52. But the left-hand jaw 51 extends far enough above the right-hand jaw to stop the elements of the composed line from sliding beyond the jaw 51.

Referring to Figure 2, the cam 49 raises the cross-bar by means of a line confining jaw lever 53 pivoted on the shaft 41. The forward end of the lever 53 is connected by a link 54 to a clamp 55 fixed on one of the vertical rods 56, on which the cross-bar 50 is mounted. A spring 53a acts to urge the rear arm of lever 53 downwardly so that a roller 53b carried thereon is caused to follow the contour of the cam 49 as the latter rotates.

With this construction, as the cam 49 turns from its starting position as shown in Figure 2 it immediately moves a valley portion of cam 49 beneath roller 53b whereby the lever 53 (under the influence of spring 53a) rocks on the shaft 41 and the forward arm of the lever raises the rods 56 and cross-bar 50. The jaw 52, in rising, moves into the notch 103 formed by the finger 80 and the lug 80a thereof (Figure 11). This action firmly locks the finger 80 and the jaw 52 together and converts the finger 80 into a rigid wall at the right end of the composed line of elements in the justifying channel. The finger 80 thus forms the right-hand wall against which the line of matrices is expanded during the justifying operation. The left-hand wall is provided by the block or jaw 51. Referring to Figure 11, this action, therefore, establishes left and right-hand walls on either side of the composed line of elements supported in the justifying channel 83. The distance separating the walls is accurately predetermined and constitutes the length to which the composed line of elements is to be justified, which, as shown in the present embodiment, is accomplished by expansion of the spacebands to expand the composed line of elements to fill the distance between the right and left-hand walls.

Whereas the left-hand jaw 51 is rigidly fixed with respect to the cross-bar 50, the right-hand jaw 52 is adjustably fixed with respect thereto. Thus the right-hand jaw 52 is adjustable along the cross-bar and relatively to the left-hand jaw 51 to determine the length of line desired. Adjustment of the jaw 52 is accomplished by means of a finger operated pawl 57 pivoted on the jaw at 58 (Figure 7a) and having a downward extension 59 engageable between teeth 60 arranged on the front face of the cross-bar 50 and spaced according to the em-scale 50a on the face of the cross-bar. By pressing inwardly on pawl 57 the jaw 52 is released from and slidable along the cross-bar 50 thus to provide a space between the inner opposed vertical faces 61 and 62 respectively on the left and right-hand jaws 51 and 52 suitable to the line length it may be desired to produce.

Since it is the inner face of finger 80 that serves as the right-hand wall against which the line is expanded, and since this face of the finger is offset from the jaw 52 when locked therewith, the em-scale 50a is also offset from the left jaw 52. Referring to Figure 1c the em-scale 88a for setting the rider 86 on the rack 88 is also offset to correspond to the em-scale 50a.

Justifying action

The justification action is accomplished by means of a spaceband driver 64 (Figures 1d, 2 and 3) which rises to push upwardly on the depending wedges of the spacebands. The spaceband driver 64 is fixed to the upper end of a pair of rods 65 slidable up and down in bearings in the bracket 48. Referring to Figure 7, the rods 65 are fixed at their lower ends in a bracket 66 to which is connected the upper end of a loosely pivoted link 67. The lower end of the link 67 is connected to the forward end of a justification lever 68 pivoted on the shaft 41 (Figures 2, 7, 7a, and 8). The rearward end of the justification lever 68 carries a roller 68b, and a spring 68a acts to urge the lever 68 downwardly so that its roller 68b will follow the contour of the justification cam 63.

Thus, as the cam shaft 26 continues its 150° of rotation, the lobe 104 on the justification cam 63 passes from under the roller 68b just after the jaws 51 and 52 have been raised to their uppermost position. As a result, the spring 68a, pulling downwardly on the rear of the justification lever 68, raises the spaceband driver bar 64 (Figure 11) against the depending wedges of the spacebands driving them upwardly to expand the spacebands as just described.

No sooner is this first upward thrust imparted by reason of the cam following roller 68b riding into the depression 105 of cam 63 than a second thrust is given the spaceband driver by means of the lobe 106 of the cam 63 and the following depression 107. These two sharp thrusts in quick succession serve to expand the spacebands completely.

Figure 11 shows a spaceband S driven upwardly by the rise of spaceband driver 64 whereby the line of matrices M is justified, it being observed that the space x indicated in Figure 10 between the left end of the line and the vertical face 61 of jaw 51 before justification no longer exists in the same line after justification thereof as shown in Figure 11, the expanding action of the wedge spaceband S having spread the line to the limit fixed by the inner vertical face of finger 80 (the finger, as already stated, being locked to the jaw 52) and the inner face of jaw 51.

The height to which the spaceband driver 64 rises varies for different lines according to the number of spacebands present and the length of the line as composed by the operator, it being well known that in practice the line is composed a little shorter than the final line measure desired in order to allow the justifying action of the spacebands to fill out or spread the line exactly to such desired measure.

Justifying locking action

It will be seen, in Figure 2, that the depression 107 of cam 63 extends nearly three-quarters of the way around the cam so that after its second upward thrust the spaceband driver 64 is not only allowed to remain in the spaceband expanding position, as shown in Figure 12, for about the next 270° of revolution of the cam shaft 26, but is also locked in this position as will be described. The purpose of holding the driver bar 64 up after its second thrust against the spacebands is to retain the latter in their expanded condition as the matrix and spaceband elements are moved along the channel 83 during the succeeding operation of displacing the line elements (matrices and spacebands). As will be described, this is accomplished by removing the successive leading elements from the channel and advancing the remaining elements to fill the space previously occupied by the removed element. As a result of this step-by-step advance under the influence of the finger 80, the body thickness of each displaced matrix as well as the expanded thickness of each displaced spaceband is transmitted to the film holder to effect its proper and corresponding step-by-step advance as the successive elements are displaced for reproduction photographically on the film. Thus it is important to hold the spaceband elements expanded during the element removing operation.

Referring to Figures 2 and 7a, the driver bar 64 is locked in its raised justifying position by means of the locks 42 provided with serrations or teeth 108 on their front ends which engage a longitudinally scored surface 109 on the rods 65 which support the spaceband driver 64. In this manner these rods and the driver bar 64 (the justifying bar) are firmly locked at the exact level to which the bar 64 is moved in expanding the spacebands to justify the composed line of elements to the length determined by the justifying jaws.

The locks 42 are operated by means of a lever 40 pivoted on the shaft 41. The forward end of the lever 40 is pivotally connected at 44 to one end of a link 43, the other end of the link 43 being pivotally connected to a bell crank 45, which bell crank is pinned (Figure 7) to the left end of a cross-shaft 46 suitably rotatably mounted in a block 47 secured to the top of bracket 48, which bracket supports the rods 65. Referring to Figure 7, the right-hand lock 42 is pivotally connected at the lower end of a short arm 45a fixed to the right-hand end of the shaft 46. The left-hand lock 42 is pivotally connected to the lower arm of the bell crank 45. Thus, as the forward arm of the lever 40 lowers, both locks 42 simultaneously move forwardly to engage and lock the rods 65.

Referring to Figure 2, the lever 40 is urged into its locking position by means of a spring 40a connected to the forward arm of the lever 40 and to a convenient hook on the machine frame. The lever 40 is moved out of its locking position and is permitted to move into its locking position by means of cam 39 on the cam shaft 26. A roller 40b carried by the rearward arm of the lever 40 follows the cam 39. The rise 39a of the cam 39 holds the lever 40 out of locking position and the valley 39b permits the lever 40 to move into locking position under the influence of the spring 40a.

Thus, as the cam 63 completes the justifying action by twice raising the spaceband driver 64, the continued rotation of the cam shaft 26 causes the roller 40b to ride off of the rise 39a and thereby releases the lever 40 to lock the spaceband driver 64 in its raised condition.

Retraction of line confining jaws

After the justifying bar is locked in its justifying position, the continued rotation of the cam shaft 26 through the 150° of rotation brings the rise 49a of the cam 49 beneath the cam follower 53b of the lever 53 and lifts (Figure 2) the left end of the lever 53 (against the action of the spring 53a) and positively lowers the line confining jaws to a position lower than their starting position and to an extent such that the left jaw 51 is retracted from the path of travel of the elements along the channel 83.

As the jaws 51 and 52 lower, the right-hand jaw 52 first frees itself from the notch 103 in the line delivery finger 80 and then, as the bar carrying the jaws lowers still further, the left-hand jaw 51 moves out of the path of movement of the elements in the channel 83. But as the confining jaw 51 moves clear of the leading element of the composed line of elements, the line delivery lever 70 is still held from acting to move the elements to the left until the jaw 51 is lowered below the path of the depending wedges of the spacebands S. The line delivery lever is thus held back by the film moving rack 88. The arm 85 of the line delivery finger 80 was securely latched to a rider 86 fixed to the film moving rack 88 when the finger 80 contacted the jaw 52 following the initial release of the line delivery lever. During this time, film moving rack 88 is held locked by a stop 114 thereon (Figures 1d, 5, and 6), which stop, at the conclusion of the last preceding rotation of the cam shaft 26, had been moved to its extreme right-hand position and in back of a stop 113 fixed to a vertical slide rod 112. Thus under these circumstances until the stop 113 moves out of the path of the stop 114, the line delivery lever 70 is held inactive. The slide bar 112 carrying the stop 113 is guided by a suitable bracket 116. A spring 120, pressing upwardly on a collar 121 fixed to the slide bar 112, normally urges the slide bar in an upward direction and a pin 119 limits the upward movement to bring the stop 113 into the path of the stop 114. The lower end of the slide bar 112 is provided with a lateral extension which carries an upwardly extending adjustable stop screw 115 against which the bottom of the left-hand jaw 51 is adapted to push as the jaw 51 moves to its lowermost position. The screw 115 is so adjusted that the jaw 51 will engage it and depress the slide bar 112 sufficiently to move the stop 113 out of the path of the stop 114 just as soon as the upper end of the jaw 51 is clear of the depending wedges of the spacebands. In other words, the stop 113 is not released until the left-hand jaw 51 is completely clear of the path of movement of the elements in the justifying channel 83.

Simultaneously with the line confining jaws reaching their lowermost position under the influence of the cam 49, the cam shaft 26 having turned through 150°, is brought to rest (Figures 2 and 3). This is accomplished by a stop pawl 266 mounted on the cam 69 and displaced 150° from the pawl 265. The stop pawl 266 contacts and engages the ledge 267 of the pawl P to cause the pawl P to move counterclockwise to tip the pawl N and thereby shift the operating lever Y to release the clutch shoes 28b. In this manner the clutch drive is released and simultaneously the cam shaft is positively stopped. Simultaneously, also, as just described, the line delivery lever 70 is released again to move the composed and now justified line of elements further to the left along the justification channel 83.

Simultaneously, also, a pin 274 on the cam 69 (Figure 2a) operates a switch 271 to close the switch and maintain it closed so long as the cam 69 is held in its position of 150° of rotation away from its starting position. The purpose of thus closing the switch and holding it closed will be pointed out hereinafter. This concludes the first part of the cycle.

*Displacement and feeding of line elements individually*

The first part of the cycle was devoted to moving the composed line of elements into justifying position, justifying the composed line by expanding the spacebands, and then releasing the justified line of elements for movement to the element removing and photographing mediums while still retaining the spacebands remaining in the line expanded to their justifying thickness. The next part of the cycle is concerned solely with the individual removal of the character bearing elements and spaceband elements from the justified line of elements to a photographing position where the character or blank carried by the element is photographically reproduced, the step-by-step movement of the sensitized surface for each reproduction, and the delivery of the photographed elements to a discharge position. This series of operations is generally carried out as follows: The line delivery lever 70 pushing against the right-hand and last element of the justified line urges the line of elements as a whole along the channel 83 so that the forward and leftmost element (Figures 12, 16, 17, 18, and 19) is urged against a face or wall 110 which acts as a stop therefor. As each element is moved into this position it is immediately raised vertically along a vertical displacement or feed channel 111 (Figure 5a), first to the photographing position and finally to the discharging position. As each element is removed from the line the next succeeding element is pushed forward to take the place of the displaced element, and this latter movement, which is accomplished by the line delivery lever 70 moving the remaining elements of the line as a unit, moves the film holder and film an amount proportioned to the thickness of the element removed. In this manner the characters of the elements are photographed in proper register on the film.

The mechanism for carrying out the above operations will now be described.

Referring to Figures 1c and 1d, the respective elements are caused to travel up the vertical channel 111 by means of a constantly reciprocating matrix displacement or feed bar 133. To reciprocate the feed bar 133, referring to Figures 1c, 3, 5, 20, and 22, there is provided on the shaft 7 (Figure 20) a pulley 122 over which runs a belt 123 guided over idler pulleys 124 and 125 which direct the belt horizontally over a pulley 126 fixed on the lower end of a vertical shaft 127. Referring to Figure 22, supported on and driven by shaft 127 is a cylindrical or drum cam 129, enclosed within a suitable box-like housing or frame 128. The upper end of shaft 127 runs in a bearing 128 and arm 130 projecting inwardly from the rear wall of the housing 128, and (Figure 5) the lower end of the shaft is provided with a ball bearing 127a. The interior of housing 128 is clearly shown in Figures 1c and 5, wherein the cover 128a shown in Figure 1, has been removed.

In the outer surface of cam 129 there is cut a camway 131 which accommodates a roller 132 (Figure 5) carried by the vertically disposed matrix displacement or feed bar 133. As the cam 129 rotates, driven by the constantly running intermediate shaft 7, the roller 132 riding in the camway 131 imparts to bar 133 a continuous vertical reciprocation. We shall now see how the reciprocation of the bar 133, starting upwardly each time from the lowermost point of its downstroke, raises the successive leading matrices held flatwise against the wall 110.

The feed bar 133 is guided for reciprocating movement by upper and lower sets of oppositely disposed rollers 134 which rollers prevent lateral movement of the feed bar, and by upper and lower sets of rollers 134a which (referring to Figure 5) hold the feed bar in alignment with the face 110b of the elongated vertically disposed plate 110a. The rollers are suitably mounted in the upper and lower walls of the housing 128. Thus, the feed bar 133 reciprocates on one side of the plate 110a and the elements of the justified line of elements are moved up along the opposite face or wall 110 of the plate 110a.

The bar 133 operates to lift each matrix from the line into three different stations, one above the other along the feed channel 111. The first position is a photographing position. The second position is an intermediate position, and the third position is a discharging position. To accomplish this the bar 133 carries three sets of lifting fingers or pawls, a lower set 138, an intermediate set 139, and an upper set 140. The pawls are pivoted on the bar in a suitable manner and are spring-pressed in a clockwise direction, as viewed in Figures 10–15, and 17, past the edge of plate 110a and into vertical guide grooves 135 and 136 in a fixed plate 137. The fixed plate 137 extends parallel to the plate 110a but is spaced therefrom, and with the vertical wall 110 forms in effect the vertical displacement channel 111. The top or lifting edges of the upper sets of pawls 139 and 140 are respectively adapted to engage the bottom lugs E of the successive matrices as they pass through the channel and these lifting edges of the pawls are equally spaced apart vertically. The lower set of pawls 138 engages the upper set of lugs D of each successive matrix.

Each set of pawls comprises a pair of similar shape, one on the front and one on the rear face of the feed bar 133, the pair in each instance being pivoted on similar pins 141, Figure 17, passing fore and aft through the bar and projecting therefrom to receive the pawls. Each pawl is spring-pressed in a clockwise direction by suitable springs 142 which are enclosed in transverse holes in the bar 133 and engage pins 143 projecting into a fore and aft hole which intersects the transverse holes for the springs 142. The intermediate and upper sets of pawls, 139 and 140, respectively, are shaped as shown in Figure 13, and are provided only with a lifting edge, whereas each of the pawls of the lower set is provided with ecess 144 adapted to engage positively the upper
lugs D of a matrix in such manner that when
the upward stroke of the feed bar 133 ends, the
pawls positively prevent further upward travel
of the matrix in the feed channel.

As best seen in Figure 22, the edgewise projecting lugs of the matrices and spacebands (the bottom lugs E of a matrix are shown in Figure 2) are guided in the grooves 135 and 136, said grooves extending along the sides of and all the way to the top of the plate 137 and providing depthwise from the wall 110 sufficient space to accommodate the thickness of the lugs on the matrices and spacebands (lugs of uniform thickness) with only such clearance as is necessary for their free passage.

With the foregoing construction, as soon as a matrix line is advanced by the finger 80 to the position shown in Figure 12, that is, with the leading matrix flatwise against the wall 110, the upper lugs D of such matrix enter recesses 144 of the respective front and back lower pawls 138 which, at the lowest point in the downstroke of bar 133, lie at the proper level to receive the matrix lugs. Should the bar be on an upstroke or a downstroke at the time the leading matrix advances against wall 110, the pawls 138 will yield against their springs 142 and thus ride freely over the matrix lugs as indicated, for example, Figure 14.

The lower pawls 138 having moved to engage the upper lugs D of the leading element, the leading element is moved upwardly a distance corresponding to the length of the upward stroke of the feed bar 133. Thus from the level shown in Figure 12, the matrix M¹, which matrix is the same one as shown at the head of the line in Figure 12, is moved to the elevation shown in Figure 13. Such displacement of the matrix M¹ from the head of the line permits finger 80 to advance bodily the remaining elements in the justified line leftward, it being remembered that said finger is constantly under tension of spring acting on the line delivery lever 70. The actual amount of advance of the remaining line elements is of course, equal to the space previously occupied in the line by the displaced matrix M¹ or, stated in another way, equal to the edgewise thickness of the body of a displaced matrix or the expanded thickness of a displaced spaceband. Later it will be seen how this advance of the line after each displacement of an element is transmitted to the film holder 92.

As above pointed out, as the upward movement of the feed bar 133 stops, the recesses 144 of the pawls 138 engaging the upper lugs D of the matrices prevent each matrix from rising higher, and stop each matrix in a position such that its plaque B is disposed on the optical axis O—O of the photographing mechanism as shown in Figure 13. Here, as will be described, the matrix is momentarily retained and accurately located with respect to the optical axis O—O for a photographic exposure. As shown in Figures 16, 18, and 19, this is accomplished by means of a slide 146 having a wedge-shaped end 145 adapted to move into the V-notch K in the vertical edge of the matrix.

This matrix M¹ is held in this position during the entire succeeding downstroke of the feed bar 133. At the commencement of the downward stroke of the feed bar 133, the pawls yield backward as a result of the sloping upper edges of the recesses 144 sliding over the lugs of the matrix. As the downward stroke continues, the pawls 138 again yield backwardly as they pass over the lower lugs E, and likewise the intermediate set of pawls 139 yields backwardly and passes over the upper and lower sets of lugs D and E. Then, as the downward stroke is completed, the lower set of pawls 138 yields backwardly and then moves forwardly to engage the upper set of lugs D of the next succeeding matrix M², and the intermediate set of pawls 139 moves forwardly under the lower set of lugs E of the previously elevated matrix M¹. In other words, as the intermediate pawls pass over and descend below the lower lugs E of the elevated matrix M¹, their springs 142 press the pawls into the grooves 135 and 136 so that the pawls underlie the bottom edges of the lower lugs of the matrix M¹.

The above operation demonstrates the advantage of the vertical spacing of the pawls for on the following upstroke of the feed bar 133 (the slide 146 being retracted just prior thereto) the matrix M¹ is elevated by pawls 139 simultaneously with the elevation by pawls 138 of the next leading matrix M² in the line to the photographing position (slide 146 advancing again upon arrival in such position of the matrix M²). As the matrix M¹ is raised to its position corresponding to the uppermost point of the stroke of the pawls 139, one of the upper lugs D of the matrix (Figure 19) pushes back a spring-pressed retaining pawl 147, which pawl, as the matrix rises to this position, snaps under the lug and holds the matrix temporarily at such level during the next succeeding downstroke of the feed bar 133. During this next succeeding downward stroke, the lower set of pawls 138 yields backwards as before and passes over the lugs of the elevated matrix M². The intermediate set of pawls 139 also passes over the lugs of the matrix M² and this time the upper set of pawls 140 yields to pass downwardly over the upper and lower lugs of the elevated matrix M¹ and spring into position beneath the lower lugs E of the matrix M¹. This operation is shown in Figures 10 through 15. Referring to these figures, in the instance shown, as the pawls 138 reach the bottom of the stroke they engage the lugs of a spaceband S which is the next element in the line.

On the following upstroke of the feed bar 133, pawls 138 raise the spaceband, and pawls 139 raise the matrix M² to the positions above described. The pawls 140 (referring to upper part of Figures 5 and 24) elevate the matrix M¹ to the upper end of the feed channel 111, where the matrix, as well as each succeeding line element raised to this level by the pawls 140, is displaced sideways by a pusher head 148 reciprocating laterally across the top of the channel in timed relationship to the reciprocation of the feed bar 133. The specific arrangement and operation of this plunger will be described later.

The spacebands in a composed line are displaced from the channel 83 and are fed upwardly through the channel 111 in the same manner as are the matrices. In Figure 15, spaceband S will be seen to be supported by the top edge of intermediate pawls 139, subsequent to having been elevated out of the line by pawls 138 and momentarily held at the optical axis O—O by engagement of the slide 146 in the V-notch K of the spaceband element.

The expanded thickness of each spaceband is preserved until the actual removal of the spaceband from the line. This is accomplished by means of the driver bar 64 being locked in position and by the provision of an extension 64a extending to the left of the bar 64, which extension prevents the depending wedge members of the spacebands from dropping. Thus, the depending wedges of the spacebands ride along the top face of the bar 64 and the extension 64a as the line is advanced by the finger 80, and the wedges are not freed until the spacebands are actually raised by the pawls 138. By thus preserving the expanded thickness of the spacebands until their actual elevation out of the line, the finger 80 and the line of elements is advanced an amount equal to or proportional to the expanded thickness just as in the case of the removal of the matrices, and as will be described, this step-by-step advancement is transmitted to the film holder 92.

To insure one element only being removed from the line of elements, for each upward stroke of the slide bar 133, the following provisions are made. Referring to the entrance to the feed channel 111, it is so constructed that only one matrix at a time can enter the channel to come under the action of the pawls 138. Referring to Figure 22, it will be seen that the plate 137 opposite the plate 110a is channeled lengthwise of its mid-portion to accommodate the thickened portion of each matrix as the matrix rides up the channel. The plate 137 is also channeled along either side (channels 135 and 136) a distance sufficient to receive the lugs of each matrix as the matrix rides up the channel. This plate 137 extends downwardly to a level just sufficient to clear the upper lugs D of the line of elements in the justifying channel 83. Thus, as a matrix reaches and its front face contacts flatwise the face 110, the matrix is in a position to ride up the channel just described, the lugs of the matrix clearing the plate 137 and riding in channels 135 and 136. But the lower edge of the plate 137 forms shoulders 137a which overlie the top of the upper lugs D of the next succeeding matrix so that while the matrix adjacent the feed channel is being moved up, the plate 137 prevents any upward movement of the next succeeding matrix. The shoulders 137a perform the important function of preventing any upward movement of a following line element due to the sliding friction thereagainst of the leading element as the latter is slid upwardly out of the line. This is especially important when the following element happens to be a spaceband, it being evident that without the shoulders 137a for retaining the body member of a spaceband from upward movement upon displacement of the matrix ahead of it, the expanded thickness of the spaceband would be altered and thus fail to transmit the proper space movement to the film holder 92.

From the foregoing it will be clear that the line elements (matrices and spacebands) are displaced one by one successively from the justified line in the order in which they arrive, by the line advancing action of finger 80, at the head or leading end of the line, and that the elements are fed upwardly equal distances in successive stages at each reciprocation of the feed bar 133 by the sets of fingers or pawls 138, 139 and 140 until ultimately each element reaches the top of the guide channel 111 where it is displaced sideways by the pusher 148. Each element displaced from the justified line shortens the latter an amount equal to the actual thickness of the displaced element until finally, through step-by-step advance of the remaining elements, the entire line has been dissipated by removal of all of the elements therein ahead of and under advancing action of the delivery finger 80.

Matrix alignment action

Referring to Figures 16 and 17, the photographing position includes, of course, an optical axis, and the slide 146 is provided, as above mentioned, for accurately aligning each matrix as it reaches the photographing position with respect to the optical axis O—O of the photographing mechanism. The slide 146 having the pointed head 145, by which the positive aligning action is carried out, is operated by means of a lever and cam follower co-acting with a cam surface provided in the top of the drum cam 129 (Figures 1c, 5, and 22).

The top of the drum cam 129 is provided with a camway 169 in which runs a cam follower roller 168 mounted on the end of one arm 167 of a bell crank lever pivoted on a fixed vertical stud 165. The other end of the bell crank lever is provided with teeth 164a meshing with teeth 163a of a short gear segment 163 fixed to the lower end of a shaft 158. The shaft 158 is journaled for oscillating movement near its upper end in a projection 161 projecting from the rear of the housing 128, and at its lower end in a similar projection 162.

The drum cam 129 is constantly rotated through its connection by belt 123 to the intermediate shaft 7, as hereinbefore explained, and so the shaft 158 is oscillated through a short arc at each revolution of the cam 129, because the engagement of roller 168 in camway 169 imparts a to-and-fro swinging motion to the bell crank arms 164, 167 about the fixed pivot 165, and the bell crank, through the engagement of the teeth on gear segment 163 and arm 164, oscillates the shaft 158. The shaft 158 carries an operating lever 197, and oscillation of the shaft 158 imparts a to-and-fro swing to the lever 197. As will now be described, the slide 146 is indirectly connected to the lever 197 and is operated by it.

Referring to Figure 5a, the slide 146 is pinned (by means of a stud 190) to a safety shutter release slide 189 mounted on the opposite side of the plate 110a from the slide 146. The stud passes through an aperture 191 in the plate 110a. Slide 189 is supported for fore and aft sliding movement by stud 190 and by passing through a recess 192 cut across the back edge of one of the two shutter supporting blocks 193 (the rear block), the latter block being secured to the outer or left side face of plate 110a. The slide 189 is directly operated by the lever 197.

As hereinbefore stated, the forward end of the register slide 146 is wedge shaped, as at 145, whereby to cooperate with the notch K in the rear edge of the matrices and a similar notch in the spacebands and such cooperation takes place whenever a matrix or spaceband is presented at the photographing position in the feed channel 111 by the lower set of lifting pawls 138. To effect such cooperation the connected slides 146 and 189 are caused to reciprocate fore and aft at the proper times. Thus, for moving the slides forward together there is provided a spring 194 one end of which is fastened to the stud 190 and the other end to a pin 195 in the plate 137. And for moving the slides rearward there is provided a roller 196 at the extremity of the main shutter operating lever 197 which is pinned at its other end to the shaft 158, the latter, it will be recalled, being oscillated by reason of engagement of roller 168 in the camway 169 formed in the head of the constantly rotating drum cam 129. When the shutter operating lever 197 is in the full line position shown in Figure 22 (roller 168 then being on the low portion 198 of the camway 169) roller 196 contacts a screw 200 provided in a projection 199 of the slide 189, and holds the slides 146 and 189 rearward or in retracted position against the tension of spring 194. When the shutter operating lever 197 swings forwardly due to the partial turn clockwise imparted to the shaft 158 by the approach and passing by of the high portion 201 of the camway against roller 168, spring 194 causes the screw 200 to follow roller 196 until the connected slides 146 and 189 are stopped as by an obstruction to their forward movement. Such obstruction, of course, would be a matrix or a spaceband presented by pawls 138 at the photographing position in the feed channel 111, it being clear from Figures 16, 18, 19 and 22 that slide 146 is so disposed as to move into and out of the channel 111 at the rear thereof and in so doing it crosses the rear vertical guide groove 135 of said channel.

In this connection it may be noted here that the spacebands S herein employed are provided with a V-shaped notch similar to the notch K in the matrices for the purpose of cooperating with the wedge end 145 of the register slide 146 when a spaceband is presented by pawls 138 at the photographing position. It will be obvious, however, that since the spacebands are opaque bodies, they will produce no impression on the film when the exposure shutters are operated, as they are, while a spaceband is so retained on the optical axis by the wedge end of the register slide.

In this manner each matrix is brought into exact vertical alignment with respect to the optical axis, and the horizontal alignment is taken care of by the matrix being pushed against the opposite side of the channel provided by the plate 137.

*Discharge of line elements from feed channel to distributors*

As above described, as each element reaches its uppermost position in the feed channel, it is discharged therefrom. To accomplish this there is provided the aforementioned constantly reciprocating pusher 148 which is shown in Figures 1c, 5, 5a, 15, 20, 23, and 24. It comprises a horizontally disposed rod 149 slidably supported in a bearing block 150 secured to the top of the housing 128. On the right end of rod 149 there is secured in a vertical plane the pusher head 148 which in shape and size generally resembles a thin matrix. Secured to the left end of rod 149 is a block 151 having fore and aft open slots 152 cut across the top and bottom thereof for receiving opposed rollers 153 on the inner sides of a fork formed in the forward end of an arm 154 of a bell crank lever, said lever being mounted on a suitable post 155 supported on a lug or projection 155a at the top of the housing 128 and having a short arm 156 with an open slot 157 at the outer end thereof. On the upper end of the vertical shaft 158 is pinned a crank arm 159 having fixed therein at its outer end a pin 160 which projects upward into the slot 157 in arm 156 of the aforementioned bell crank lever.

As above described, the shaft 158 is oscillated, and the oscillation of the shaft imparts a to-and-fro swing to the crank arm 159 at the upper end of the shaft whereby the bell crank lever arms 154, 156 are caused to swing through engagement of pin 160 in slot 157. As a result the pusher rod 149 is reciprocated and causes the pusher head 148 to travel back and forth laterally across the top of the guide or feed channel 111 whereby to push each matrix onto the elevator 11 by which it is later raised to be distributed back to its place of storage.

Adjacent and to the right of the upper portion of housing 128 there is rigidly secured to suitable lugs 22a projecting forwardly from the machine frame member 22 a box-like housing 170, see Figures 1c, 2, 5, 23, 24 and 25. The left end of this housing abuts against the plate 137 of the feed channel 111 and is provided, as clearly shown in Figure 2, with a vertical opening or passage 171 with side plates which provide horizontal ledges or rails 172 of relatively short extent inwardly of the channel for receiving the upper lugs of matrices and spacebands discharged sideways through the passage 171 from the vertical guide channel 111 by the reciprocating pusher 148.

The second elevator head 11 pivoted at the upper end of the lever 12 carries the usual ribbed bar 11a, and a recess in the front edge of the head cooperates with the aligning post 173 whereby to guide the elevator head (when lowered by lever 12 under control of cam 36) squarely to a seating position on the flat top surface of the housing 170, all in a manner well known in commercial typographical machines. When the elevator is so seated the ribs on the bar 11a align exactly with the usual combination distributing teeth in the matrices when the latter are moved sideways along the rails 172 by the pusher 148. Thus, at each reciprocation to the right of the pusher head 148 a matrix or a spaceband, as the case may be, is discharged sideways from the channel 111 onto the rails 172, the teeth of the matrices almost immediately engaging the ribs on the bar 11a which thereafter supports the matrices.

As clearly shown in Figures 24 and 25, the spacebands, however, being devoid of teeth, are supported by their upper lugs on rails 172 and are moved along said rails by the pusher 148 until they reach the inner end thereof whereupon they drop off and fall by gravity onto a lower set of front and back rails 174 extending longitudinally along the bottom of the housing 170 and affording support for the lower lugs of the spacebands. It will be understood, of course, that the forward stroke of the pusher 148 is long enough to advance the line elements a short distance beyond the inner ends of the short rails 172 so as to allow the spacebands to drop therefrom. A buffer bar 175 (Figures 23 and 24) aids in guiding the spacebands vertically as they drop and it will be observed in Figure 25 that there is just enough space between the rails 174 to admit the depending wedge member of a spaceband with a slight clearance edgewise. The subsequent transport of the spacebands to their place of storage will now be explained.

As the spacebands drop onto the rails 174 their lower lugs enter between the spiral threads of a pair of longitudinal spindles or feed screws 176 the axes of which lie substantially in the same horizontal plane as the top edge of rails 174. The screws 176 are constantly rotated in opposite directions by means of a belt 177 which runs over a pulley 178 on the intermediate shaft 7 and over a pulley 179 secured to the side of a gear wheel 180 for driving the feed screws (see Figures 2 and 26), the screws being provided at the left end with like meshing gears 181 which lie in recesses bored in the left end of housing 170 so as to present a flush face to said end of the housing adjacent the vertical plate 137, and the drive gear 180 meshes with one of the gears 181. Thus immediately upon arrival of a spaceband on the rails 174 the lower lugs thereof are picked up by the threads of the rotating screws and transported thereby to the right along the rails.

Toward the right end of the housing 170 there is provided downwardly inclined front and back rails 182 formed by the upper edges of a pair of flat plates suitably secured to a rigid depending support 183 within the housing 170. At the left or receiving end of rails 182 there is provided a flat or horizontal extension 184 which lies at such level as to engage under the upper spaceband lugs when the spacebands reach the rails while still supported by the lower pair of rails 174. In Figure 24 it will be seen that rails 174 deny support to the lower spaceband lugs just after the upper lugs engage the horizontal receiving end 184 of rails 182 and that slightly further transport of a spaceband by the rotating screws brings the upper lugs onto the inclined portion of rails 182. The spacebands then slide down these rails by gravity until stopped by the outer lip 185 of the spaceband chute 20 which lip projects upwardly and overlies an opening 185a (Figure 25) in the right end of the housing 170, said opening being somewhat wider than a spaceband. A V-shaped bar 182a which just clears the V-notch at the top of the spacebands steadies the latter against turning sideways while sliding down the rails 182.

Two spacebands S are shown at the foot of the inclined rails 182 in Figure 24, one hanging by its upper lugs (as do all others that may be stored behind the foremost one) on said rails and the other or front spaceband hanging by its upper lugs on a pair of lugs 186 on the spaceband release pawl T which latter is pivoted on a fixed pin 187 and urged clockwise by a spring 188. A lever U overlies a small pin in an upwardly projecting arm of pawl T as clearly indicated in Figure 24, and said lever has suitable well known operating connections (not shown) with the spaceband key 19 of the keyboard 14 shown in Figure 1. It is deemed sufficient here merely to say that lever U when operated by depression of key 19 to release a spaceband rocks pawl T counterclockwise against the tension of spring 188 whereby the supporting lugs 186 recede from under the upper lugs of the front spaceband allowing it to drop freely by gravity into the mouth of the chute 20 (a C-shaped guide as shown in Figures 24 and 25) which, as hereinbefore stated leads the released spaceband to the point of assembly of the matrix line in front of the usual star wheel 16. In descending through the chute 20 both the upper and lower lugs of the spacebands are guided in the C-shaped flanges of the chute. When pawl T is rocked by lever U to release the front spaceband its upwardly projecting arm swings into contact with the upper lugs of the next or succeeding spaceband hanging on rails 182 whereby to retain such spaceband against sliding forward until the pawl returns under the influence of springs 188 and thus presents its lugs 186 in position to receive the lugs of the oncoming spaceband.

Photographing mechanism

Referring to Figures 5 and 22, for effecting photographic exposure there is provided a suitable source of light, such as a bulb 232, a reflector 233, a condenser lens 234, an adjustable focusing lens 235, and a light-excluding casing or tube 221. The focusing lens is mounted within the tube 221 and may be adjusted longitudinally of the tube to secure within a limited range an enlarged or reduced image. The intensity of the light source 232 may be varied by altering the voltage supplied thereto in an obvious manner, such as by means of a switch 236 for cutting in one or another of the secondary windings of the transformer 237. For increasing the range of enlargement or reduction, lenses of different focal lengths may be substituted for the lens 235. As previously mentioned, this photographing apparatus has an optical axis O—O.

Operation of safety shutter

Under the heading "Displacement and feeding of line elements individually" it was pointed out that each matrix displaced from the left or leading end of the justified line is lifted by the lower set of pawls 138 to the position shown in Figures 13, 17, and 18, where the character on the matrix is disposed on the optical axis O—O, and where the matrix is retained and accurately located by the register slide 146 for exposure of its character on the film.

There are provided two shutter actions for the photographing apparatus, (1) the regular shutter action by which each exposure is timed, and (2) a safety shutter action which prevents exposure of the film when no matrix or spaceband is present. As will later be seen, the safety shutter is caused to move to an open position by the elevation of the first matrix from a justified line of matrices presented to the feed channel 111. The shutter is closed by the absence of a matrix in the photographing position just prior to the photographing operation.

The operation of the safety shutter will now be described. Referring to Figures 5a and 22, it will be recalled that the aligning slide 146 is operated by a safety shutter release slide 189, which slide is oscillated in timed relation with the feed bar 133. Referring to Figures 16 through 19, the safety shutter release slide 189 at its forward end cooperates with a pawl 202 on one end of a sleeve 203 which is free to turn on a stud 204 secured in the back of plate 110a, the pawl being disposed flatwise adjacent the back surface of the plate and having a spring 205 connected to its upper arm and to a fixed pin 206 in plate 110a. To the other end of sleeve 203 is fastened the safety shutter latch 207 which is adapted to cooperate with a notch 208, see Figures 16 and 18, in the rear edge of the safety shutter 209. The shutter 209 preferably comprises a metal strip which is adapted to slide vertically up and down behind the main exposure shutter 210, as best shown in Figures 17 and 22, so as to present its aperture 211 at the proper times in alignment with the apertures in other members, as will shortly be described.

Referring to Figure 17, for supporting and operating the shutter 209 it is connected at its lower end to one end of a loose link 212, the other end of which is pivoted to the outer or free end of a lever arm 213 pinned to a horizontal shaft 214 which latter turns in a sleeve 215 fixed in and projecting from the back of plate 110a. On the other end of shaft 214 is pinned the shutter operating arm 216 the front end of which is provided with a lug 217. A spring 218 fastened at one end to a pin in the lever arm 213 and at the other end to a pin in plate 110a urges the shutter 209 and its operating arm 216 in a counterclockwise direction whereby to hold the shutter in a "down" or inoperative position with its aperture 211 below and out of alignment with the apertures in the other parts at times when there are no elements being fed through the channel 111. A stop pin 219 at the upper end of the shutter 209 limits its downstroke by banking on the top of a reduced collar 220 of the light-excluding tube 221 and the upper end of the shutter passes through upper and lower slots 222 (Figure 17) in collar 220 which slots serve to guide and sustain the shutter vertically.

The operating arm 216 for the safety shutter 209 is disposed flatwise at the front of plate 110a and when holding the shutter down the lug 217 projects into the rear groove 135 of channel 111 at such level (determined by stop pin 219) that the underside of the lug overlies the lower rear lug E of the first or leading matrix in a line delivered by finger 80 against the vertical face 110 of plate 110a. This condition is clearly shown in Figure 16 wherein the shutter 209 and also the displacement or feed bar 133 are "down," the upper lugs D of what will be assumed to be a "first" matrix M are engaged in the recess 144 of the lower set of lifting pawls 138, and lug 217 on the end of the shutter operating lever 216 overlies the lower rear lug E of the matrix. It will be noted, too, in Figure 16 that the register slide 146 is "back" or withdrawn out of groove 135 in which the rear lugs of the matrix are guided in passing up through channel 111, and that the forward end 189a of slide 189 is likewise drawn back away from the depending arm of pawl 202 which latter then stops against the side of the block 193. This withdrawn position of the slides results from the fact that the low portion of the camway 169 is against roller 168 whereby roller 196 acts on screw 200 against the tension of spring 194 to hold the slides in retracted position. Actually, with the parts in the position shown in Figure 16, the starting point 198a of the low portion of camway 169 is opposite the roller 168, and the lowest point of camway 131 is passing the roller 132 on the feed bar which latter, upon a slight further turning of cam 129, will start to rise and thus elevate the matrix M.

It will now be seen that the safety shutter 209 is moved upward to active position upon movement or displacement upwardly of the first matrix in each different line delivered by the finger 80 to the displacement or feed channel 111. Thus, as soon as the feed bar 133 starts its upward stroke (under control of roller 132 and camway 131 on the outer face of the drum cam 129 as already explained) a first matrix M as represented in Figure 16 swings lever 216 clockwise until the lower rear lug on the matrix clears the lug 217 on lever 216. At such time the safety shutter 209 will have moved upward, to the position indicated in Figure 18, a distance sufficient to bring notch 208 in the rear edge of the shutter opposite the upper end of the shutter latch 207 which, due to the pull of spring 205, immediately snaps into notch 208 and thereby locks the shutter in its "up" or active position. Here the aperture 211 in the shutter aligns with a transverse aperture 223 provided in the feed bar 133. The latch 207 yields backward against the tension of spring 205 as the portion of the edge of the shutter above the notch 208 passes the latch.

The upward stroke of the feed bar is of greater extent than that of the shutter 209 and the latter is therefore latched in its "up" position somewhat before pawls 138 have lifted the matrix into position for engagement of the register slide 146 in the notch K. Such engagement occurs immediately upon completion of the full upstroke of feed bar 133, cam 129 having then turned in the direction indicated by the arrow in Figure 22 far enough to bring the starting point of the rise in camway 169 opposite roller 168 and thus start lever 197 swinging forwardly or clockwise with shaft 188. Screw 200 then follows roller 196 until the wedge end 145 of the register slide 146 seats in the notch K in the matrix (the screw and roller then having moved to the first dotted line position shown in Figure 22), whereupon forward movement of both of the slides 146 and 189 is stopped and the front end 189a of slide 189 lies just in contacting relation with the depending arm of pawl 202, Figure 18.

This position of the parts is clearly indicated in Figure 18 and it may be stated at this point that the safety shutter now remains locked in its "up" position as here shown until the last matrix in a given line has been lifted upward out of the exposure of photographing position by the intermediate set of pawls 139. It will be observed in this connection that as each matrix after the first one is advanced against plate 110a and is lifted by the lower pawls 138 the lug 217 on the shutter operating lever 216 stands clear of the guide groove 135. And it will also be noted that the shutter 209 remains latched up through the pull of spring 205 on pawl 202 until otherwise released.

Due to the constant rotation of cam 129 the slides 146 and 189 constantly reciprocate in timed relation to the vertical reciprocations of the feed bar 133, slide 146 entering the channel 111 to engage the notch K in each matrix and spaceband successively brought to the exposure or photographing position by the pawls 138 on the feed bar, and said slide retreating out of the channel immediately upon arrival of the top edge of the intermediate pawls 139 beneath the lower lugs of the particular matrix which at the time is held in exposure position by the register slide 146. From this it will be clear that the feed bar 133 starts its downstroke immediately after the wedge end 145 of slide 146 engages the notch of a matrix just lifted into exposure position; that exposure of the character takes place while such matrix is retained by slide 146 and while the feed bar descends to pick up the next matrix; that by the time the feed bar completes its downstroke and pawls 138 engage the upper lugs of such "next" matrix, pawls 139 will be beneath the previously lifted matrix retained by slide 146, and that the feed bar will then be about to commence its next upstroke. Meanwhile, slides 146 and 189 move backward to release the first lifted matrix which has been exposed and permit it to be raised by pawls 139, and to permit the next matrix being lifted by pawls 138 to pass up the channel 111 into exposure position. These reciprocating movements of the feed bar 133 and the connected slides 146 and 189 continue until the last matrix in a given line is lifted by pawls 139 to the intermediate level shown in Figure 19 where such matrix is held momentarily by the retaining pawl 147.

Since no matrix will be lifted into exposure position upon the next upstroke of the feed bar, there will be no obstruction to stop the advance of slide 146 into the feed channel 111. Accordingly, screw 200 will follow roller 196 somewhat further than it would if slide 146 had been stopped by engagement with a matrix (slightly further than the first removed position indicated by dotted lines in Figure 22), slide 146 then penetrating further into channel 111 and the front end 189a of slide 189 then actually rocking pawl 202 clockwise rather than merely advancing only to the point of contact with its depending arm as it does when slide 146 is stopped by a matrix. Such rocking of pawl 202 in the absence of an obstruction is accompanied by a corresponding clockwise swing of the shutter latch 207 an amount sufficient to disengage it from the notch 208 in the rear edge of the safety shutter 209 whereupon the latter, under tension of spring 218, is immediately pulled down to its inactive position. This occurs just in time to lower the aperture 211 in shutter 209 out of alignment with the aperture 223 in the feed bar 133 before the aperture in the main exposure shutter 210 crosses the optical axis to effect a photographic exposure on the film, all as will shortly be explained.

The condition of the parts after the last matrix in a given line has been lifted out of exposure position is represented in Figure 19 wherein it will be seen that the last matrix is held by pawl 147; that the shutter 209 is in its "down" position, and that the upper arm of pawl 202 rests against the top of block 193 where it is held by slide 189 until the latter moves backward again, which it will do as the low portion 198a in camway 169 next approaches the roller 168. At such time spring 205 swings pawl 202 and latch 207 counterclockwise until the inner vertical edge on the upper portion of the depending arm of the pawl banks against the side of block 193, as shown in Figure 16. The upper end of the shutter latch 207 will then again lie in the path of upward movement of shutter 209 ready to snap into notch 208 in the shutter when the latter is raised by the rear lug of the first matrix displaced from the next line delivered to the feed channel 111. Until such delivery of a new line slides 146 and 189 will simply reciprocate in the manner explained above, i. e., with an excessive stroke of slide 146 into channel 111 and a to-and-fro rocking of pawl 202 and latch 207 by slide 189. The safety shutter 209, however, will not be raised; this action occurring only when the first matrix of the new line is displaced from the leading end thereof by pawls 138.

Main shutter

Proceeding now to the main or exposure shutter 210 (shown in Figures 1c and 21): as has already been mentioned, this shutter is connected to the lever 197 which swings with the oscillation of shaft 158 and controls the fore and aft sliding movements of the slides 146 and 189. Shutter 210 is connected to lever 197 by means of a link 224 loosely pivoted at one end to said lever and at the other end by means of a removable pin 225 to the rear end of the frame of the shutter (see Figures 21 and 22). The shutter comprises upper and lower frame members rigidly secured in parallel relation to an end block 226. These frame members are provided with suitable grooves 227 on their inner opposed edges for slidably guiding the aperture adjusting block 228 which carries a pointer 229, the setting of which indicates the width of the aperture 230 formed by the fixed end block 226 and the adjustable block 228.

Referring to Figures 5 and 22, the shutter is supported for fore and aft sliding movement by the blocks 193 which are provided with upper and lower guide rollers 193a. The movements of the exposure shutter 210 are of course governed by the oscillations imparted to shaft 158 as a result of camway 169 acting on roller 168. The arrangement of camway 169 is such that the aperture 230 in shutter 210 will cross the optical axis O—O immediately following the seating of the register slide 146 in the V-notch of a line element, it being remembered that slide 146 advances under the pull of spring 194 to engage such notch as soon as the shutter operating lever 197 starts to swing clockwise under control of camway 169. Such swing of lever 197 beyond the first dotted line position of roller 196 in Figure 22 (the point at which the connected slides 146 and 189 have completed their advance and the former slide has seated in the notch of a line element) continues to move the exposure shutter 210 and at the moment its aperture 230 crosses the optical axis O—O the aperture 223 in feed bar 133 is also aligned on the optical axis, the upper dwell in camway 131 of cam 129 being of sufficient extent to bring about such alignment of the respective apertures at the proper instant whereby to effect photographic exposure on the film of the character on the matrix which at the time is in photographing position. A suitable aperture 231 is of course provided in the fixed plate 110a and aligned on the optical axis O—O at all times.

By the time the high portion 201 of camway 169 arrives against roller 168, aperture 230 will have crossed the optical axis and lever 197 and shutter 210 will continue to move to the limit of their forward stroke or to the remote dotted line positions indicated in Figure 22 as surface 201 of the camway passes under the roller. Meanwhile the feed bar 133 descends under control of its cam 131 to position for engaging the next matrix in the line and by the time it starts its next upward stroke the low point 198a of camway 169 will be against roller 168 and the descending contour of the camway in advance of point 198a thereof will have returned lever 197, shutter 210, and slides 146 and 189 to their normal or full line positions shown in Figure 22. Upon the return stroke of shutter 210 its aperture 230 crosses the optical axis at a time when the feed bar 133 is "down" and thus serves to block the passage of light from the fixed aperture 231 to the shutter aperture.

From the foregoing it will be clear that aperture 230 in the main exposure shutter crosses the optical axis during the forward stroke of the shutter at the particular moment when apertures 223 in the feed bar and 231 in plate 110a are aligned, and assuming that aperture 211 in the safety shutter 209 is then also aligned on the optical axis, as it will be while matrices are being fed from a line, a photographic exposure will be produced on the film in holder 92. If no line has yet been delivered to the displacement or feed channel 111 or if the last matrix in a given line has been exposed, then the safety shutter 209 will have dropped and in spite of the alignment on the optical axis of apertures 231, 223, and 230 during subsequent operation of the machine, no exposures will be made on the film.

Film moving mechanisms

Earlier in this specification it was pointed out that after each displacement of a line element from the head or leading end of the justified line by the reciprocating feed bar 133 (by the lower set of pawls 138 on the bar), the delivery finger 80, constantly under tension of spring 82, advances the remaining elements in the line bodily an amount equal or proportional to the edgewise thickness of the displaced element (a matrix or an expanded spaceband), and that such amount of advance of the line is transmitted to the film holder 92. And it was also stated that the rack bar 88 serves as a connection between the finger 80 and the film holder 92 whereby the latter is moved step-by-step downward the proper amount after each exposure of an element removed from the line.

Referring to Figures 1c, 5, and 20, it will be seen that teeth 90 on the rack bar 88 engage the pinion 91 and that this pinion meshes with a similar one 238 mounted in the outer end of a fore and aft shaft 239 supported in the free end of a depending arm 240 swingable about the shaft to which pinion 91 is fixed, shaft 239 having pinned thereto at its inner end a pinion 241 which meshes with a vertical rack bar 242. Bar 242 is guided in an arm 243 which—like the pinion 91, arm 240, and flanged roller 89—is supported by a bracket 244 secured to the left end of housing 128 as by screws 245. The upper end of the rack bar 242 is provided with a rearwardly extending hook-like arm 246 which is secured to a flat metal plate 247 as by rivets 248 and plate 247 is suitably secured to another plate 249 adapted to slide up and down on a vertical guide post 250. The outer vertical edges of plate 249 are suitably formed to engage neatly around the edges of the guide post 250 with a sliding fit, and the top and bottom edges of plate 247 are curved over as at 251 so as to form horizontal channels for the support and lateral sliding movement of the film holder frame 252 in which the main plate or film holder 92 fits removably. Obviously, the post 250 is provided with an aperture 250a and the plates 249 and 247 are provided with openings suitable for exposure of the film as it passes the aperture 250a in its step-by-step movements downward for the impression of the individual matrix characters presented successively in photographing position. A scale 253 on the back of plate 247 indicates the transverse position of the film holder frame 252 for different lines, and the frame 252 is moved according to this scale manually for line-for-line spacing.

As the rack bar 88 advances (to the left in Figure 5) after each displacement of a line element, the amount of such advance is transmitted through the pinions 91, 238, and 241 to the vertical rack bar 242 which in turn moves the plate 247 and the film holder 92 carried in frame 252 on said plate downward a corresponding distance, such downward movement being directly aided by the force of gravity. The amount of advance of rack bar 88 and of movement downward of the film holder is equal or proportional to the setwise width of the character on the previously displaced matrix (or to the expanded thickness of a spaceband), such width being represented by the body thickness of the displaced element. Thus there is photographically produced on the film a line of a predetermined length—a line in which the sum of the separate exposures (exposures of the characters on matrices and of blank spaces resulting from the opaque spacebands) equals the sum of the body thicknesses of the respective elements in the justified line delivered by finger 80 to the photographing mechanism of the machine.

To alter the ratio of movement of the film holder relative to the advance of the line by finger 80 (within limits determined by the focal limitations of the lens 235) the arm 240 may be swung down and larger or smaller pinions placed on shaft 239 in place of the pinions 241. Figure 32 shows lines produced on the film in the manner just described, it being observed that the characters which are placed recumbent on the matrices result in forming the lines so that they read from left to right when viewed vertically endwise on the film, that is, oriented from their usual horizontal disposition for reading purposes. The advantage of this arrangement is that gravity may be employed as an aid in the step-by-step downward movements of the film between the separate exposures whereby to take up always in the same direction all slack in the driving connections such as the gears and racks, and thus eliminate the possibility of errors in spacing.

After exposure of the last matrix in a given line, it is necessary, of course, to elevate the film holder 92 to the proper level for the exposure of the first character in the next line to be produced. This operation is accomplished by the next part of the cycle of the cam shaft 26. It is also necessary to slide the holder 92 forwardly in the curved channels 251 at the top and bottom edges of plate 247 for the next line. The latter operation may be performed by hand using the scale 253 as a guide to determine the proper amount of lateral movement. Elevation of the film holder is accomplished through return to normal or line starting position of the rack bar 88 and line delivery finger 80 by the line delivery lever 70, it being clear that if the bar 88 is moved to the right in Figure 1c, the vertical rack 242 will be driven upwardly through the connecting pinions 91, 238, and 241 and thus elevate the plates 247 and 249 on which the film holder is carried in its frame 252.

*Completion of element removing and photographing operation*

As the last element of the composed line of elements is moved upwardly by the lower set of pawls 138, two operations are performed, both of which are directed to returning the parts to their starting positions. One of the operations is the release of the film moving rack 88 from the finger 80, and the other is the starting of a delayed action switch mechanism which, after this last matrix is discharged from the feed channel 111, sets in operation the main cam shaft 26 to rotate through 210° to its starting position. This rotation accomplishes the following actions:

1. The line delivery lever 70 and its associated parts are returned to starting position.
2. The rack 88 and film holder 92 are returned to starting position.
3. The justifying jaws 51 and 52 are unlocked and are raised to starting position while the justifying table is lowered.
4. The shifter slide 34 and the distributor elevator 11 are operated to raise the matrices to the main distributor and to transfer them thereto.

*Release of rack 88*

Referring to Figures 5 and 22, after the last matrix in a given line is lifted by pawls 138 from in front of the delivery finger 80, said finger (still under tension of its spring 82) advances a distance equal to the thickness of said last matrix and no further. But in so advancing, the downwardly curved left end 86b of the latch 86a on rider 86 encounters a stud 254 secured in the block 117 which moves latch 86a to a tilted position and thus breaks the engagement of its hook end with the arm 85 of the finger 80. The parts remain in this condition until the last displaced matrix is discharged from the top of channel 111 by the pusher 148, whereupon, through the medium of the timing mechanism and switches (shortly to be described), the main cam shaft of the machine is started again and cam 69 thereon then operates to swing the delivery lever 70 clockwise against the tension of spring 82.

Delay action switch

In order to delay re-starting of the cam shaft (from its position when stopped by pawl 266 after two-fifths of a revolution) until the last matrix in a line has actually been discharged from the top of the feed channel 111, that is, delay the re-starting until feed bar 133 and pusher 148 have made sufficient reciprocations to feed such last matrix through the channel from exposure position therein to discharged position on the distributor elevator bar 11a, there is provided a timing mechanism which will now be described with reference especially to Figures 27, 28, 29, and 30.

On the constantly oscillating vertical shaft 158 in back of the housing 128 is an escapement wheel 275 having a hub 276 in which engages the upper end of a winding spring 277 encircling shaft 158 and engaged at its lower end in a boss formed on a reinforcing web or rib extending across the back of the housing 128. The periphery of wheel 275 is provided with a series of teeth 275a and the wheel is capable of turning clockwise on shaft 158 when actuated by successive engagement in said teeth of a pawl 278 which is pivoted on a screw 279 in the outer or free end of an arm 280 the hub of which is secured as by a pin 281 to shaft 158 whereby to oscillate with said shaft. When wheel 275 is so turned by pawl 278 tension is built up in spring 277 due to the coiling thereof so that upon full disengagement of pawl 278 the wheel will, of course, be forcibly rotated counterclockwise. An adjustable stop screw 282 is provided in the vertical back wall of housing 128 against which screw a circumferentially disposed stud 283 suitably secured in a recess in wheel 275 normally banks, see Figure 29, when said wheel is so rotated forcibly by spring 277.

Pawl 278 is caused to engage and disengage the teeth 275a in the escapement wheel 275 at the proper times by longitudinal movement of a horizontally disposed rod 284, one end of which is slidably supported in a bore through a post 285 secured to the back wall of the housing as by a screw, and the other end of which passes through a bore in the right end wall (as viewed from the front of the machine) of the housing 128. A supporting block 286 pinned to rod 284 and slidably fitted over a stud 287 prevents turning of the rod in its supports whereby to retain in a horizontal plane a plate 288 secured as by rivets to a flat recess formed on the rod. On the upper side of plate 288 there is provided an upstanding arc-shaped boss 289 against the outer face of which rests a roller 290 carried on a pin projecting downwardly from the pawl 278, the roller being held against boss 289 by a spring 291 secured to a pin in the pawl and to the pin 281. Also on the upper side of plate 288 there is pivotally mounted on a stud 292 a ratchet lever as shown, the arm 293 thereof, and likewise the free end of pawl 278, being adapted to project into the path of teeth 275a on wheel 275 when rod 284 is shifted to the right (as viewed from the back of housing 128 in Figures 27 and 28). To the other arm 294 of the ratchet lever referred to, there is fastened a spring 295 hooked at its other end to a pin in plate 288 as indicated and urging the lever clockwise against a stop pin 296 in said plate. When rod 284 is shifted to the left, as shown in Figure 29, where it is normally held by a spring 297 hooked to plate 288 and to stud 287, lever arm 293 is held out of the path of teeth 275a and boss 289 acting on roller 290 serves to hold pawl 278 rocked back out of the path of said teeth against the tension of spring 291. An adjustable stop screw 298 in the supporting block 286 limits the leftward shift of rod 284 by spring 297.

Rod 284 and plate 288 secured thereto are shifted to the right (as viewed from the back of housing 128 in Figures 27, 28, and 29) against the tension of spring 297 upon engagement of the upper end of the line delivery lever 70 with a shoe 299 secured to that end of the rod which is exposed beyond the left end wall of housing 128 and which thus lies in the path of movement of lever 70 as it advances the finger 80 after elevation of the last matrix in a line by pawls 138. The arrangement is such that the last forty-thousandths of an inch advance of finger 80 (the thickness of the thinnest matrix in a font) shifts rod 284 a corresponding amount, thus moving arm 293 into engagement with the second tooth 275a on wheel 275 and allowing pawl 278 to swing clockwise on its pivot, under the pull of spring 291, into engaging relation with the first tooth 275a on said wheel as shown in Figure 28.

Remembering that arm 280 which carries pawl 278 is constantly oscillating, it will now be evident that pawl 278 engages a successive tooth on wheel 275 at each oscillation of shaft 158 and thus advances the wheel step-by-step clockwise, arm 293 engaging the following tooth after each advancing step whereby to prevent the wheel from turning backward under the influence of spring 277. Suitably secured to the upper side of wheel 275 is a stud 300 of non-conducting material such as hard rubber, and on a boss projecting from the back wall of housing 128 there is fastened a block having mounted thereon the insulated contact arms of a switch generally designated by the numeral 301, one of said arms projecting into the path of movement of the stud 300.

The contacts of switch 301 are normally open and are connected through switch 271 to the coil of relay 256 and to the secondary winding of the line transformer 237. Thus, with switch 271 closed, as it is when the main cam shaft 26 is stopped by pawl 266, relay 256 will be energized so as to re-start the cam shaft only when switch 301 is also closed. This occurs when shaft 158 has made enough oscillations after the shifting of rod 284 by lever 70 to advance wheel 275 to the extent that stud 300 thereon engages with and closes the contact arms of switch 301 as clearly shown in Figure 30. Actually it requires three full oscillations of shaft 158 after rod 284 is shifted by lever 70 to the position shown in Figures 27 and 28 to advance wheel 275 to the switch closing position shown in Figure 30. By two of these oscillations the feed bar 133 elevates the last matrix displaced from the line from exposure position to the intermediate level by the lifting action of pawls 139 and then to the upper level by pawls 140, and on the third oscillation the pusher 148 discharges such matrix sidewise onto the second elevator bar 11a.

Having thus delayed re-starting of the cam shaft until the feeding devices have had time to discharge the last matrix to position for elevation to the main distributing mechanism, the closed switches 271 and 301 now permit relay 256 to be energized and thus throw in the main clutch through the rocking of levers 260 and 263, which results in dislodging pawl 266 from ledge 267. The cam shaft then turns the remaining three fifths of a revolution, or until pawl 265 is brought around again into engagement with ledge 267 as shown in Figure 2 and throws out the clutch. Relay 256 is, of course, deenergized as soon as the cam shaft starts turning by reason of the fact that such starting of the shaft carries pin 274 from beneath switch 271 and allows the latter to open immediately. As soon as the cam shaft is re-started, roller 72a on lever 70 which, during the step-by-step advance of the finger 80 by said lever upon each displacement of a matrix gradually approaches the side or operating surface of its cam 69, is picked up by the cam, and thus starts lever 70 on its return stroke. In this connection it will be observed from Figure 3 that roller 72a on lever 70 stands well back from, and thus clear of, the side or operating surface of cam 69 when the cam shaft is stopped by the clutch disengaging action of either the pawls 265 or 266, the swing of lever 70 under the influence of its spring 82 as the elements are displaced from the line finally bringing the roller into position to be engaged by the rise on cam 69 when the latter turns after re-starting of the cam shaft upon the closing of switch 301.

As the upper end of lever 70 retreats from shoe 299, see Figure 27, spring 297 urges rod 294 and plate 288 thereon to the left until stopped by screw 298; and such shifting of the rod and plate, as already explained, results in rocking pawl 278 backward out of engagement with the teeth in wheel 275 and at the same time withdrawing arm 293 of the ratchet lever backward out of engagement with said teeth, whereupon spring 277 forcibly rotates wheel 275 counterclockwise until stud 283 thereon banks against stop screw 282. Thus the various parts of the timing or delay mechanism are returned to their normal positions as shown in Figure 29.

Electrical circuits

The circuit diagram in Figure 31 clearly shows the wiring connections for the start and stop control switches 98, 100; 270; 271; and 301 and the clutch operating relay 256. Also, the circuit for the light source 232 and its switch 236 is shown. It is believed that the foregoing explanation of the operation of all such parts involved in the electrical circuits is sufficiently complete and clear to forego repetition in detail. Briefly, power is obtained by connecting the primary side X of the transformer 237 to the incoming power line. The secondary winding Z is such as to supply a relatively low voltage to the various connected parts. When switch 98, 100 is closed by bar 93, current flows from winding Z through this switch and through the normally closed switch 270 to the coil of relay 256, thence back to the transformer winding Z. Relay 256 is thus energized and the pulling down of its armature arm swings lever 260 to throw in the main clutch. Switch 98, 100 opens immediately after energizing the relay, and switch 270 opens immediately thereafter upon starting of the cam shaft. Switch 271 closes upon stopping of the shaft after about two fifths of a revolution but fails to complete a circuit until switch 301 is closed by stud 300 upon rotation of wheel 275 of the timing mechanism. This occurs when the last matrix of a line has been discharged, and with switches 271 and 301 closed current again flows from the transformer winding Z through switch 301 to the relay coil and thence through switch 271 back to the transformer. Thus energized, the relay armature 259 is pulled down and the main clutch thrown in, whereupon switch 271 opens as soon as the cam shaft starts turning. Relay 256 is then deenergized and switch 301 is opened upon restoration of the timing mechanism parts.

Restoration of parts to starting position

During the second half of the cycle of cam shaft 26 the various parts of the mechanism are returned to their starting positions as will now be described.

When the delivery finger 80 is freed from attachment to rider 86 by tilting of latch 86a in the manner described, said finger is free to move backward (to the right in Figures 5 and 24) together with the delivery slide bars 76 connected to the upper end of lever 70 by the link 74. The finger and slide are so moved by lever 70, upon restarting of the cam shaft 26, until the delivery slide is latched in its normal position (Figure 1c) by the usual latch 81. On its way back the arm 85 of finger 80 encounters a pick-up block 255, Figures 1c and 24, secured to the right end of bar 88 for the specific purpose of effecting return movement of said bar through the agency of the return stroke of the delivery finger, it being recalled that bar 88 passes freely through a square aperture 85a in the arm 85 of the finger. Upon engagement of arm 85 with the pick-up block 255 the resulting movement of rack bar 88 causes elevation of the film holder plates 247, 249 and the holder 92 thereon to the proper level for the photographic impression of the first character presented for exposure from the next line. The film holder 92 may be set at different initial or starting elevations merely by adjusting its height while holding the pinions 238 and 241 on shaft 239 out of engagement respectively with pinion 91 and rack bar 242.

The justification lock lever 40 is moved counterclockwise against the action of its spring 40a by the justification lock cam 39. This is accomplished by the cam follower roller 40b riding up on the surface 39a of the cam 39. This action of the lever 40 retracts the locks 42 from the rods 65, thereby releasing the rods 65 and the spaceband driver 64. The lowering of the released parts is accomplished by means of lever 68 rotating clockwise under the action of its cam follower 68b and the short cam surface 104. As shown in Figure 2, the cam surface 104 does not lower the table until the cam 68 has very nearly completed its 210° of rotation.

The jaws 51 and 52 are raised to their starting position by the lever 53 moving counterclockwise under the action of its cam follower 53b riding onto a mid-portion of the cam 49. Thus the jaws are placed in position to permit the next succeeding composed line of elements to move into the justifying channel 83, but to prevent the elements from moving past the jaw 51. Simultaneously with the raising of the jaws (which takes place after the line delivery lever has been moved to its extreme right position), the rod 112 moves upwardly under the action of the spring 120 and moves stop 113 to its starting position so that the stop 113 is positioned in front of the stop 114 on the rack 88.

During this rotation of the cam shaft 26, the elevator 11, which has received all of the matrices discharged from the feed channel 111, is raised until it is seated opposite the usual entrance end of the main distributor of the machine, that is, to the position shown in Figure 1. This is accomplished by the action of the elevator cam 36 turning beneath a roller 12a and raising the lever 12 carrying the elevator. Just prior to this operation of raising the elevator 11, cam 32 on the main cam shaft operates the lever 33 to move the shifter slide 34 outward or to the left from its normal position shown in Figure 1, thus clearing the path for the elevator 11 to ascend to its seating position at the entrance of the distributor. Upon seating of the elevator, cam 32 permits the shifter slide 34 to move inward or to the right, and the usual spring-pressed plate thereof (not shown), encountering the left end of the matrix line on the ribbed elevator bar 11a, shifts or sweeps the matrices off the ribbed elevator bar 11a onto a similarly ribbed bar 4a in the main distributor box 8. As previously described, the matrices thus delivered to the box 8 are lifted individually edgewise by the usual lifter 9 into the main distributor screws 5, which screws propel the successively lifted matrices in known manner along the combination distributor bar 4 from which they drop into their proper channels in the storage magazine 1.

Continued rotation of the cam shaft 26 finally brings the cam 69 to the position shown in Figure 2, and simultaneously the switch 270 is closed, the pawl P is operated by the pawl 265, the cam shaft 26 is stopped, and the clutch shoes disengaged.

Résumé of operation

1. After a line of matrices has been composed in the assembling elevator 18, the elevator 18 is manually raised by the handle Q. In rising to its uppermost position it releases a latch 81 which releases the line delivery lever 70 to move counterclockwise (to the left as viewed in Figure 1c) under the influence of spring 82.

2. This lever (in moving to the left) pulls with it the slide bars 76 (Figure 1c) carrying the line delivery finger 80 which, in moving to the left as viewed in Figures 1c and 1d, pushes the line of elements along rails 84a and 84 until stopped by the finger engaging the projection 80b of jaw 52.

3. Simultaneously with the finger 80 engaging the jaw 52 (Figures 24a and 24b), the arm 85 of finger 80 engages the latch 86a carried by the rider 86 mounted on the rack 88 and the latch locks the finger 80 and the rack 88 together. But simultaneously with this latching operation, as the latch 86a is raised (Figure 24b) it engages the swinging bar 93 which operates to close the switch 98, 100. Meanwhile, the rack 88 has been held in its starting position (Figure 6) by the stop 114 mounted on the rack 88 engaging a stop 113 mounted on a vertical rod 112.

4. At the time the switch 98, 100 closes (Figure 24b), the switch 270 (Figure 2) is being held closed by the pin 273 of cam 69 and as a result an electrical circuit is closed causing (Figure 2) relay 256 to operate, pulling down the dog 268 into contact with the constantly rotating toothed wheel 269.

5. Rotation of the toothed wheel 269 causes the lever 260 to operate counterclockwise about the pivot 261 to pull the connecting link 262 at the bottom of the lever 260 to the right, causing (Figure 3) the starting lever 263 and its arm 264 to rotate counterclockwise to push pawl 265 carried by the cam 69 out of engagement with (Figure 2) ledge 267 of the pawl P. This releases the pawl P which then moves clockwise about its pivot on supporting shaft L, and permits the spring-pressed pawl N below pawl P to move counterclockwise to throw in operation the clutch (Figure 3a). This operation starts rotation of the main cam shaft 26 which proceeds to rotate about 150° until the following pawl 266 on the cam 69 engages the ledge 267 of pawl P and disengages the clutch shoes 28b and stops the cam shaft.

6. During this 150° movement, the following operations take place:

(a) Cam 49 (Figure 2) operates lever 53 in a counterclockwise direction to raise jaws 51 and 52 (Figures 10 and 11) to place the jaw 51 completely in front of the leading matrix and to raise the jaw 52 into locking engagement with the finger 80 to lock the finger with respect to the leading face 61 of the jaw 51. The space left between the finger and the leading face 61 is greater than the distance occupied by the matrices and spacebands to permit the subsequent justifying action to be carried out.

(b) While the jaws are still raised, justifying cam 63 operates lever 68 twice in rapid succession to raise (Figure 11) the justifying table or spaceband driver 64 which forces the wedges of the spacebands up to expand the line of elements to the full space between the jaw 51 and finger 80, thereby justifying the line.

(c) Simultaneously with the completing of the justifying action, cam 39 operates lever 40 to throw the justifying locks 42 (Figure 7a) into contact with the rods 65 supporting the justifying table to lock the table in its justifying position.

(d) The cam 49 then lowers the jaws 51 and 52 out of the path of the elements and lowers stop 113 out of contact with a stop 114 which had previously held the film moving rack 88 and the finger 80 from further travel to the left, as viewed in Figure 1c.

(e) Cam 36 operates lever 12 to lower the elevator 11 to its matrix receiving position on top of the housing 170.

7. During this time the cylindrical cam 129 (Figure 1c) has been constantly reciprocating the apertured feed bar 133 carrying the three sets of pawls 138, 139, and 140, the ends of which pawls have been riding on the face of the plate 137 (Figures 13, 14, and 15). After the rack 88 is released, the line delivery lever 70 pushes the leading matrix against the face 110. As the feed bar 133 reaches its lowermost position, its lowermost pawls 138 engage the top lugs D of the leading matrix, so that as the feed bar now rises, it carries the leading matrix upwardly in the feed channel 111 (Figure 13).

8. Simultaneouly with this leading matrix being lifted out of the line of matrices, the film holder 92 is dropped downwardly an amount determined by the thickness of the element removed. This is accomplished by the movement of rack 88 accompanying the operation of the line delivery lever 70 in moving the line of matrices forward to fill the space previously occupied by the removed matrix.

9. Simultaneously also with this upward movement of the leading matrix (Figure 16) a lower lug E of the matrix engages lug 217 of arm 216 and pivots shaft 214 clockwise. This shaft (Figure 5) carries lever 213 connected through link 212 to safety shutter 209 so as to cause the shutter 209 to rise to present its aperture 211 into line of the axis O—O which is the optical axis. As the safety shutter reaches its raised position, a latch 207 engages a notch 208 on the shutter preventing return movement of the shutter.

10. Simultaneously with this matrix reaching its optical axis position (Figure 22) shutter operating lever 197 is swung clockwise in a horizontal plane on its shaft 158 under the influence of the camway 169 on the top of the circular cam 129, to permit slide 189 to move forwardly under the influence of a spring 194. By means of a pin 190 this movement also moves slide 146 and point 145 thereof into notch K in the matrix, thus aligning the matrix exactly with the optical axis O—O.

11. The aperture 231 in the feed bar comes into alignment with the optical axis as the feed bar moves the matrix to this photographing position.

12. Immediately following the alignment of the matrix, the shutter operating lever 197 reciprocates the shutter 210 with its aperture 230 across the optical axis to make the exposure.

13. The feed bar 133 now moves downwardly (Figure 14) leaving the matrix in the position held by slide 146, the pawls 138 riding over the lugs of the matrix, and the pawls 139 above the pawls 138 going to a position below the bottom lugs of the matrix thus retained by the slide 146, and the pawls 138 ride over and engage the upper lugs of the next element in the line, as shown in Figure 14. Meanwhile, also, the optical axis O—O has been closed by the feed bar 133 moving downwardly. As the feed bar 133 reaches its lowermost position, the lever 197 withdraws the shutter 210 to its starting position, and simultaneously withdraws the slide 146 to release the matrix now held by the pawls 139.

14. The safety shutter 209 does not drop to its lowermost position because it is held in place by the latch 207 (Figure 18).

15. Now as the feed bar 133 moves upwardly, the following actions take place:
 (a) The pawls 138, as before, take the next matrix upwardly and the upper lips of the pawls prevent the matrix from overriding its position in a line with the optical axis O—O.
 (b) The film holder 92 is again lowered as before a distance proportional to the thickness of the element just removed.
 (c) The pawls 139 push the matrix previously photographed upwardly to a position above latch 147 (Figure 19) which catches the upper lugs of this matrix to hold it temporarily at rest.
 (d) The actions of the aligning slide 146 and of the shutter 210 are repeated. The safety shutter does not drop because the aligning slide 146, engaging the matrix, does not permit the latch 207 to release the shutter.

16. As the feed bar 133 returns or lowers, the pawls 140 ride down over the lugs of the matrix held by the retaining pawl 147, the pawls 139 ride down over the lugs of the matrix held by the slide 146, and the pawls 138 ride down over the lugs D of the leading element. As the rising operation of the feed bar 133 is repeated, the pawls 140 raise the matrix held by the pawl 147 upwardly into a position at the top of the feed channel 111 where pusher head 148 operated by rod 149 pushes the matrix out onto the elevator 11 (Figures 15 and 24). The rod 149 (Figure 23) is operated by shaft 158 and crank arm 159 which in turn is operated by the camway on top of the circular cam 129, and in such timed relation that the pusher head 148 moves forwardly at the instant the feed bar reaches its uppermost position.

17. The spacebands are also photographed to produce a blank space, but the following provisions are made for handling them:
 (a) The justifying bar 64 is extended far enough to the left (Figure 13) as at 64a so that the wedge of the spaceband immediately following a leading matrix does not drop off the justifying bar while the matrix is being removed.
 (b) The pawls 138, 139, and 140 always provide sufficient space between the matrices to take care of the vertical length of the wedges of the spacebands.

18. The removal of the matrices continues until the last matrix is taken from the line, and the finger 80 comes to rest against the forward wall 110 of the channel in which the matrices are raised. On the upward reciprocation of the feed bar 133 following the removal of the last matrix (and during which upward motion the pawls 138 carry no matrix) the pawls 139 raise the last photographed matrix to the pawl 147, as the feed bar 133 reaches its uppermost position (Figure 22). The slide 189 moves forward, and since the slide 146 is stopped by no matrix (because no matrix was lifted by the pawls 138), the slide 189 moves further in than it has previously moved (Figure 22), and trips a pawl 202 which operates latch 207 to release the safety shutter 209 which drops under the action of the spring 218 (Figures 16 through 19) so that as the shutter 210 moves across the optical axis O—O, no exposure is made.

19. Simultaneously with the last matrix being removed, the latch 86a, locking the rider 86 and the rack 88 to the finger 80, is raised by the left end of the latch 86a encountering stud 254 (Figure 5) so that the finger 80 is unlocked from the rack 88.

20. With the removal of the last matrix from the line, as the finger 80 moves its last forty-thousandths of an inch distance to the wall 110, the end of the lever 70 contacts shoe 299 carried by slide rod 284 and moves this rod 284 slightly to the right, as shown in Figure 28 (which would be slightly to the left as shown in Figure 5). This movement of the rod 284 sets in operation the delayed action switch that re-starts the main cam shaft 26. The movement of rod 284 moves the constantly reciprocated pawl 278 into contact with the teeth 275a of the gear wheel 275 to step the wheel around until it closes the switch 301 after three reciprocations of the feed bar (and after the last matrix has been discharged from the feed channel). Closing of the switch 301 operates the armature 258 and throws dog 268 into contact with the toothed wheel 269, with the result that the pawl 266 is released from pawl P thereby simultaneously releasing the cam shaft 26 and operating the clutch operating lever Y to start the cam shaft.

21. The cam shaft 26 now rotates through 210° and accomplishes the following operations:
 (a) Cam 69 moves the lever 70 to the right to its starting position where it is latched by the latch 81, and the lever 70, in moving to its starting position, pulls back the rack 88 by a contacting block 255 on the rack. As the lever moves back it also releases the shoe 299 of the delayed action switch and releases the wheel 275 which rotates under the action of a spring to its starting position and opens the switch 301.
 (b) Cam 39 operates lever 40 to unlock the justifying locks.
 (c) Cam 63 operates lever 68 to lower the justifying bar 64.

(d) Cam 49 operates lever 53 to raise the jaws 51 and 52 to their starting positions, and in raising the jaws permits the stop 113 to rise into the path of the previously returned stop 114 on film moving rack 88.

(e) Cam 32 operates lever 33 to retract the slide 34, and cam 36 simultaneously operates the lever 12 to raise the elevator 11, whereupon the cam 32 again operates the slide 34 to discharge the matrices from the elevator.

(f) Continued rotation of the cam shaft 26 finally moves the pawl 265 into contact with the pawl P which stops further rotation of the cam shaft and release the clutch shoes. Simultaneously the switch 276 is closed by pin 273 and is so held until the start of the next cycle.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In apparatus for photographically reproducing on a sensitized surface a line of type matter by photographing character-bearing elements and spacer elements composed into a line and having body thicknesses proportioned to the character or space widths represented by the elements, in combination, photographing means having a photographing position, movable means movable from a starting position for moving said sensitized surface relative to said photographing position, means for effecting movement of successive elements into said photographing position, responsive means movable from a first position to the starting position of said movable means and thereafter movable in successive steps in response to the movement of each successive element into photographing position, connecting means operative to connect said movable means and said responsive means at said starting position to move said sensitized surface successive amounts proportioned to the body thicknesses of the elements successively moved into photographing position, and means operative at the conclusion of the last element-moving operation to release said connecting means to disconnect said movable means from said responsive means, whereby said movable means and said responsive means may have relative movement with respect to each other as the two are returned respectively to the starting position and to the said first position.

2. In apparatus for photographically reproducing on a sensitized surface a line of type matter by photographing character-bearing elements composed into a line with spacer elements, said elements having body thicknesses proportioned to the character or space widths represented by the elements, in combination, movable means movable from a starting position for moving said sensitized surface, justifying means for justifying a composed line of elements, means for transferring said elements successively from said line into photographing position, line-moving means movable from a normal rest position to the starting position and thereafter movable to bodily move the line of elements to feed said elements to said transferring means, connecting means operative to connect said movable means and said line-moving means at said starting position to move said sensitized surface successive amounts proportioned to the body thicknesses of the elements successively transferred from the line, and means operative at the conclusion of the last feeding operation to release said connecting means to disconnect said movable means from said line-moving means, whereby said movable means and said line-moving means may have relative movement with respect to each other as the two are returned respective to the starting position and to the normal rest position.

3. In apparatus for photographically reproducing on a sensitized surface a line of type matter by photographing character-bearing elements and spacer elements composed into a line and having body thicknesses proportioned to the character or space widths represented by the elements, in combination, movable means movable from a first position for moving said sensitized surface, justifying means, line-moving means movable from a normal rest position to move a composed line of elements to a justifying position where said line may be justified by said justifying means, connecting means for positively connecting said movable means and said line-moving means when said composed line moves to said justifying position, means including said line-moving means for effecting movement of successive elements of said line into photographing position, and, by said connecting means, simultaneously moving said movable means to correlate the photographing of said elements and the movement of said sensitized surface, means operative at the conclusion of said line-moving operation to release said connecting means to disconnect said movable means from said line-moving means, whereby said movable means and said line-moving means may have relative movement with respect to each other as the two are returned respectively to the first position and the normal rest position.

4. In apparatus for photographically reproducing on a sensitized surface a line of type matter by photographing character-bearing elements and spacer elements composed into a line and having body thicknesses proportioned to the character or space widths represented by the elements, in combination, movable means movable from a starting position for moving said sensitized surface, justifying means, line-moving means movable from a normal rest position to move a composed line of elements to a justifying position where said line may be justified by said justifying means, means operative to move said elements successively into photographing position, said line-moving means serving to move said line of elements to feed the successive elements to said last-named means, means operative to connect said movable means and said line-moving means when the two means are respectively at their starting and justifying positions to effect their conjoint movement in successive amounts in response to the movement of each element into photographing position, means operative upon movement of the last element to photographing position to release said connecting means to thereafter permit movement separately of said movable means and said line-moving means, and means for returning said latter means respectively to the starting position and normal rest position.

5. In apparatus for photographically reproducing on a sensitized surface a line of type matter by photographing character-bearing elements and spacer elements composed into a line and having body thicknesses proportioned to the character or space widths represented by the elements, in combination, movable means movable from a starting position for moving said sensitized surface, justifying means, line-moving means movable from a starting position for moving a composed line of elements to a position where said line may be justified by said justifying means, connecting means for positively connecting said movable means and said line-moving means when said composed line moves to said justifying position, means including said line-moving means for effecting successive and individual removal of said elements from said line into photographing position and by said connecting means simultaneously moving said movable means to move said sensitized surface successive amounts proportioned to the body thicknesses of the elements removed, means operative at the conclusion of said element-removing operation to disconnect said connecting means to release said movable means from said line-moving means, whereby said movable means and said line-moving means may have relative movement with respect to each other as the two are returned to their starting positions.

6. In apparatus for photographically reproducing on a sensitized surface a line of type matter by photographing character-bearing elements composed into a line with spacer elements, said elements having body thicknesses proportioned to the character or space widths represented by the elements, in combination, movable means for moving said sensitized surface and movable from a starting position, justifying means, line-moving means movable from a starting position for moving a composed line of elements to a position where said line may be justified by said justifying means, connecting means for positively connecting said movable means and said line-moving means when said composed line moves to said justifying position, means including said line-moving means for successively and individually removing said elements from said line into photographing position and by said connecting means simultaneously moving said movable means to move said sensitized surface successive amounts proportioned to the body thicknesses of the elements removed, means operative at the conclusion of said element-removing operation to disconnect said connecting means to release said movable means from said line-moving means, means for returning said line-moving means to starting position, and means operated by said line-moving means for returning said movable means to its starting position.

7. In apparatus for photographically reproducing on a sensitized surface a line of type matter by photographing character-bearing elements composed into a line with spacer elements, said elements having body thicknesses proportioned to the character or space widths represented by the elements, in combination, movable means for moving said sensitized surface, a stop for maintaining said movable means in starting position, justifying means, line-moving means movable from a starting position for moving a composed line of elements to a justifying position where said line may be justified by said justifying means, connecting means for positively connecting said movable means and said line-moving means when said composed line moves to said justifying position, means for releasing said movable means and said stop to free said line-moving means to move said line to an element-transferring position, means including said line-moving means for successively and individually transferring said elements from said line into photographing position and by said connecting means simultaneously moving said movable means to move said sensitized surface successive amounts proportioned to the body thicknesses of the elements transferred, means operative upon said line-moving means reaching its limit of travel to disconnect said connecting means to release said movable means from said line-moving means, means for returning said line-moving means to its starting position, and means operated by said line-moving means to return said movable means to its starting position.

8. In apparatus for photographically reproducing on a sensitized surface a line of type matter by photographing character-bearing elements composed into a line with spacer elements, said elements having body thicknesses proportioned to the character or space widths represented by the elements, in combination, movable means having an initial position and operative to move said sensitized surface, justifying means including oppositely disposed rigid members secured in predetermined spaced relationship to each other, line-moving means movable from an initial position for moving a composed line of elements endwise to a position within the space between said members, means for relatively moving said line of elements and said members to embrace the line by said members, means for justifying the line while so embraced, means for reversing the said relative movement to free the line, connecting means for positively connecting said movable means and said line-moving means to establish a predetermined starting position of said sensitized surface and thereafter to maintain a positive relationship between the movement of said sensitized surface and the movement of said line-moving means, means including said line-moving means for effecting removal of said elements successively and individually out of the line and into a photographing position, and by said connecting means simultaneously moving said movable means to move said sensitized surface successive amounts proportioned to the body thicknesses of the respective elements removed, and means operative at the conclusion of said element and line-moving operation to release the connection between said movable means and said line-moving means to permit their individual return movements to their respective initial positions.

9. In apparatus for photographically reproducing on a sensitized surface a line of type matter by photographing character-bearing elements and spacer elements composed into a line and having body thicknesses proportioned to the character or space widths represented by the elements, in combination, movable supporting means having an initial position and operative to move and support for said sensitized surface, justifying means including oppositely disposed rigid members secured in fixed relationship to each other and one of which is longer to extend beyond the other, line-moving means movable from an initial position for moving a composed line of elements past the shorter of said members to a position in front of said longer member, means for moving said members toward said positioned line of elements and thereby positively aligning and interconnecting said line-moving means and the shorter of said members, means for justifying the composed line of elements between the longer of said members and said interconnected line-moving means, connecting means for positively connecting said movable supporting means and said line-moving means to positively relate the position of said sensitized surface with the position of said line-moving means, means for withdrawing said members from said composed line of elements and thereby disconnect the shorter of said members from said line-moving means, means including said line-moving means for effecting removal of said elements into photographing position and, by said connecting means, simultaneously moving said movable supporting means to correlate the movement of said sensitized surface with the respective removal of said elements, and means operative at the conclusion of said element and line-moving operation to disconnect said connecting means to release said movable supporting means from said line-moving means, whereby said movable supporting means and said line-moving means may have relative movement with respect to each other as the two are returned to their initial positions.

10. In apparatus for photographically reproducing on a sensitized surface a line of type matter by photographing character-bearing elements composed into a line with spacer elements, said elements having body thicknesses proportioned to the character or space widths represented by the elements, in combination, movable supporting means having an initial position and operative to support and move for said sensitized surface, justifying means including oppositely disposed rigid members secured in fixed relationship to each other and one of which is longer to extend beyond the other, line moving means movable from an initial position for moving a composed line of elements past the shorter of said members to a position in front of said longer member, means for moving said members toward said positioned line of elements and thereby positively aligning and interconnecting said line moving means and the shorter of said members, means for justifying the composed line of elements between the longer of said members and said interconnected line moving means, connecting means for positively connecting said movable supporting means and said line moving means to positively relate the position of said sensitized surface with the position of said line moving means, means for withdrawing said members from said justified line of elements and thereby disconnect the shorter of said members from said line-moving means, means including said line moving means for successively and individually transferring said elements from said line into photographing position and by said connecting means simultaneously moving said movable supporting means to move said sensitized surface successive amounts proportioned to the body thicknesses of the elements transferred, means operative at the conclusion of said element-transferring operation to disconnect said connecting means to release said movable supporting means from said line-moving means, whereby said movable supporting means and said line-moving means may have relative movement with respect to each other as the two are returned to their initial positions.

11. In apparatus for photographically reproducing on a sensitized surface a line of type matter by photographing character-bearing elements composed into a line with spacer elements, said elements having body thicknesses proportioned to the character or space widths represented by the elements, in combination, movable supporting means for supporting said sensitized surface, justifying means including spaced oppositely disposed rigid members one of which is longer to extend beyond the other, line moving means for moving a composed line of elements past the shorter of said members to a position in front of said longer member, means for moving said members toward said positioned line of elements and thereby positively aligning and interconnecting said line moving means and the shorter of said members, means for justifying the composed line of elements between the longer of said members and said interconnected line moving means, connecting means for positively connecting said movable supporting means and said line moving means to establish a predetermined starting position of said sensitized surface and thereafter to maintain a positive relationship between the movement of said sensitized surface and the movement of said line moving means, said connecting means being adjustable with respect to said movable supporting means, and the space between said rigid members being adjustable whereby the length of the justified line may be varied without changing the starting position of said sensitized surface.

12. In apparatus for photographically reproducing on a sensitized surface a line of type matter by photographing character-bearing elements composed into a line with spacer elements, said elements having body thicknesses proportioned to the character or space widths represented by the elements, in combination, a movable rack for controlling the position of the sensitized surface, a channel for holding a composed line of elements, justifying means including spaced rigid members one of which is longer to extend beyond the other, line moving means for moving said composed line of elements along said channel past the shorter of said members to a position in front of said longer member, means for moving said members toward said composed line of elements and simultaneously interlocking said line moving means and the shorter of said members, means for justifying the composed line of elements between the longer of said members and said interlocked line moving means, and means for positively connecting said movable rack and said line moving means to positively relate the position of said sensitized surface with the position of said line moving means.

13. In apparatus for photographically reproducing on a sensitized surface a line of type matter by photographing character-bearing elements composed into a line with spacer elements, said elements having body thicknesses proportioned to the character or space widths represented by the elements, in combination, movable means for controlling the position of the sensitized surface, a channel for holding a composed line of elements, justifying means including a movable jaw movable toward and away from the path of said line of elements moving along said channel, line-moving means for moving said composed line of elements along said channel to a justifying position related to said jaw, means for moving said jaw toward said positioned composed line of elements and simultaneously interlocking said line-moving means therewith, means for justifying the composed line of elements against said interlocked line-moving means and jaw, and means for positively connecting said movable means and said line-moving means to relate the position of said sensitized surface with the position of said line-moving means.

14. In apparatus for photographically reproducing on a sensitized surface a line of type matter by photographing character-bearing elements composed into a line with spacer elements, said elements having body thicknesses proportioned to the character or space widths represented by the elements, in combination, movable supporting means for supporting said sensitized surface, a stop for maintaining said movable supporting means in starting position, justifying means including oppositely disposed rigid members secured in fixed relationship to each other and one of which is longer to extend beyond the other, line moving means movable from a starting position for moving a composed line of elements past the shorter of said members to a position in front of said longer member, means for moving said members toward said positioned line of elements and for positively aligning and interlocking said line moving means and the shorter of said members, means for justifying the composed line of elements between the longer of said members and said interlocked line moving means, connecting means for positively connecting said movable supporting means and said line moving means to positively relate the position of said sensitized surface with the position of said line moving means, means for withdrawing said members from said composed line of elements and from said line moving means, and simultaneously withdrawing the stop from said movable supporting means to free said line moving means to move said justified composed line against stop means defining an element removing position, means including said line moving means for successively and individually effecting removal of said elements from said line into photographing position and by said connecting means simultaneously moving said movable supporting means to move said sensitized surface successive amounts proportioned to the body thicknesses of the successively removed elements, means operative at the conclusion of said element removing operation to disconnect said connecting means to release said movable supporting means from said line moving means, whereby said movable supporting means and said line moving means may have relative movement with respect to each other as the two are returned to their starting positions.

15. In apparatus for photographically reproducing on a sensitized surface a line of type matter by individually photographing character-bearing elements composed into a line with spacer elements, said elements having body thicknesses proportioned to the character or space widths represented thereby, in combination, a justifying jaw adjustable toward and away from a fixed plane to determine the length of the photographically reproduced line, shifting means for shifting a composed line of elements to a position between said plane and said jaw, said shifting means and said adjustable jaw cooperating to position said sensitized surface in accordance with the adjusted position of said jaw, means for filling the space left by said elements between said plane and said jaw to justify the composed line, element-removing means for removing the successive leading elements one by one from the line to a photographing position, means for withdrawing said jaw from said elements following the justifying operation and for simultaneously starting in operation said element-removing means, and said shifting means moving said sensitized surface amounts proportioned to the body thickness of each leading element as it is removed from the line.

16. In apparatus for photographically reproducing on a sensitized surface a line of type matter by photographing individually character-bearing elements composed into a line with adjustable spaceband elements, said elements having body thicknesses proportioned to their respective character or space widths, in combination, a channel for supporting a composed line of said elements, justifying means including spaced end blocks, means for moving said end blocks into justifying position to embrace said line of elements, means for expanding the spacebands to justify the composed line of elements against said end blocks and for maintaining the spacebands in the line in their expanded condition, means for moving said end blocks out of justifying position, and means for thereafter moving said composed line of elements along said channel.

17. In apparatus for photographically reproducing on a sensitized surface a line of type matter by photographing individually character-bearing elements composed into a line with spacer elements, said elements having body thicknesses proportioned to the character or space widths represented by the elements, in combination, a channel for supporting a composed line of said elements, justifying means including spaced end blocks, line-moving means for moving said composed line of elements along said channel to a position adjacent said end blocks, means for moving said end blocks to embrace the elements therebetween, means for filling the space left by said elements between said end blocks to justify the composed line of elements, and means for moving said end blocks away from said elements to free said line-moving means to move said composed line of elements along said channel for photographing.

18. In apparatus for photographically reproducing on a sensitized surface a line of type matter by photographing character-bearing elements composed into a line, and including a magazine for holding character bearing elements and releasing mechanism for individually releasing character bearing elements from said magazine to compose lines of the elements, in combination, means for holding a line of composed elements, stop means, means for urging said elements together to hold the leading element against said stop means, first movable means for moving the successive leading elements from said stop means to a photographing position, means for momentarily retaining each said element in said position, means operatively connected to said first movable means for moving each successive element from said photographing position to an intermediate position, separate means for momentarily holding it in said latter position, means for moving each successive element from said latter position to a discharging position, distributing mechanism for distributing the elements to said magazine, receiving mechanism for collecting said elements and delivering the collected elements to the distributing mechanism, and means for discharging each successive element from said discharging position to said receiving mechanism.

19. In apparatus for photographically reproducing on a sensitized surface a line of type matter by photographing character-bearing elements composed into a line, in combination, a channel for supporting a line of composed elements, means for raising each successive leading element from said line by transversely moving such element a distance at least twice the height of the element, means for momentarily retaining each element in said position, means for moving said element transversely from said each successive element transversely from said position a distance at least the height of said element and momentarily retaining it in said latter position, means for moving each successive element from said latter position to a discharge position, and means for discharging the successive elements from said discharge position.

20. In apparatus for photographically reproducing on a sensitized surface a line of type matter by photographing character-bearing elements composed into a line, and including a magazine for holding character bearing elements and releasing mechanism for individually releasing character bearing elements from said magazine to compose lines of the elements, in combination, a channel for supporting a line of composed elements, means for moving each succeeding leading element from said line to a photographing position, means for positively aligning each element in said photographing position with the character of said element in a predetermined relationship with respect to the sensitized surface and the character reproduced thereon from the photographing of the next preceding element, means for momentarily retaining each said element in said position, means for moving each successive element upwardly from said position a distance at least the height of said element and momentarily retaining it in said new position, means for moving each successive element along said channel from said latter position to a discharge position on said channel, distributing mechanism for distributing said elements to said magazine, receiving means for collecting said elements from said discharge position and transferring them to said distributing mechanism, and means for discharging the successive elements from said discharge position to said receiving means.

21. In apparatus for photographically reproducing on a sensitized surface a line of type matter by photographing character-bearing elements composed into a line, in combination, means for holding a line of composed elements, a channel having a wall extending transversely and vertically of said composed line of elements, means for urging the leading element of said composed line against said wall, means for moving each successive leading element from its position against said wall along said channel to a photographing position spaced above said first position a distance at least greater than the length of said element, means for moving each successive element further along said channel from said photographing position a distance at least equal to the distance of the first movement, means for moving each successive element along said channel from said latter position to a discharge position, and means for discharging it therefrom.

22. In apparatus for photographically reproducing on a sensitized surface a line of type matter by photographing character-bearing elements composed into a line, in combination, means for holding a line of composed elements, a channel having a side wall, movable means, engaging means thereon and movable therewith and adapted positively to engage each successive leading element of the line and to move it along said channel to a fixed photographing position, locking means independent of said engaging means for holding said element against said wall and accurately aligning said element with respect to the vertical in said photographing position, said locking means being adapted to hold said element during the subsequent movement of said movable means to engage the next succeeding leading element.

23. In apparatus for photographically reproducing on a sensitized surface a line of type matter by photographing character-bearing elements composed into a line, and including a magazine for holding character bearing elements and releasing mechanism for individually releasing character bearing elements from said magazine to compose lines of the elements, in combination, means for holding a line of composed elements, means providing a path, intermittently movable means movable along said path, engaging means thereon adapted positively to engage each successive leading element and to move it along said path to a photographing position as said intermittently movable means moves along said path, additional engaging means on said intermittently moving means for moving each such element from said photographing position along said path to a discharging position, distributing mechanism for distributing the elements to said magazine, receiving mechanism for collecting said elements and delivering the collected elements to the distributing mechanism, and means for discharging the element from said discharging position to said receiving mechanism.

24. In apparatus for photographically reproducing on a sensitized surface a line of type matter by photographing character-bearing elements composed into a line, in combination, means for holding a line of composed elements, reciprocating means reciprocating transversely of the axis of said composed line of elements, finger means on said reciprocating means adapted to engage the leading element of said line of elements as said reciprocating means reaches one limit of its travel and to move said element to a photographing position as the reciprocating means moves to the other limit of its travel, and to simultaneously engage the element in photographing position and the next leading element in the line upon movement back to the first mentioned limit of travel.

25. In apparatus for photographically reproducing on a sensitized surface a line of type matter by photographing character-bearing elements composed into a line, in combination, means for holding a line of composed elements, reciprocating means reciprocating transversely of the axis of said composed line of elements, finger means on said reciprocating means adapted to engage the leading element of said line of elements as said reciprocating means reaches one limit of its travel and as said reciprocating means moves to its other limit to move said leading element to a photographing position, means for holding each such element in said photographing position, and finger means carried by said reciprocating means for moving each successive element from said photographing position as said reciprocating means moves the next succeeding element to the photographing position.

26. In apparatus for photographically reproducing on a sensitized surface a line of type matter by photographing character-bearing elements composed into a line, in combination, means for holding a line of composed elements, reciprocating means reciprocating transversely of the axis of said composed line of elements, finger means on said reciprocating means adapted to engage the leading element of said line of elements as said reciprocating means reaches one limit of its travel and as said reciprocating means moves to its other limit to move said leading element to a photographing position, means for holding said element in said photographing position, finger means carried by said reciprocating means for moving each successive element from said photographing position as said reciprocating means moves the next succeeding element from said line of elements to the photographing position, and means for holding each element in its then position during the reciprocation of said reciprocating means to pick up the next leading element from said composed line of elements.

27. In apparatus for photographically reproducing on a sensitized surface a line of type matter by photographing character-bearing elements composed into a line, in combination, means for holding a line of composed elements, reciprocating means reciprocating transversely of the axis of said composed line of elements, first finger means movable under control of said reciprocating means to engage the leading element of said line of elements as said reciprocating means reaches one limit of its travel, and as said reciprocating means moves to its other limit to move said leading element along said channel to a photographing position, means for holding said element in said photographing position, second finger means movable under control of said reciprocating means to engage the element in said photographing position as said reciprocating means reaches said one limit of its travel and to move said element along said channel to an intermediate position as said reciprocating means moves to the said other limit of its travel, and third finger means movable under control of said reciprocating means to engage the element in said intermediate position as said reciprocating means reaches said one limit of its travel and to move said element to a discharging position as said reciprocating means moves to the said other limit of its travel.

28. In apparatus for photographically reproducing on a sensitized surface a line of type matter by photographing character-bearing elements composed into a line, in combination, means for holding a line of composed elements, reciprocating means reciprocating transversely of the axis of said composed line of elements, first finger means movable by said reciprocating means to engage the leading element of said line of said elements as said reciprocating means reaches one limit of its travel, and as said reciprocating means moves to its other limit of travel to move said leading element to a photographing position, means for holding said element in said photographing position, second finger means movable by said reciprocating means to engage said element in said photographing position as said reciprocating means moves to its one limit of travel and to move said element from said photographing position as said reciprocating means moves to its other limit of travel, and means for holding said element in its then position during the movement of said reciprocating means to its one limit of travel.

29. In apparatus for photographically reproducing on a sensitized surface a line of type matter by photographing character-bearing elements composed into a line, in combination, means for holding a line of composed elements, a channel, reciprocating means, first finger means carried by said reciprocating means adapted to engage the leading element of said line of elements as said reciprocating means reaches one limit of its travel and as said reciprocating means moves to its other limit to move said leading element along said channel to a photographing position, means for holding said element in said photographing position, second finger means carried by said reciprocating means for moving each successive element from said photographing position along said channel to an intermediate position as said reciprocating means moves the next leading element to the photographing position, and third finger means carried by said reciprocating means for moving the element from said intermediate position along said channel to a discharging position as said reciprocating means moves the next leading element from the line of elements to said photographing position.

30. In apparatus for photographically reproducing on a sensitized surface a line of type matter by photographing character-bearing elements composed into a line, in combination, means for holding a line of composed elements, a channel, reciprocating means, first finger means carried by said reciprocating means adapted to engage the leading element of said line of elements as said reciprocating means reaches one limit of its travel and as said reciprocating means moves to its other limit to move said leading element along said channel to a photographing position, means for holding said element in said photographing position, second finger means carried by said reciprocating means for moving each successive element from said photographing position along said channel to an intermediate position as said reciprocating means moves the next leading element to the photographing position, and third finger means carried by said reciprocating means for moving the element from said intermediate position along said channel to a discharging position as said reciprocating means moves the next leading element from the line of elements to said photographing position, said several finger means being so constructed and arranged on said reciprocating means as respectively to effect engagement simultaneously with the elements positioned along said channel.

31. In apparatus for photographically reproducing on a sensitized surface a line of type matter by photographing character-bearing elements composed into a line, in combination, means for holding a line of composed elements, a channel, reciprocating means, first finger means carried by said reciprocating means adapted to engage the leading element of said line of elements as said reciprocating means reaches one limit of its travel and as said reciprocating means moves to its other limit to move said leading element along said channel to a photographing position, means for holding said element in said photographing position, second finger means carried by said reciprocating means for moving the element from said photographing position along said channel to an intermediate position as said reciprocating means moves the next leading element to the photographing position, third finger means carried by said reciprocating means for moving the element along said channel from said intermediate position to a discharging position as said reciprocating means moves the next leading element from the line of elements to said photographing position, and means for holding each element in its then position during the reciprocation of said reciprocating means to pick up the next leading element from said composed line of elements.

32. In apparatus for photographically reproducing on a sensitized surface a line of type matter by photographing character-bearing elements composed into a line, in combination, means for holding a line of composed elements, stop means against which the leading element of said line is urged, reciprocating means, finger means operated by said reciprocating means and adapted to engage the leading element positioned against said stop means as said reciprocating means reaches one limit of its travel and as said reciprocating means moves to its other limit to move said leading element to a photographing position, means for holding said element in said position, and said finger means yielding to permit passage thereof past said element as said reciprocating means reverses to pick up the next leading element from said line of elements.

33. In apparatus for photographically reproducing on a sensitized surface a line of type matter by photographing character-bearing elements composed into a line, in combination, means for holding a line of composed elements, stop means against which the leading element is urged, a channel, reciprocating means, first finger means operated by said reciprocating means and adapted to engage the leading element against said stop means as said reciprocating means reaches one limit of its travel and to move said leading element along said channel to a photographing position as the reciprocating means travels to its other limit, means for holding said element in said position, and said finger means yielding to permit passage thereof past said element as said reciprocating means reverses to pick up the next leading element against said stop means, second finger means operated by said reciprocating means adapted to engage the element in said photographing position to move it along said channel to a second position, means to hold said element in said second position, third finger means operated by said reciprocating means adapted to engage and move the element from said second position along said channel to a third position, and means acting in timed relation to the movement of said reciprocating means to eject each element from said channel upon its arrival at said third position.

34. In apparatus for photographically reproducing on a sensitized surface a line of type matter by photographing character-bearing elements composed into a line, in combination, means for holding a composed line of elements, reciprocating means for moving each successive leading element from said composed line into a photographing position and for subsequently moving such element from said position, means independent of said reciprocating means for aligning said element with respect to horizontal and vertical components determining the optical axis for the photographing operation, shutter means for exposing the element to said sensitized surface, means operated by said shutter means for moving the aligning means into engagement with each element upon its arrival at photographing position and for releasing such engagement as said reciprocating means moves said element from said photographing position and moves the next succeeding element into said photographing position.

35. In apparatus for photographically reproducing on a sensitized surface a line of type matter by photographing character-bearing elements composed into a line, in combination, means for holding a line of composed elements, a reciprocating member, means operated by each reciprocation of said reciprocating member in one direction to engage each successive leading element of the line and move it to a photographing position, and second means operated by each reciprocation of said reciprocating member in the said direction to engage each successive element in said photographing position and move it independently of the other elements to a following position.

36. In apparatus for photographically reproducing on a sensitized surface a line of type matter by photographing character-bearing elements composed into a line, in combination, means for holding a line of composed elements, a channel, a reciprocating member, pawl means carried by and operative upon each reciprocation of said reciprocating member in one direction to engage each successive leading element of the line and move it along said channel to a photographing position, and second pawl means carried by and operative upon each reciprocation of said member in the said direction to engage and move each successive element from said photographing position to successive positions along said channel, said elements being provided with lugs and said channel with grooves to receive the lugs of said elements, and said pawl means being adapted to project into said grooves to engage the lugs of said elements.

37. In apparatus for photographically reproducing on a sensitized surface a line of type matter by photographing character-bearing elements composed into a line, in combination, means for holding a line of composed elements, a channel, a reciprocating member, pawl means carried by and operative upon each reciprocation of said reciprocating member in one direction to engage each successive leading element of the line and move it along said channel to a photographing position, second pawl means carried by and operative upon each reciprocation of said member in the said direction to engage and move each successive element from said photographing position to successive positions along said channel, said elements being provided with lugs and said channel with grooves to receive the lugs of said elements, and said pawls being adapted to project into said grooves to engage the lugs of said elements, said pawl means being pivoted to recede out of said grooves upon contact with said lugs as said reciprocating member reverses its direction of travel eventually to engage the next succeeding leading element from the line.

38. In apparatus for photographically reproducing on a sensitized surface a line of type matter by photographing character-bearing elements composed into a line with spacer elements, said elements having body thicknesses proportioned to the character or space widths represented by the elements, in combination, means for supporting a composed line of elements, justifying means for justifying said composed line of elements, element-removing means for successively removing the elements from said line after the justifying operation, line-moving means movable from a starting position to move said composed line of elements to said justifying means and thence to said element-removing means, means for photographing the characters of the successive elements removed from the line, returning means for returning said line-moving means to its starting position, and switch means actuated by said line-moving means as it moves said line of elements to said justifying position to set in motion said justifying means and after removal of all of said elements to set in motion said returning means.

39. In apparatus for photographically producing on a sensitized surface a justified line of type matter by photographing character-bearing elements composed in a line with spacer elements, said elements having body thicknesses proportioned to the character widths and space widths represented by the elements, in combination, line length-determining means adapted to receive said composed line of elements, space take-up means for taking up the space in said line length-determining means not occupied by said line of elements as received thereby, locking means for locking said take-up means against movement after being moved to take up said space, element-removing means operative after said space taking-up operation successively to remove the elements from said composed line to a photographing position, means for photographing the characters of the successive elements as they are moved into said photographing position, line-moving means movable from a starting position to move said composed line of elements to said line length-determining means, and after said space taking-up operation to move said composed line of elements to said element-removing means, returning means for returning said line-moving means to its starting position, and means actuated by said line-moving means first to set in motion said space take-up means and eventually to set in motion said returning means after the removal of the last said elements from said composed line.

40. In apparatus for photographically reproducing on a sensitized surface a line of type matter by photographing character-bearing elements composed into a line with spacer elements, said elements having body thicknesses proportioned to the character or space widths represented by the elements, in combination, means for supporting a composed line of elements, justifying means for justifying said composed line of elements, element-removing means for removing the successive leading elements from said line of elements after the justifying operation, line-moving means movable from a starting position to move said composed line of elements to said justifying means and thence to said element-removing means, means for photographing the characters of the successive elements removed from said line, returning means for returning said line-moving means to its starting position, and means actuated by said line-moving means to set in operation successively the justifying means, the photographing means, and the returning means.

41. In apparatus for photographically reproducing on a sensitized surface a line of type matter by photographing character-bearing elements composed into a line with spacer elements, said elements having body thicknesses proportioned to the character or space widths represented by the elements, in combination, means for supporting a composed line of elements, spaced stop means adapted to receive said composed line of elements, space take-up means for taking up the space in said stop means not occupied by said line of elements as received thereby, driving means for actuating said space take-up means, and locking means for locking said driving means in its actuated position, transferring means for transferring the successive leading elements of said line to a photographing position after the take-up operation, line-moving means movable from a starting position to move said composed line of elements to said stop means and for feeding said elements after the take-up operation to said transferring means, means actuated by said line-moving means as it moves said composed line of elements to said stop means to set in motion said driving means to take up said space, and subsequently to lock said driving means in its actuated position and to withdraw said stop means to release said line-moving means to feed said elements to said transferring means, and means also actuated by said line-moving means after the last of said elements has been transferred by said transferring means to effect return of said line-moving means, said stop means, and said driving means to their starting positions.

42. In apparatus for photographically reproducing on a sensitized surface a line of type matter by photographing character-bearing elements composed into a line with spacer elements, said elements having body thicknesses proportioned to the character or space widths represented by the elements, in combination, means for supporting a composed line of elements, spaced stop means adapted to receive said composed line of elements, space take-up means for taking up the space in said stop means not occupied by said line of elements as received thereby, driving means for actuating said space take-up means, and locking means for locking said driving means in its actuated position, transferring means for transferring the successive leading elements of said line to a photographing position after the take-up operation, line-moving means movable from a starting position to move said composed line of elements to said stop means and for feeding said elements after the take-up operation to said transferring means, motive means, a clutch, means actuated by said line-moving means as it moves said composed line of elements to said stop means to cause said clutch to engage said motive means, said motive means operating to actuate said driving means to take up said space, to actuate said locking means to lock said driving means and to release said line-moving means to feed said elements to said transferring means, and means actuated by said line-moving means after feeding the last element to said transferring means for eventually causing said clutch again to engage said motive means which operates now to return said line-moving means, said space take-up means and said driving means to their starting positions.

43. In apparatus for photographically reproducing on a sensitized surface a line of type matter by photographing character-bearing elements composed into a line with spacer elements, said elements having body thicknesses proportioned to the character or space widths represented by the elements, in combination, spaced line length-determining means, line moving means movable from a starting position for moving a composed line of elements to said line length-determining means, stop means operable in its starting position to stop said line moving means at said line length-determining means, said line length-determining means being movable from a starting position to receive said line of elements, justifying means for justifying the composed line of elements received by said line length-determining means, means for transferring the successive elements of said line of elements to a photographing position, said stopping means being releasable to permit said line moving means to feed said line of elements to said transferring means, motive means, means operated by said line moving means upon moving said line to said line length-determining means to set in motion said motive means which operates (1) to move said line length-determining means to receive said line of elements, (2) to actuate said justifying means, (3) to withdraw said line length-determining means from said line of elements, and (4) to move said stop means to release said line-moving means to feed said elements to said transferring means, and means operated by said line-moving means as it feeds the last element to said transferring means eventually to set in motion said motive means which operates to return said line-moving means, said justifying means, said stop means, and said line length-determining means to their respective starting positions.

44. In apparatus for photographically reproducing on a sensitized surface a line of type matter by photographing character-bearing elements composed into a line with spacer elements, said elements having body thicknesses proportioned to the character or space widths represented by the elements, in combination, a channel along which a composed line of elements may be moved, line-moving means for moving said line of elements along said channel, line embracing means movable to a starting position (in the path of the elements moving along the channel), to a justifying position and to a retracted position, element-removing means for removing successive leading elements from the line, operating means for moving said embracing means to its several positions, motive means, clutch means for connecting said motive means and said operating means, stop means adapted to release said clutch means and stop said operating means to hold said embracing means in said starting and retracted positions, actuating means operated by said line-moving means as it moves said line to said embracing means to release said stop means and close said clutch whereby said operating means moves said embracing means to said justifying position and thence to said retracted position, said stop means opening said clutch and stopping said operating means to hold said embracing means in said retracted position, means operated as said embracing means moves to its retracted position to free said line-moving means to feed said elements along said channel to said element-removing means, and means actuated by said line-moving means as it feeds the last element to said element-removing means eventually to release said stop means and close said clutch, whereby said operating means moves said embracing means to its starting position, and said stop means being adapted again to open said clutch and stop said embracing means at said position.

45. In apparatus for photographically reproducing on a sensitized surface a line of type matter by photographing character-bearing elements composed into a line with spacer elements, said elements having body thicknesses proportioned to the character or space widths represented by the elements, in combination, line-length determining means, line-moving means movable from a starting position to move said line of elements to said line-length determining means, space take-up means for taking up the space in the line-length determining means not occupied by said line of elements received thereby, element-removing means for removing the successive leading elements from said line of elements to a photographing position, operating means set in motion by said line-moving means upon moving said line to said line-length determining means and operative to actuate said take-up means and to lock the latter in operated position, and subsequently to render said line-moving means operable to feed said elements to said element-removing means, whereby said element-removing means operates to remove said elements from said line of elements, and means actuated by said line-moving means as it feeds the last element to said element-removing means to set in motion said operating means which is operative to release said take-up means and return it to a starting position, and to return said line-moving means to its starting position.

46. Apparatus for photographically producing type matter from a composed line of character-bearing elements by separate exposure successively of the characters on such elements, comprising, in combination, a horizontal channel for supporting the composed line and a vertical guide channel disposed normal thereto at one end thereof, means acting constantly to press the line endwise toward said guide channel, photographing means including a sensitized surface disposed opposite the guide channel in a plane parallel thereto for receiving the successive impressions of the exposed characters, a vertically reciprocating element feed bar provided with a plurality of sets of spring-pressed pawls adapted normally to project a limited extent into the vertical guide channel at spaced intervals therealong, the lower set of said pawls at each upstroke of said feed bar being adapted to positively engage and remove the leading element from the end of the line and elevate such element to a position in the guide channel for photographing its character on the sensitized surface and the upper sets of pawls being adapted to progressively elevate such element and the succeeding displaced elements from said photographing position by intermittent stages along the guide channel to the upper end thereof, connections between the sensitized surface and the means acting to press the line endwise toward the guide channel for advancing said surface after each displacement of an element from the line whereby to present a fresh area of said surface for each succeeding photographic exposure, and a pusher adapted to reciprocate laterally across the upper end of the guide channel in timed relation to the reciprocations of the element feed bar whereby to discharge from the element feed bar each element as it is elevated by the said channel each element as it is elevated by the uppermost set of pawls on said feed bar.

47. Apparatus for photographically producing type matter from a composed line of character-bearing elements by exposure of the characters on such elements individually, comprising, in combination, a horizontal channel for holding the composed line of elements, a vertical guide channel disposed normal thereto at one end thereof, a vertically reciprocating member operative at each upstroke to displace an element from the line and move it positively to a photographing position in said guide channel, means for advancing the line endwise toward the guide channel after each displacement of an element, a member adapted to move laterally into the guide channel to locate and retain each element in photographing position during the down-stroke of the reciprocating member to a position for engaging the next element of the line, common rotary means having separate camways respectively for driving said reciprocating member and said laterally moved retaining member in proper timed relation, photographing means including a sensitized surface disposed parallel to the plane of the guide channel and movable by the line advancing means after each displacement of an element, and a shutter operated by connections to said common rotary driving means in timed relation to the movements of both of the aforesaid members.

48. In apparatus for photographically reproducing on a sensitized surface a line of type matter by photographing character-bearing elements composed into a line, in combination, means for holding a composed line of elements, element-moving means for moving the successive leading elements from said composed line of elements along a path to a photographing position, feeding means movable from a starting position for feeding said elements to said element moving means, delayed action means for controlling the return of said feeding means to a starting position, and means responsive to the removal of the last element from said line to start said delayed action means in operation.

49. In apparatus for photographically reproducing on a sensitized surface a line of type matter by photographing character-bearing elements composed into a line, in combination, means for holding a composed line of elements, element-moving means for moving along a path the successive leading elements from the composed line of elements respectively to a photographing position and to a discharging position, feeding means movable from a starting position for feeding said elements to said element moving means, delayed action means for controlling the return of said feeding means to a starting position, and means responsive to the removal of the last element from said line to start said delayed action means in operation to prevent return of said feeding means to its starting position until said path is cleared of said elements.

50. In apparatus for photographically reproducing on a sensitized surface a line of type matter by photographing character-bearing elements composed into a line and including means for assembling said elements from a magazine into said composed line, and distributing means for redistributing said elements into said magazine, in combination, means for holding the composed line of elements, means for moving the successive leading elements from said composed line along a path to a photographing position, delayed action means for controlling the operation of said distributing means, and means responsive to the removal of the last element from said line to start said delayed action means in operation.

51. In apparatus for photographically reproducing on a sensitized surface a line of type matter by photographing character-bearing elements composed into a line and including means for assembling said elements from a magazine into said composed line and distributing means for redistributing said elements into said magazine after photographing, in combination, means for holding the composed line of elements, means for moving the successive leading elements from the composed line of elements along a path through a series of successive positions of momentary rest, delayed action means for controlling the operation of said distributing means, and means responsive to the removal of the last element from said line to start said delayed action means in operation, whereby said path is cleared of said elements before said distributing means operates.

52. In apparatus for photographically reproducing on a sensitized surface a line of type matter by photographing character-bearing elements composed into a line with expansible spacer elements, in combination, means for holding a composed line of such elements, means including spaced rigid members and a table, both movable from a starting position for justifying said composed line of elements by expanding the spacer elements, element-moving means for moving the successive leading elements from said composed line of elements along a path to a series of positions including a photographing position, feeding means movable from a starting position for feeding said elements to said element moving means, delayed action means for controlling the return of the justifying means and the feeding means to their respective starting positions, and means responsive to the removal of the last element from said composed line of elements to start said delayed action means in operation.

53. In apparatus for photographically reproducing on a sensitized surface a line of type matter by photographing character-bearing elements composed into a line, in combination, means for holding a line of composed elements, element-moving means for successively moving each leading element from said line to a photographing position, photographing means for photographing each element moved to said photographing position, and safety shutter means for closing said photographing means so long as said element moving means moves to said photographing position without an element.

54. In apparatus for photographically reproducing on a sensitized surface a line of type matter by photographing character-bearing elements composed into a line, in combination, means for holding a line of composed elements, element-moving means for successively moving each leading element from said line to a photographing position, photographing means for photographing each element moved to said photographing position, safety shutter means for closing said photographing means so long as said element-moving means moves to said photographing position without an element, said safety shutter means including means responsive to the presence of a leading element in the composed line of elements for initiating the opening of said shutter, means responsive to the presence of an element in the photographing position for maintaining said shutter open, and means responsive to the absence of an element in photographing position for closing said safety shutter.

55. In apparatus for photographically reproducing on a sensitized surface a line of type matter by photographing character-bearing elements composed into a line, in combination, means for holding a line of composed elements, means for successively moving each leading element from said line to a photographing position, aligning means for aligning each such element in said photographing position, means for photographing the character of each such aligned element, safety shutter means for closing said photographing means when said aligning means operates without an element in said photographing position, said safety shutter means including a shutter and means responsive to the presence of a leading element in the composed line of elements for initiating the opening of said shutter, means responsive to the presence of an element in the photographing position for maintaining said shutter open, and means responsive to the absence of an element in photographing position for closing said shutter.

56. In apparatus for photographically reproducing on a sensitized surface a line of type matter by photographing character-bearing elements composed into a line, in combination, means for holding a line of composed elements, element-moving means for successively moving each leading element from said line to a photographing position, photographic means for photographing the character of each such element including an optical axis and a reciprocating shutter having an aperture, and means operated by said element moving means for closing the optical axis except when the aperture of said shutter crosses said optical axis while moving in one direction only.

57. In apparatus for photographically reproducing on a sensitized surface a line of type matter by photographing character-bearing elements composed into a line, in combination, means for holding a line of composed elements, means for successively moving each leading element from said line to a photographing position, aligning means for aligning each such element in said photographing position, photographing means for photographing the character of each such aligned element, safety shutter means for closing said photographing means, said aligning means and said safety shutter means being connected together and operated in such timed relation that when said aligning means operates without an element in said photographing position, said safety shutter means closes.

58. In apparatus for photographically reproducing on a sensitized surface a line of type matter by photographing character-bearing elements composed into a line, in combination, means for holding a line of composed elements, element-moving means for successively moving each leading element from said line to a photographing position, photographic means for photographing the character of each such element including an optical axis and a reciprocating shutter having an aperture, and means operated by said element-moving means for closing the optical axis except when the aperture of said shutter crosses said optical axis while moving in one direction only, said last-named means including a slide having an aperture therein, said slide being adapted to present its aperture to the optical axis during the time said shutter moves in said direction to present its aperture to the optical axis, and the unapertured portion of said slide being adapted to move across and close said optical axis during the time the aperture in said shutter reverses its movement across said optical axis, whereby the photographic exposure of each element is timed independently of the slide.

59. In apparatus for photographically reproducing on a sensitized surface a line of type matter by photographing character-bearing elements composed into a line, in combination, means for holding a line of composed elements, element-moving means for successively moving each leading element from said line to a photographing position, photographing means associated with said photographing position and including an optical axis, means for detecting the presence of an element with its character aligned on said axis, a plurality of reciprocating apertured shutter means operative to effect opening of said optical axis whenever an element is presented in alignment thereon, and means controlling the operation of said shutter means to align their respective apertures momentarily only once during the presentation of each element on the optical axis.

60. In apparatus for photographically reproducing on a sensitized surface a line of type matter by photographing character-bearing elements composed into a line, in combination, means for holding a line of composed elements, means for successively moving each leading element from said line to a photographing position, photographing means associated with said photographing position and including an optical axis, a plurality of reciprocating apertured shutter means, said shutter means being so constructed and arranged that when an element is in said photographing position the apertures of said shutter means are aligned with said optical axis only when one of said shutter means is stationary and the other is moving in one direction only.

61. In apparatus for photographically reproducing on a sensitized surface a line of type matter by photographing character-bearing elements composed into a line, in combination, means for holding a line of composed elements, means for successively moving each leading element from said line to a photographing position, photographing means associated with said photographing position and including an optical axis, a plurality of reciprocable apertured shutters, driving means for two of said shutters adapted to move and to effect a momentary dwell of the aperture of one of the said two shutters at the optical axis while the aperture of the other of said two shutters crosses said axis in one direction only, and means operative in the absence of an element at said photographic position to effect closing of the optical axis by another of said shutters when the apertures of the first two mentioned shutters are aligned at said axis.

62. In apparatus for photographically reproducing on a sensitized surface a line of type matter by photographing character-bearing elements composed into a line, in combination, means for holding a line of composed elements, means for successively moving each leading element from said line to a photographing position, photographing means associated with said photographing position and including an optical axis, a plurality of apertured shutters, driving means for moving two of said shutters to bring the apertures thereof in line with said optical axis, said driving means being so constructed and arranged that the aperture of one of said two shutters is stationary at the optical axis while the aperture of the other of said two shutters crosses said axis in one direction only, and means operative in the absence of an element at the photographing position to effect closing of the optical axis by another of said shutters during the time that the apertures of the said two mentioned shutters are aligned at said axis.

63. Apparatus for photographically producing type matter from a composed line of character-bearing elements by exposure of the characters thereon individually while presented at a common photographing position having an optical axis fixed relative to a movable sensitized surface, comprising, in combination, a displacing member adapted to engage and displace the elements singly in succession from one end of the line and move them into the photographing position and subsequently move them from such position, a power drive for driving said displacing member, means for advancing the line to present the successive elements therein to the displacing member, said sensitized surface receiving the successive photographic impressions and being movable under control of the line-advancing means after each displacement of an element, an apertured main shutter so driven by said power drive as to present its aperture therein to the optical axis in timed relation to the successive presentation of the elements in photographing position by said displacing member, an apertured auxiliary shutter movable by the first displaced element to a position for disposing its aperture in alignment with the optical axis, means for locking said auxiliary shutter in such position, detecting means for detecting the presence of an element at photographing position, and means operated under control of said detecting means for releasing the auxiliary shutter after the last element from the line is moved from the photographing position.

64. Apparatus for photographically producing type matter from a composed line of character-bearing elements by exposure of the characters thereon individually while presented at a common photographing position having an optical axis fixed relative to a movable sensitized surface, comprising, in combination, a displacing member adapted to engage and displace the elements singly in succession from one end of the line and move them into the photographing position, a power drive for driving said displacing member, line-advancing means for advancing the line to present the successive elements therein to the displacing member, said sensitized surface receiving the successive photographic impressions and being movable under control of the line-advancing means after each displacement of an element, an apertured main shutter so driven by the power drive as to present its aperture therein to the optical axis in timed relation to the successive presentation of the elements in photographing position by said displacing member, detaching and retaining means operative by the power drive to detect and retain each element upon its arrival at photographing position, and auxiliary shutter means adapted under control of said element detecting and retaining means to prevent photographic exposures through the aperture in the main shutter in the absence of an element in photographing position.

65. In apparatus for photographically reproducing on a sensitized surface a line of type matter by photographing character-bearing elements composed into a line, in combination, channel means for supporting a composed line of elements, element-moving means for moving each successive leading element from one end of said composed line along said channel means to a photographing position, photographing means for effecting photographic exposure of each such element, aligning means independent of said element-moving means for accurately aligning each such element with respect to said photographing means, and means controlled by the operation of said aligning means for effecting the photographic exposure.

66. In apparatus for photographically reproducing on a sensitized surface a line of type matter by photographing character-bearing elements composed into a line, in combination, means for holding a line of composed elements, means providing a path, intermittently movable means movable along said path, engaging means thereon adapted positively to engage each successive leading element and to move it along said path to a photographing position as said intermittently movable means moves along said path, means for holding and accurately aligning each such element in said position for photographing while said intermittently movable means moves to engage the next succeeding element, and means on said intermittently movable means for moving each such element from the photographing position to a discharging position while moving the next leading element to the photographing position.

67. In apparatus for photographically reproducing on a sensitized surface a line of type matter by photographing character-bearing elements composed into the line, in combination, means for holding a composed line of elements, continually operating moving means for moving each successive leading element from said composed line of elements to a photographing position, shutter means for exposing said element while in said photographing position, driving means for said shutter means, element aligning means for aligning positively each element in a predetermined relationship with respect to said photographing position, said element aligning means being operated intermittently by said shutter means whereby said aligning and exposing operations are positively synchronized, and means for successively moving each element from the photographing position.

68. In apparatus for photographically reproducing on a sensitized surface a line of type made by photographing character-bearing elements composed in a line, in combination, means for holding the composed line of elements, a channel, reciprocating means for moving each successive leading element from said composed line along said channel into a photographing position and subsequently moving said element from said photographing position, reciprocating shutter means adapted to reciprocate at right angles to said channel and to expose each successive element while in said photographing position, aligning means operable from a non-aligning position to an aligning position in which it aligns each element while in said photographing position, said aligning means being operated into its aligning position by said reciprocating shutter means as it moves to its exposing position, and being operated into its non-aligning position by said shutter means as it moves to its exposing position, whereby each element in photographing position is held in accurate aligned condition while said shutter is moving to its exposing position, but is released from said aligning means when said shutter is in its non-exposing position.

69. In apparatus for photographically reproducing on a sensitized surface a line of type matter by photographing character-bearing elements composed into a line with adjustable spaceband elements, said elements having body thicknesses proportioned to the character or space widths represented by the elements, in combination, movable means for moving said sensitized surface, justifying means including oppositely disposed non-yielding members secured in fixed horizontal spaced relationship to each other, line-moving means for moving a composed line of elements to a position for reception between said members, means for moving at least one of said members toward said positioned line of elements to embrace the line of elements, means simultaneously operated for positively aligning and interconnecting said line-moving means with said member, means for expanding the spaceband elements to justify the composed line of elements between said member, detachable connecting means for positively connecting said movable means and said line-moving means to positively relate the position of said sensitized surface with the position of said line-moving means, and means operated simultaneously with the line of elements moving to said position to operate said connecting means.

70. In apparatus for photographically reproducing on a sensitized surface successive lines of type made by photographing individually character-bearing elements after they have been composed into a line with space band elements, said elements having body thicknesses proportioned to the character or space widths represented by the elements, and said sensitized surface for each line being movable from a starting position in steps along a predetermined path past exposure means to which the elements are individually presented, and the length of the steps being proportioned to the thicknesses of the elements individually presented, in combination, a member movable from a starting position in steps proportioned to the thicknesses of the respective elements as they are presented for exposure, a member for driving said sensitized surface, connecting means operatively connecting said members, first operating means for operating said connecting means when said movable member is in its starting position positively to lock mechanically said driving member to said movable member in a predetermined relationship, whereby said movable member always positions said sensitized surface in a predetermined starting position for each line, and second operating means for operating said connecting means to release said driving member from said movable member after said movable member has completed its last step, whereby said movable member and driving member may be returned independently to their starting positions.

71. In apparatus for photographically reproducing on a sensitized surface a line of type made by photographing individually character-bearing elements composed into a line with space band elements, said elements having body thicknesses proportioned to the character widths and space widths represented by the elements, in combination, a channel for supporting a composed line of said elements, line-length determining means adapted to receive said composed line of elements including a movable line-length determining member, element moving means for moving said composed line of elements along said channel, stop means for limiting the movement of said elements along said channel, and means for moving said line length determining member into position to engage said element moving means and hold it a predetermined distance from said stop means; space take-up means for taking up the space between said element moving means and said stop means not occupied by said line of elements as moved therebetween, locking means for locking said take-up means against movement after being moved to take up said space, and means for removing said line length determining member from said element moving means to release said means to move the elements along said channel for photographing.

72. In apparatus for photographically reproducing on a sensitized surface a line of type matter by photographing individually character-bearing elements and spacer elements composed into a line, in combination, means for holding a composed line of elements, means providing a path, element engaging means for moving the successive leading elements from said line and for moving such elements in intermittent steps along said path first to a photographing position, and thence to a discharging position, the distance between each such positions being greater than the length of said elements whereby the elements are held spaced one from the other while moving along said path, and means for momentarily retaining each such element in said photographing position independently of said element engaging means.

73. In apparatus for photographically reproducing on a sensitized surface a line of type matter by photographing character-bearing elements composed into a line with spacer elements, said elements having body thicknesses proportioned to the character or space widths represented by the elements, in combination, movable means for controlling the position of the sensitized surface, a channel for holding a composed line of elements, justifying means including a movable jaw movable toward and away from the path of said line of elements moving along said channel, line-moving means for moving said composed line of elements along said channel to a justifying position related to said jaw, means for moving said jaw toward said positioned composed line of elements and simultaneously interlocking said line-moving means therewith, means for justifying the composed line of elements against said interlocked line-moving means and jaw, and means for positively connecting said movable means and said line-moving means to relate the position of said sensitized surface with the position of said line-moving means, means for withdrawing said movable jaw from engagement with said line-moving means, transferring means including said line-moving means for successively and individually moving said elements from said composed line of elements to a photographing position, and by said means connecting said movable means and said line-moving means simultaneously moving said sensitized surface in successive steps proportioned to the body thicknesses of the elements successively moved from said composed line of elements.

EINAR G. KLINGBERG.
FRITZ STADELMANN.
HERMAN R. FREUND.

Certificate of Correction

Patent No. 2,391,021. December 18, 1945.

EINAR G. KLINGBERG ET AL.

It is hereby certified that errors appear in the printed specification of the above numbered patent requiring correction as follows: Page 4, second column, line 17, for "onto" read *into*; line 72, for "discharge" read *discharging*; page 9, second column, line 26, for "62" read *52*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.*